US005410652A

United States Patent [19]
Leach et al.

[11] Patent Number: 5,410,652
[45] Date of Patent: Apr. 25, 1995

[54] DATA COMMUNICATION CONTROL BY ARBITRATING FOR A DATA TRANSFER CONTROL TOKEN WITH FACILITIES FOR HALTING A DATA TRANSFER BY MAINTAINING POSSESSION OF THE TOKEN

[75] Inventors: Jerald G. Leach, Houston; Laurence R. Simar, Richmond, both of Tex.

[73] Assignee: Texas Instruments, Incorporated, Dallas, Tex.

[21] Appl. No.: 265,977

[22] Filed: Jun. 27, 1994

Related U.S. Application Data

[63] Continuation of Ser. No. 590,107, Sep. 28, 1990, abandoned.

[51] Int. Cl.[6] .................... G06F 13/14; G06F 13/37
[52] U.S. Cl. .................... 395/250; 395/725; 364/DIG. 1; 364/239.7; 364/242.6
[58] Field of Search ............ 395/200, 250, 275, 325, 395/500, 725

[56] References Cited

U.S. PATENT DOCUMENTS

| | | | |
|---|---|---|---|
| 4,433,391 | 2/1984 | Potash | 395/275 |
| 4,527,233 | 7/1985 | Ambrosius, III et al. | 395/250 |
| 4,604,682 | 8/1986 | Schwan et al. | 395/250 |
| 4,730,268 | 3/1988 | Marin | 395/325 |
| 4,933,840 | 6/1990 | Sera et al. | 395/275 |
| 4,954,983 | 9/1990 | Klingman | 395/275 |
| 4,959,782 | 9/1990 | Tulpule et al. | 395/275 |
| 4,989,135 | 1/1991 | Miki | 395/325 |
| 4,998,198 | 3/1991 | Chan | 395/275 |
| 5,072,420 | 12/1991 | Conley et al. | 395/425 |
| 5,151,999 | 9/1992 | Marzuco et al. | 395/800 |
| 5,163,132 | 10/1992 | Dulal et al. | 395/275 |
| 5,179,662 | 1/1993 | Corrigan et al. | 395/250 |
| 5,261,064 | 11/1993 | Wyland | 395/400 |

OTHER PUBLICATIONS

Daily and Song, Design of a Self-Timed VLSI Multicomputer Communication Controller; pp. 230–234; Rye Brook, N.Y. Oct. 5, 1987.
Charles H. Ng; FIFO Buffering Transceiver: A Communication Chip Set for Multiporcessor Systems; pp. 1–60; Oct. 5, 1987; California Institute of Technology.
Hillman, "Intelligent Buffer Reconciles Fast Processor & Slow Peripherals," *Electronics*, Sep. 11, 1980 pp. 131–135.
Andrews, "ASIC Memories: Bigger, Faster & Customized", *Computer Design*, Oct. 1, 1988, pp. 44–62.
"Rich with Logic, Memory ICs Hone Their Specialties", *Electronic Design*, Jun. 11, 1987 pp. 77–86.

*Primary Examiner*—Thomas G. Black
*Assistant Examiner*—John C. Loomis
*Attorney, Agent, or Firm*—Scott B. Stahl; James C. Kesterson; Richard L. Donaldson

[57] ABSTRACT

A data processing device for use with another data processing circuit sending data and requests for service thereto. The data processing device includes a processor circuit, a communication port connected to said processor circuit, having a data buffer including a plurality of registers comprising a first-in-first-out (FIFO) circuit and a plurality of external terminals, the communication port operative to communicate with the external terminals. Further included is a FIFO control unit, connected to the registers of the FIFO circuit, operative to provide FIFO control signals for data transfers between the communication port and the FIFO circuit. A port arbitration unit, connected to the FIFO control unit, has a port arbitration register and is operative to exchange port control signals for arbitrating port control between requests from the processor circuit and the external terminals. Other devices, systems and methods are also disclosed.

39 Claims, 46 Drawing Sheets

R = READ, W = WRITE

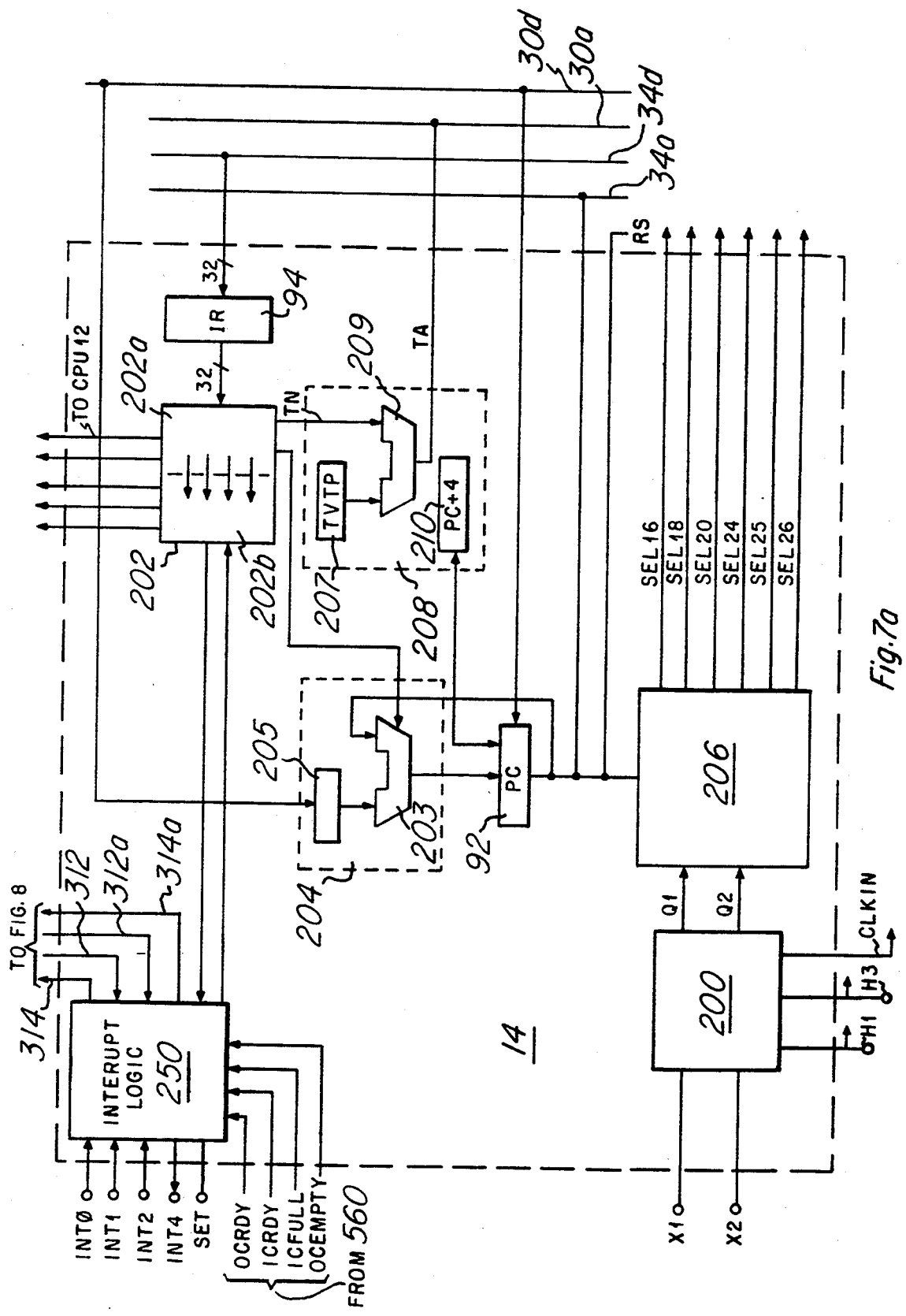

| INST FEATURE | DELAYED BRANCH | TRAP | LAT |
|---|---|---|---|
| INDIRECT | NO | YES | YES |
| DELAY SINGLE CYCLE | YES | NO | YES |

Fig. 16 (IN 520)

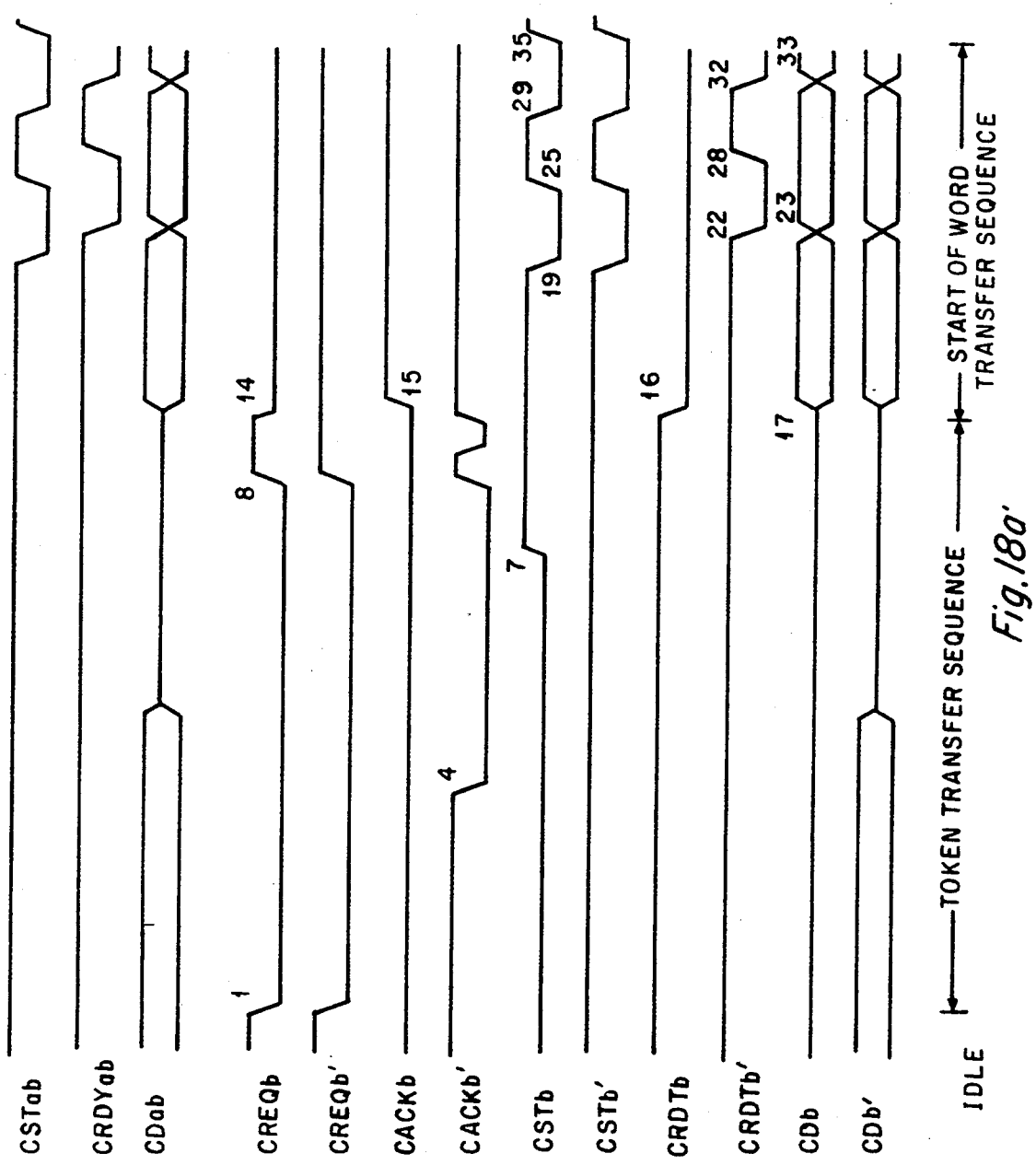

DATA COMMUNICATION CONTROL BY ARBITRATING FOR A DATA TRANSFER CONTROL TOKEN WITH FACILITIES FOR HALTING A DATA TRANSFER BY MAINTAINING POSSESSION OF THE TOKEN

This application is a Continuation, of application Ser. No. 07/590,107, filed Sep. 28, 1990, now abandoned.

CROSS REFERENCE TO RELATED APPLICATIONS

This application is related to coassigned applications Ser. No. 08/109,201, Ser. No. 07/589,968, now U.S. Pat. No. 5,305,446, Ser. No. 07/590,372 and Ser. No. 07/590,625 filed contemporaneously herewith and incorporated herein by reference. In addition, the applicants hereby incorporate by reference the following co-assigned patent documents.
 a) U.S. Pat. No. 4,713,748
 b) U.S. Pat. No. 4,577,282
 c) U.S. Pat. No. 4,912,636
 d) U.S. Pat. No. 4,878,190
 e) U.S. application Ser. No. 347,967 filed May 4, 1989, now U.S. Pat. No. 4,968,987
 f) U.S. application Ser. No. 388,270 filed Jul. 31, 1989, now abandoned.
 g) U.S. application Ser. No. 421,500 filed Oct. 13, 1989, now U.S. Pat. No. 5,210,8

BACKGROUND OF THE INVENTION

FIELD OF THE INVENTION

This invention generally relates to data processing devices, systems and methods and more particularly to communication between such devices, systems and methods.

BACKGROUND ART

A microprocessor device is a central processing unit or CPU for a digital processor which is usually contained in a single semiconductor integrated circuit or "chip" fabricated by MOS/LSI technology, as shown in U.S. Pat. No. 3,757,306 issued to Gary W. Boone and assigned to Texas Instruments Incorporated. The Boone patent shows a single-chip 8-bit CPU including a parallel ALU, registers for data and addresses, an instruction register and a control decoder, all interconnected using the yon Neumann architecture and employing a bidirectional parallel bus for data, address and instructions. U.S. Pat. No. 4,074,351, issued to Gary W. Boone, and Michael J. Cochran, assigned to Texas Instruments Incorporated, shows a single-chip "microcomputer" type device which contains a 4-bit parallel ALU and its control circuitry, with on-chip ROM for program storage and on-chip RAM for data storage, constructed in the Harvard architecture. The term microprocessor usually refers to a device employing external memory for program and data storage, while the term microcomputer refers to a device with on-chip ROM and RAM for program and data storage. In describing the instant invention, the term "microcomputer" will be used to include both types of devices, and the term "microprocessor" will be primarily used to refer to microcomputers without on-chip ROM; both terms shall be used since the terms are often used interchangeably in the art.

Modern microcomputers can be grouped into two general classes, namely general-purpose microprocessors and special-purpose microcomputers and microprocessors. General purpose microprocessors, such as the M68020 manufactured by Motorola, Inc., are designed to be programmable by the user to perform any of a wide range of tasks, and are therefore often used as the central processing unit in equipment such as personal computers. Such general-purpose microprocessors, while having good performance for a wide range of arithmetic and logical functions, are of course not specifically designed for or adapted to any particular one of such functions. In contrast, special-purpose microcomputers are designed to provide performance improvement for specific predetermined arithmetic and logical functions for which the user intends to use the microcomputer. By knowing the primary function of the microcomputer, the designer can structure the microcomputer in such a manner that the performance of the specific function by the special-purpose microcomputer greatly exceeds the performance of the same function by the general-purpose microprocessor regardless of the program created by the user.

One such function which can be performed by a special-purpose microcomputer at a greatly improved rate is digital signal processing, specifically the computations required for the implementation of digital filters and for performing Fast Fourier Transforms. Because such computations consist to a large degree of repetitive operations such as integer multiply, multiple-bit shift, and multiply-and-add, a special-purpose microcomputer can be constructed specifically adapted to these repetitive functions. Such a special-purpose microcomputer is described in U.S. Pat. No. 4,577,282, assigned to Texas Instruments Incorporated. The specific design of a microcomputer for these computations has resulted in sufficient performance improvement over general purpose microprocessors to allow the use of such special-purpose microcomputers in real-time applications, such as speech and image processing.

The increasing demands of technology and the marketplace make desirable even further structural and process improvements in processing devices, systems and methods of operation. These demands have lead to increasing the performance of single-chip devices and single systems as state-of-the-art silicon processing technologies allow. However, some performance-hungry applications such as video conferencing, 3D graphics and neural networks require performance levels over and above that which can be achieved with a single device or system. Many such applications benefit from parallel processing.

However, performance gains from parallel processing are improved when communication overhead between processors is minimized. Thus, improvements are desirable which enhance interprocessor communications, and thus software and system development.

SUMMARY OF THE INVENTION

Among the objects of the present invention are to provide improved data processing and processing architectures and methods. Efficiency in data processing is greatly enhanced by using improved communication port structures and methods that enable parallel architecture combinations custom to applications.

The data processing device of the invention has one or more communication ports each capable of connecting directly to another data processing device of the invention or any other data device having compatible arbitration and handshaking signals. Contained within each communication port is a controller that provides interfacing signals for communication with other communication ports or data devices with compatible interface signals.

Each communication port has first-in-first-out (FIFO) buffers that are used to buffer incoming and outgoing data between each communication port and the processor of the data processing device.

Other features of the communication port include the ability to halt and restart data transfers at the communication port without loss of data. The feature is advantageous in system development, debugging, and use.

Using the data processing devices of the invention, they are interconnected in systems, examples having the form of a tree, bidirectional ring, two dimensional mesh, three dimensional grid and four dimensional hypercube resulting in an unlimited variety of parallel processing system architectures, while at the same time permitting any component on any device to communicate with any other component on any other device in the system connected via communication port or external buses. Multiple ports are interconnected between high traffic pairs of devices to provide additional communication bandwidth.

Other device, system and method forms of the invention are also disclosed and claimed herein. Other objects of the invention are disclosed and still other objects will be apparent from the disclosure herein.

BRIEF DESCRIPTION OF THE DRAWINGS

The novel features believed characteristic of the invention are set forth in the appended claims. The preferred embodiments of the invention as well as other features and advantages thereof will be best understood by reference to the detailed description which follows, read in conjunction with the accompanying drawings, wherein:

FIG. 7a is an electrical diagram, in block form, of the controller of the microcomputer of FIG. 1.

FIG. 7b is a timing diagram illustrating the pipelining of instruction codes performed by the controller of FIG. 7a.

FIG. 8a is a chart illustrating the properties of a delayed branch instruction, trap instruction and a delayed branch instruction.

Corresponding numerals and other symbols refer to corresponding parts in the various figures of drawings except where the context indicates otherwise.

DETAILED DESCRIPTION OF THE PREFERRED EMBODIMENT

Figure 1:
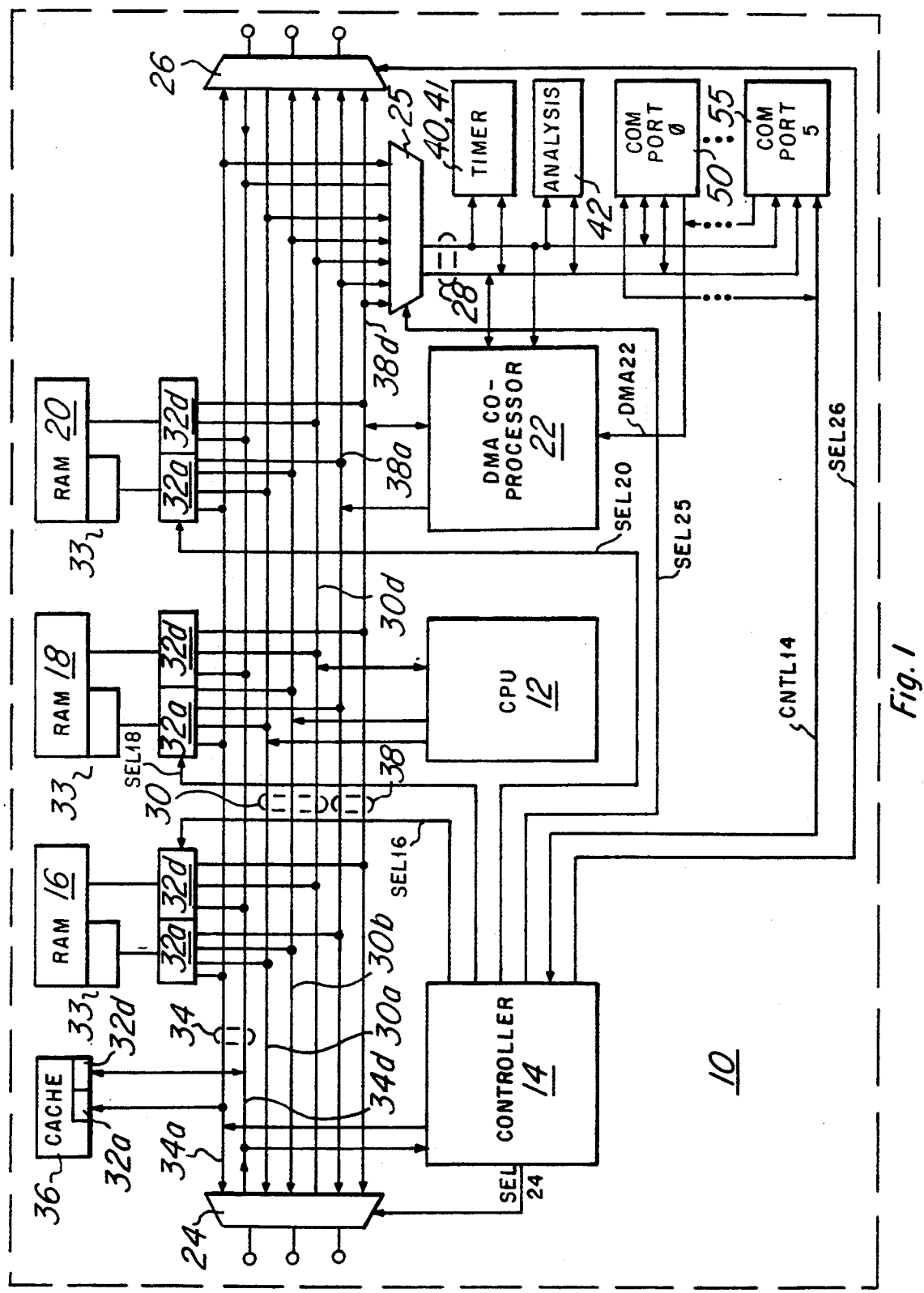
FIG. 1 is an electrical diagram, in block form, of a microcomputer constructed according to the invention.

Referring now to FIG. 1, the architecture of a microcomputer 10 is shown, said microcomputer being specially adapted to digital signal processing and incorporating the instant invention. The major functional blocks of microcomputer 10 are constituted by central processing unit (CPU) 12, controller 14, and direct memory access (DMA) coprocessor 22. The memory contained in microcomputer 10 according to this embodiment of the invention includes random access memories (RAMs) 16 and 18, and read-only memory (ROM) 20. RAMs 16 and 18 contain, in this embodiment, $2^{10}$, or 1K, words; ROM 20 contains $2^{12}$, or 4K, words. External connection is made by way of peripheral ports 24 and 26, which multiplex various bus signals onto external terminals of microcomputer 10 and which provide special purpose signals for communication to external devices which are to receive and send data via such external terminals. Connected to peripheral port 25 is peripheral bus 28, which is adapted to be connected to various peripheral function blocks as will be explained hereinbelow.

Data communication within microcomputer 10 can be effected by way of data bus 30. Data bus 30 contains a set of data lines 30d which are dedicated to the communication of data signals among memories 16, 18 and 20, peripheral ports 24, 25 and 26, and CPU 12. In this embodiment of the invention, data bus 30 contains thirty-two data lines in set 30d; accordingly, the data signals communicated among memories 16, 18 and 20, peripheral ports 24, 25 and 26, and CPU 12 are considered as thirty-two bit words. Data bus 30 further contains a first set of address lines 30a and a second set of address lines 30b, both of which are for communication of address signals corresponding to memory locations in memories 16, 18 and 20. In this embodiment of the invention, data bus 30 contains thirty-two address lines in each of sets 30a and 30b. Address lines 30a and 30b are also connected among CPU 12, peripheral ports 24, 25 and 26, and memories 16, 18 and 20. As is evident from FIG. 1, memories 16, 18 and 20 each have two ports 32a and 32d. Each of ports 32a are connected to address lines 30a and 30b of data bus 30, and receive the address signals presented thereupon to provide access to the corresponding memory location by way of port 32d to data lines 30d of data bus 30.

Microcomputer 10 also effects communication by way of program bus 34. Similarly as data bus 30, program bus 34 contains a set of data lines 34d connected to ports 32d of memories 16, 18 and 20. Data lines 34d of program bus are also connected to peripheral ports 24, 25 and 26, and to controller 14. Program bus 34 further contains a set of address lines 34a, which are connected to ports 32a of memories 16, 18 and 20, to peripheral ports 24, 25 and 26, and to controller 14. Also connected to address bus 34 is instruction cache 36 which also has ports 32a and 32d connected to address lines 34a and data lines 34d, respectively. Instruction cache 36 is a small (128 word) high speed memory which is used to retain the most recently used instruction codes so that, if external memory devices are used for program storage, the retrieval of repetitively used instructions can be effected at the same rate as from memories 16, 18 and 20. Detailed construction and operation of instruction cache 36 is given hereinbelow. Controller 14 contains such circuitry as required to decode instruction codes received on data lines 34d of program bus 34 into control signals which control the specific logic circuitry contained in all blocks of microcomputer 10. FIG. 1 illustrates lines $SEL_{16}$, $SEL_{18}$, $SEL_{20}$, $SEL_{24}$, $SEL_{25}$ and $SEL_{26}$ which carry certain of these control signals to control access of microcomputer 10 to memories 16, 18, and 20, and peripheral ports 24, 25 and 26, respectively. Control signals CNTL14 provide communication controls between CPU 12 and communication ports 50 through 55; other such control signals generated by controller 14 are not shown in FIG. 1, for purposes of clarity. Because of its connection to instruction cache 36 and to controller 14, program bus 34 is used primarily for the addressing and communication of instruction codes contained in memories 16, 18 and 20. According to the invention, such instruction codes can reside in any of memories 16, 18 and 20, or in external memory, without designation of any specific locations as dedicated to program memory.

DMA coprocessor 22 is connected to memories 16, 18 and 20 by way DMA bus 38. Similarly as data bus 30 and program bus 34, DMA bus 38 has a set of data lines 38d which are connected to ports 32d of memories 16, 18 and 20. DMA bus 38 further has a set of address lines 38a connected to ports 32a of memories 16, 18 and 20. DMA coprocessor 22 is also connected to peripheral bus 28, and to peripheral ports 24, 25 and 26. DMA coprocessor 22 effects direct memory access operations, by which blocks of data stored within the memory space of microcomputer 10 may be moved from one area of memory (the source) to another (destination). The source area of memory may be within memories 16, 18 or 20, or in memory devices external to microcomputer 10 which are connected to the terminals served by peripheral port 24 and 26, and the destination of the block of data may be in all of such memories (except of course ROM 20). It is apparent from the construction of microcomputer 10 as shown in FIG. 1, and from the descriptive name given (DMA coprocessor 22), that such DMA operations may be effected by DMA coprocessor 22 in microcomputer 10 without requiring the intervention of CPU 12.

At the conclusion of a block transfer, the DMA coprocessor 22 can be programmed to do several things: an interrupt can be generated to signal that the block transfer is complete; the DMA channel can stop until reprogrammed; or most importantly, the DMA channel can autoinitialize itself at the start of the next block transfer for effectuating another block transfer by obtaining a new source and destination area space within memories 16, 18 or 20 or in memory devices external to microcomputer 10 which are connected to the terminals served by peripheral port 24 and 26. This autoinitalization for effectuating another block transfer is done without any intervention by the CPU.

Figure 2A:
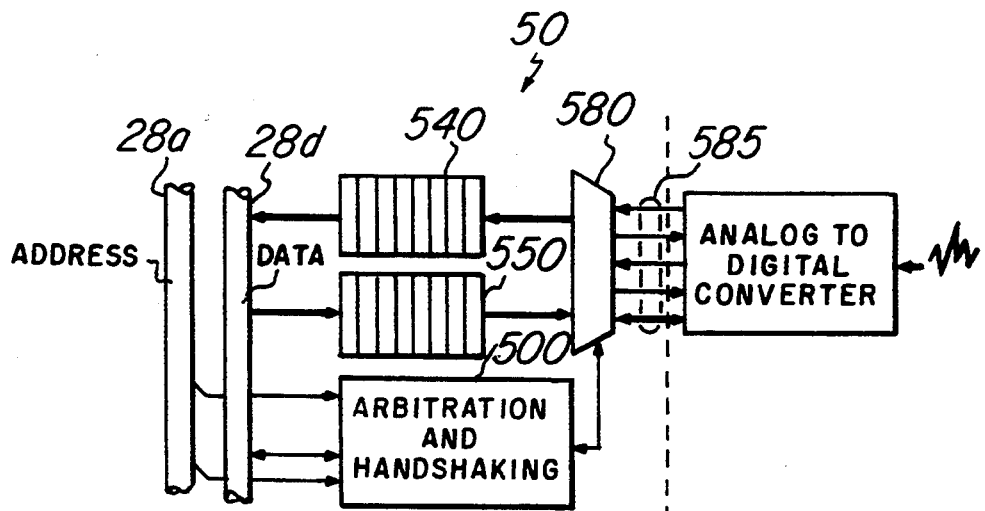
FIG. 2a is an electrical diagram, in block form, of the communication port of the microcomputer of FIG. 1 interfaced to an analog to digital converter.
Figure 2B:
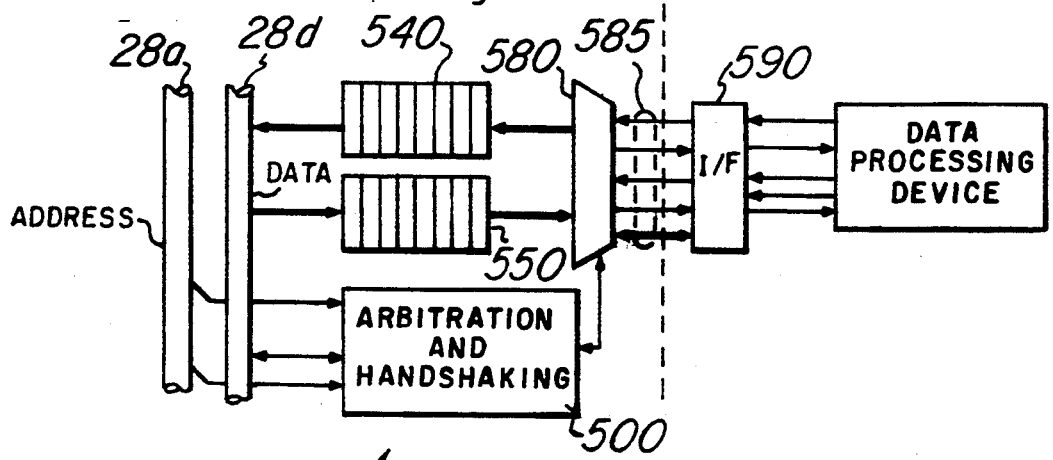
FIG. 2b is an electrical diagram, in block form, of the communication port of the microcomputer of FIG. 1 interfaced to a data processing device via an interface module.

Six specialized communication ports 50 through 55 are served by peripheral port 25 and peripheral bus 28. Communication ports 50 through 55 provide additional means for external data transfers. Control signals DMA22 provide communication controls between DMA coprocessor 22 and communication ports 50–55. FIG. 2a and 2b illustrate the versatility of the communication ports. In FIG. 2a, the communication port is connected to a stream oriented device such as an analog to digital (A/D) converter. It should be noted that control and data signals 585 are properly matched. Utilizing the input and output first-in-first-out (FIFO) buffers 540 and 550, the communication port provides a buffered interface for the stream oriented device. Other stream oriented devices include a digital to analog (D/A) converter. FIG. 2b shows another data processing device connected to the communication via interface 590. It is apparent from the examples in FIG. 2a and 2b that interfacing to the communication ports is readily accomplished through the use of devices with proper interface signals 585 built onto the device or through the use of an interfacing module 590 that is designed to provide proper interface signals 585 to existing devices not built to accommodate the communication port.

Each one of the communication ports 50 through 55 provide a bidirectional interface 580 with an eight word (thirty-two bits/word) deep input first-in-first-out (FIFO) buffer 540 and an eight word deep output FIFO buffer 550. Arbitration and handshaking circuitry 500 is self contained within each communication port for effectuating external communications via control and data lines 585. A detailed description of the communication ports 50 through 55 is discussed below. It should be noted that the preferred embodiment of microcomputer 10 has a special split-mode operation that utilizes the DMA coprocessor 22 and communication ports 50 through 55. In split-mode one DMA channel is transformed into two channels: one DMA channel is dedicated to receiving data from a communication port (the source) and writing it to a location in the memory map (destination); and one DMA channel is dedicated to reading data from a location in the memory map (the source) and writing it to a communication port (destination). Details of the split-mode DMA will be further described below.

There are six DMA channels in the preferred embodiment; each of them are capable of performing all of the functions described hereinabove. Since all six DMA channels use the same DMA bus 38 and peripheral bus 28 to effectuate its block transfers, conflicts for DMA accesses might occur between the channels. Thus, the DMA coprocessor 22 also functions to arbitrate requests from any or all of the six DMA channels requesting access to the DMA bus 38 and peripheral bus 28. The DMA coprocessor 22 implements a rotating priority scheme to insure that any channel requesting bus access will in turn be serviced. Details of the rotating priority scheme will be further described below.

Ports 32a are primarily multiplexers, so that selection of one set of address lines 30a, 30b, 34a, or 38a for connection to its associated memory 16, 18 or 20 can be effected. Similarly, each of ports 32d are connected to data lines 30d of data bus 30, for communication of the data stored (or to be stored) by the addressed memory location. Memories 16, 18 and 20 each contain an address decoder 33, connected to its port 32a, for decoding the memory address signal presented on the selected one of said address lines 30a, 30b, 34a, or 38a. Based on the output from address decoder 33, access is granted to the memory location specified by the selected address signal. RAMs 16 and 18, and ROM 20, are all constructed so that the selected memory location is sensed and/or written based upon the output of address decoder 33 therewithin. Ports 32d provide a high-impedance output to the data lines of buses 30, 34 and 38 connected thereto when not selected, thereby preventing data conflicts on buses 30, 34 and 38.

Each of the sets of address lines in data bus 30, program bus 34 and DMA bus 38 consist of thirty-two conductors in the preferred embodiment of this invention. Accordingly, the maximum number of memory locations addressable by way of the sets of address lines in data bus 30, program bus 34 and DMA bus 38 is $2^{32}$ words (four Giga-words) of thirty-two bits. However, since the total number of words in memories 16, 18 and 20 is 6K, a large amount of the addressable memory space of microcomputer 10 may reside in memory devices external to microcomputer 10. Such external memory has address decoding capability, similar to the on-chip memories 16, 18 and 20, and responds to the generated address signals on the address lines of buses 30, 34 and 38 in a similar fashion. In the preferred embodiment, a single memory address space is provided for microcomputer 10, so that a given address signal presented on any given set of address lines of buses 30, 34 and 38 will address a memory location in only one of memories 16, 18 and 20. Therefore, using the example of address lines 30a being selected by ports 32a, a given address signal on address lines 30a will correspond to a memory location in only one of memories 16, 18 and 20, or in external data, program or input/output memory. It should be noted that microcomputer 10 is organized in such a fashion that it is preferable that external data and program memory be accessed by way of peripheral port 24 and 26, and that internal input/output memory be accessed by way of peripheral port 25.

Peripheral bus 28 is connected between peripheral port 25 and various peripheral functions. Peripheral bus is therefore selectively connectable to any one of buses 30, 34 and 38, depending upon the control of peripheral port 25 by controller 14. In this manner, peripheral bus 28 appears to the remainder of microcomputer 10 as an off-chip bus. This provides for such functions as normally provided by peripheral devices to be incorporated into microcomputer 10; communications with such peripheral devices are performed by the remainder of microcomputer 10 in much the same way as an off-chip device. By way of example, microcomputer 10 of FIG. 1 has timer 40 and 41, analysis module 42 and six communication ports 50-55 attached to peripheral bus 28. Similarly as the other buses described above, peripheral bus 28 contains data lines 28d and address lines 28a. In contrast to the communication between memories 16, 18 and 20 and the remainder of microcomputer 10 connected to buses 30, 34 and 38, however, address lines 28a of peripheral bus 28 are used to select one of said peripherals 40, 41, 42 or communication ports 50-55 connected thereto to receive or transmit data from or to data lines 28d of peripheral bus 28. In addition, as will be described below, control registers in DMA coprocessor 22 and in communication ports 50-55 are also accessed by way of peripheral bus 28.

The construction and operation of a CPU and its addressing modes similar to CPU 12 is described in the incorporated U.S. Pat. No. 4,912,636. However, CPU 12 is modified to embody a larger multiplier capable of handling thirty-two bits by thirty-two bits integer multiplies and forty bits by forty bits floating point multiplies. CPU 12 incorporates a reciprocal seed ROM used to compute an approximation to 1/B where B is the divisor. A reciprocal square root seed ROM is also present for generating a seed approximating the reciprocal of the square root of the operand for square root calculations. The advantages and details about the operation of the seed ROM is described in U.S. Pat. No. 4,878,190 assigned to Texas Instruments Incorporated (TI Docket 13241) which is incorporated herein by reference.

Figure 1A:
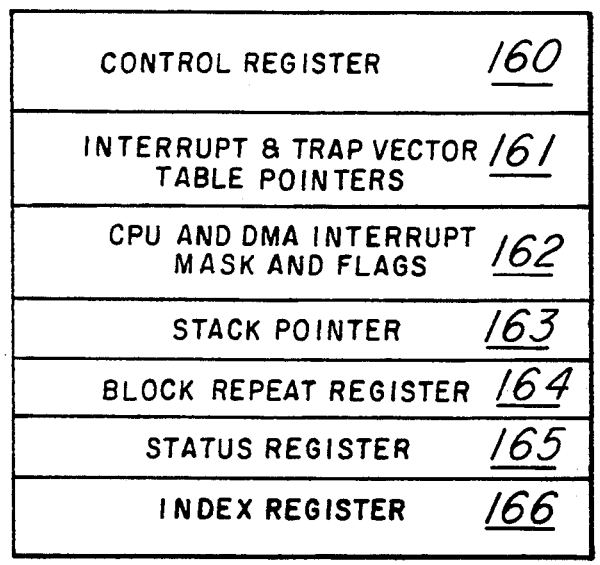
FIG. 1a is a block diagram illustrating control registers of the CPU of the microcomputer of FIG. 1.

FIG. 1a shows a number of control registers 160 of the preferred embodiment of CPU 12. Interrupt and trap vector table pointers 161 are each 32-bit registers. These registers reside in a CPU 12 expansion register-file located away from CPU 12 unlike other control registers for CPU 12 that reside within CPU 12. Since interrupt and trap vector table pointers 161 are control registers of CPU 12, CPU 12 accesses the registers at various times. Thus, instructions are available to perform a load from an expansion register to a primary register for use by CPU 12. Conversely, a command is available to perform a load from a primary register to an expansion register when the primary register is loaded with control data from another control register within CPU 12.

The interrupt vector table pointer (IVTP) points to the interrupt vector table (IVT) which contains addresses of the first instruction of interrupt routines.

The trap vector table pointer (TVTP) points to the trap vector table (TVT) which contains addresses of the first instruction of trap routines.

Interrupt and trap routines are instructions that are executed during the execution of the main program to accommodate situations confronted by microcomputer 10 of the preferred embodiment.

The CPU and DMA interrupt mask and flags 162 are 32-bit registers. The mask registers are used to enable or disable interrupts while the flag registers are set by devices indicating a condition has occurred.

The stack pointer (SP) 163 is a 32-bit register that contains the address of the top of the system stack. The SP points to the last element pushed onto the stack.

Block repeat register 164 are 32-bit registers containing the starting and ending address of the block of program memory to be repeated when operating in the repeat mode.

The status register 165 is a 32-bit register containing global information relating to the state of CPU 12.

Index register 166 are 32-bit registers used by the auxiliary register arithmetic units for indexing addresses. The incorporated U.S. Pat. No. 4,912,636 describes the operations of indexing addresses.

Figure 3:
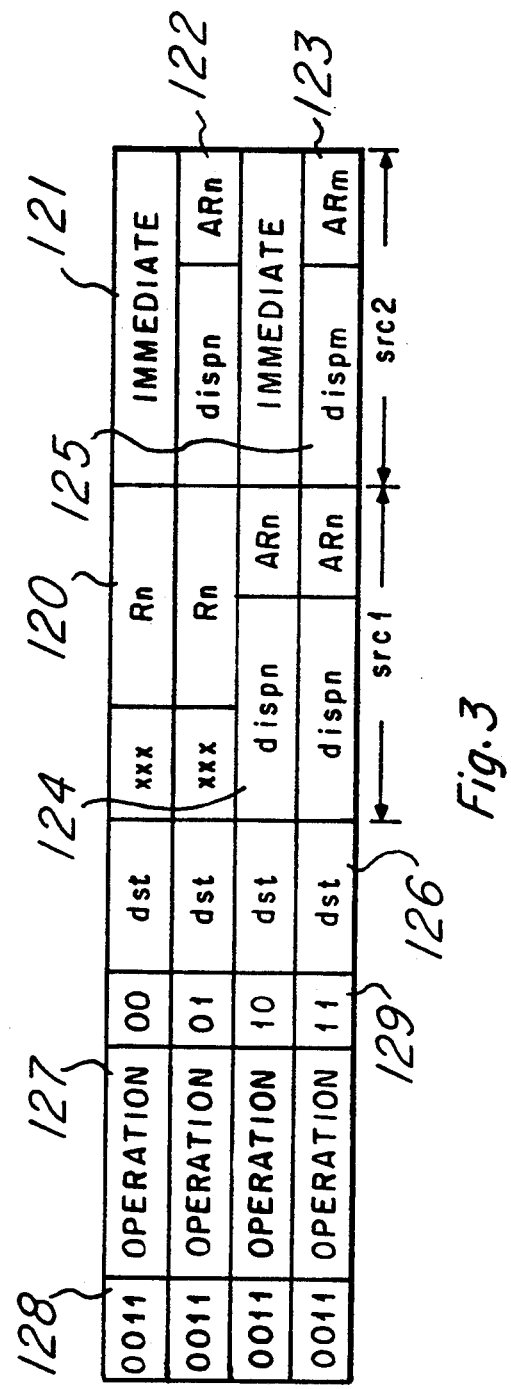
FIG. 3 is a diagram illustrating four instruction formats of the microcomputer of FIG. 1.
Figure 4:
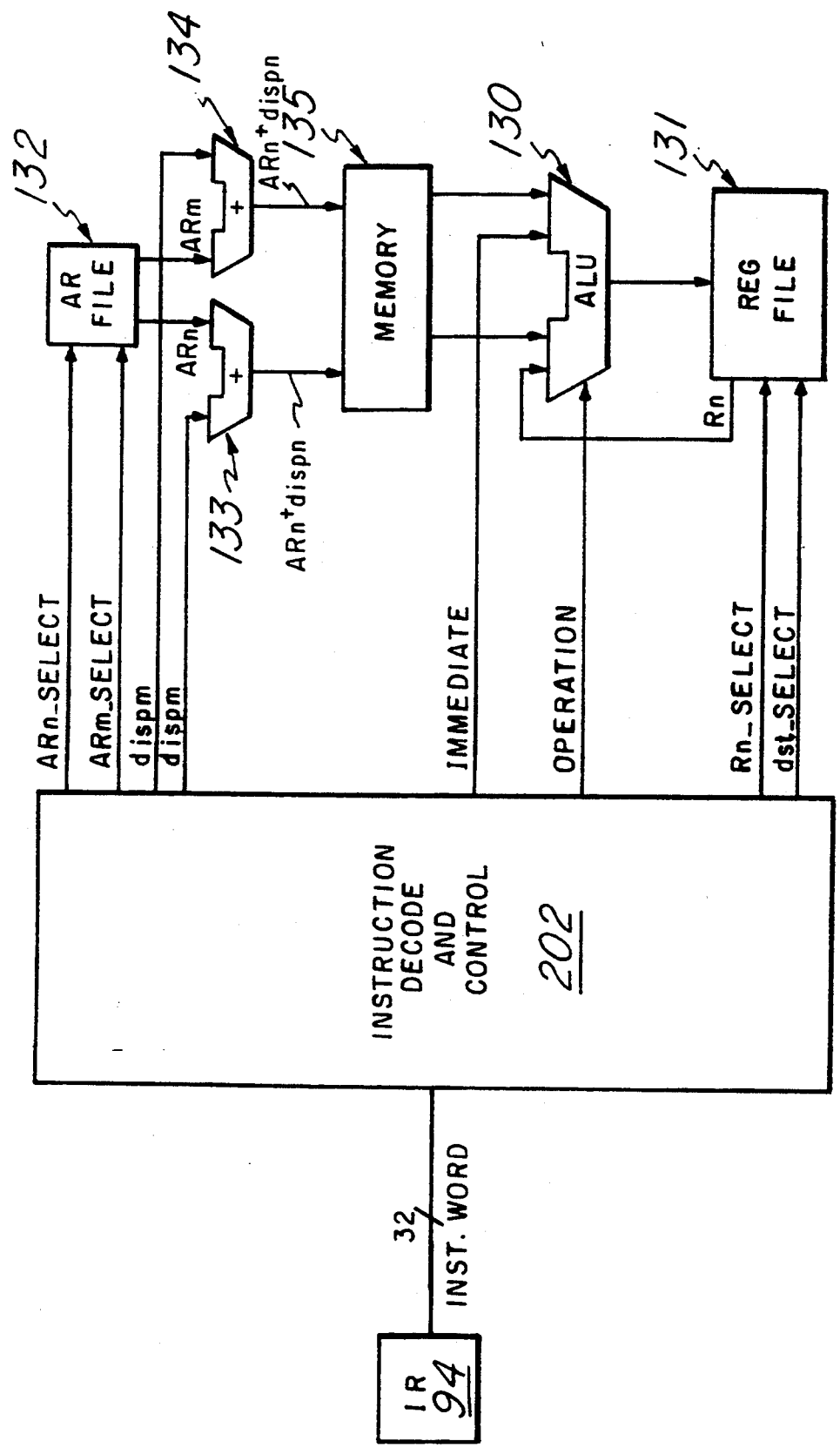
FIG. 4 is an electrical diagram, in block form, of the data flow which occurs when invoking the four instruction formats illustrated in FIG. 3.

The preferred embodiment has improved three-operand addressing instructions. The three-operand addressing not only includes two data fetches for operands and one data load for the result into a register file but further features also. The data fetches selectively supported by the preferred embodiment are: immediate data from the instruction, memory data located at a displacement of an auxiliary register, and a register in the register file. The four instruction formats are shown in FIG. 3. The description herein below mainly discusses the improvement of the instruction formats thus concentrating on the scr1 and scr2 field. The two scr1 and scr2 fields determine the operands for ALU 130 shown in FIG. 4. Rn field 120 of the instruction is a five bit field used to address a register in register file 131 as shown in FIG. 4. Immediate field 121 of the instruction is immediate data residing in the instruction word that is decoded and extracted by instruction decode and control 202. ARn 122 and ARm 123 correspond with dispn 124 and dispm 125 of the instruction respectively to effectuate indirect addressing as described in the incorporated U.S. Pat. No. 4,912,636. AR file 132 and auxiliary ALU 133 and 134 are used to effectuate the indirect addresses for the data operands residing in memory 135.

Referring to FIG. 4, the instruction register 94 containing the instruction word is decoded by instruction decode and control 202 where appropriate control and data signals are generated. For example, the ARn field 122 and ARm field 123 are decoded, and signals ARn_select and ARm_select are generated to select address data from address register (AR) file 132. The fields dispn 124 and dispm 125 are decoded and extracted from the instruction word and sent to auxiliary ALU 133 and 134 where the address data from AR file 132 are combined. Addresses corresponding to locations in memory 135 are generated and operands are fetched and fed to ALU 130. The immediate field 121 is decoded and extracted from the instruction word and becomes an operand to ALU 130. The Rn field 120 is decoded by instruction decode and control 202 and signal Rn_select is generated to select the contents of Rn from register file 131. The dst field 126 is decoded by instruction decode and control 202 and signal dstselect is generated to select the destination register to store the result of the operation from ALU 130 to register file 131. The operation field is decoded and extracted by the instruction decode and control 202 and signal dst_select tion of ALU 130. Since fields 128 and 129 are not pertinent to the understanding of the improved three-operand instruction and for purposes of clarity, they are not discussed.

The four additional three-operand instruction formats shown in FIG. 3 are developed to support the most common form of data addressing required for compiled code. As a result these instructions reduce code size for both hand assembled and compiled code. Thus, noticeable improvements in performance is realized in the speed and efficiency at which microcomputer 10 can perform its programmed tasks.

Figure 5A:
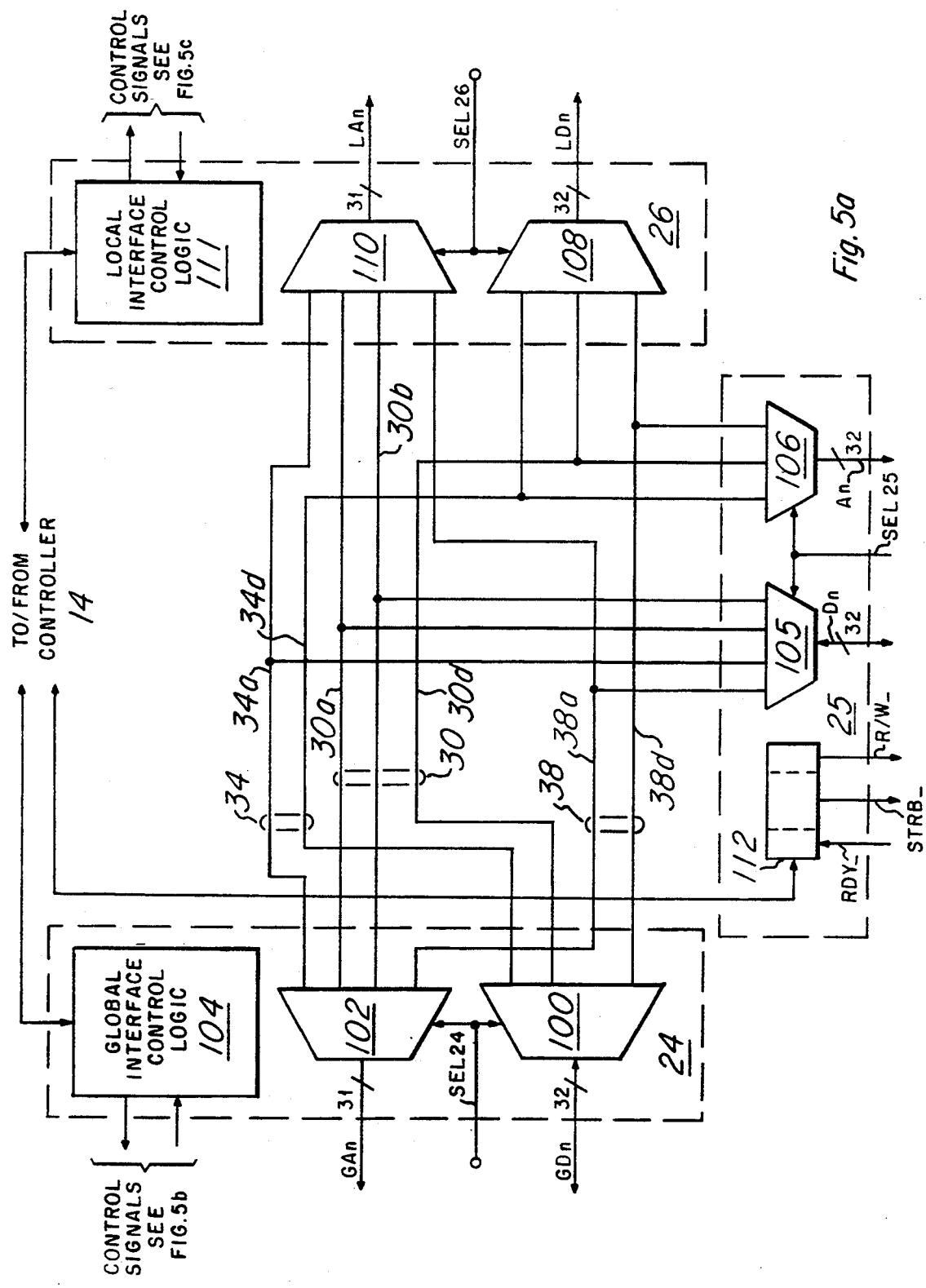
FIG. 5a is an electrical diagram, in block form, of the peripheral ports of the microcomputer of FIG. 1.

Referring now to FIG. 5a, the construction of peripheral ports 24, 25 and 26 is described in detail. Peripheral ports 24, 25 and 26 are connected to data bus 30, program bus 34 and DMA bus 38, as described with reference to FIG. 1. Peripheral port 24 consists primarily of a multiplexer 100, which selectively connects external data lines $GD_n$ to data lines 30d of data bus 30, data lines 34d of program bus 34 or data lines 38d of DMA bus 38, responsive to control signals generated on lines $SEL_{24}$ by controller 14. It should be noted that multiplexer 100 creates a bidirectional connection between external data lines $GD_n$ and the data lines 30d, 34d or 38d, so that data may be received or presented therebetween. In addition, multiplexer 102 selectively connects external address lines $GA_n$ to address lines 30a or 30b of data bus 30, address lines 34a of program bus 34, or address lines 38a of DMA bus 38, also responsive to controller 14 depending upon which data lines are connected by multiplexer 100 to data lines $GD_n$.

Peripheral port 26 is similarly constructed as peripheral port 24, but is controlled by lines $SEL_{26}$ independently from peripheral port 24, so that communication at peripheral ports 24, 25 and 26 can occur simultaneously and independently, so long as the buses 30, 34 and 38 used by the ports are not simultaneously used. Peripheral port 26 is an additional peripheral port having the same capabilities as peripheral port 24. Accordingly, as shown in FIG. 5a, peripheral port 26 contains multiplexers 108 and 110 corresponding to like components in peripheral port 24.

Figure 5B:
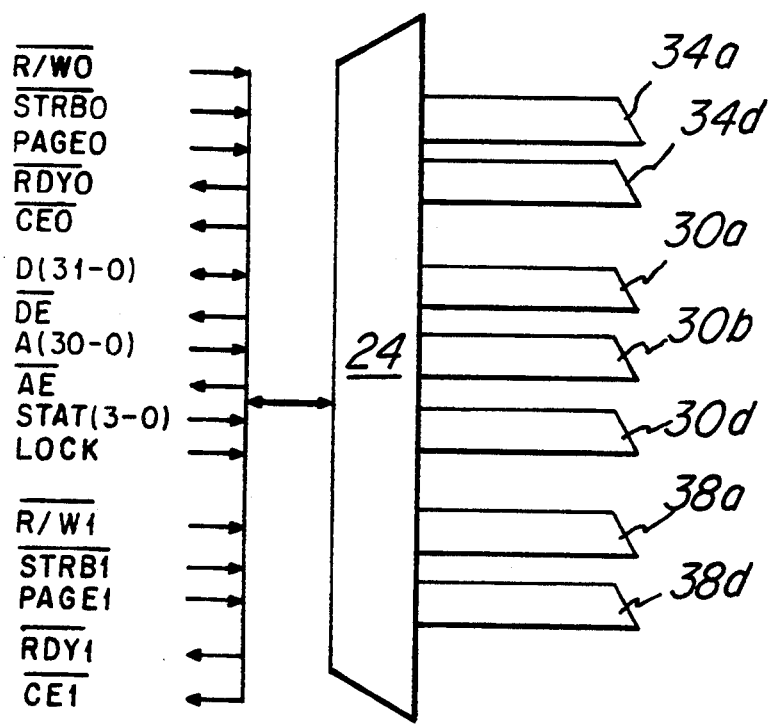
FIG. 5b is a electrical diagram, in block form, illustrating interface signals of the global peripheral port of the microcomputer of FIG. 1.
Figure 5C:
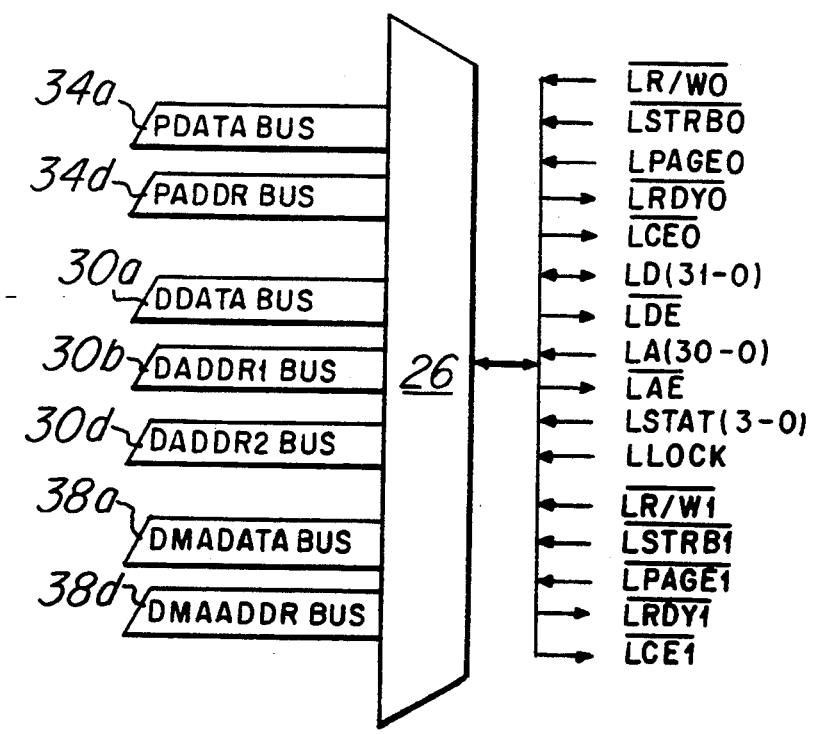
FIG. 5c is a electrical diagram, in block form, illustrating interface signals of the local peripheral port of the microcomputer of FIG. 1.

Control and operation of the two external peripheral interfaces of the preferred embodiment—global peripheral port 24 (or global memory interface) and local peripheral port 26 (or local memory interface)—are discussed in detail. For purposes of this discussion the two ports are functionally identical, thus discussion of global peripheral port 24 also applies to local peripheral port 26. FIG. 5b shows the interface signals for global peripheral port 24, and FIG. 5c shows the interface signals for local peripheral port 26.

Global peripheral port 24 has separate 32-bit data and 32-bit address buses. Two sets of control signals are available for interfacing with multiple devices. Multiple sets of control signals are advantageous particularly if interfacing devices operate at access times slower than peripheral port 24. Thus, time spent waiting (idle time) for an external device to respond is used to access another external device and the data throughput of global peripheral port 24 is maximized.

Control signals STRB1_ and STRB2_ are shown in FIG. 5b. It should be noted that signal names shown in Figures with over bars above the signal name represent the corresponding signal name having a suffix "_" in the text. STRB1_ and STRB2_ become active signalling the interval when valid information and control signals can be passed between peripheral port 24 and the connected external device. R/W0_ and R/W1_ specify the direction of the flow of data through peripheral port 24. Control signals RDY0_ and RDY1_ are used to signal valid data is available on the selected bus. Control signals PAGE0 and PAGE1 signal the transition to perform data operations on another page of a page partitioned memory.

Figure 5D:
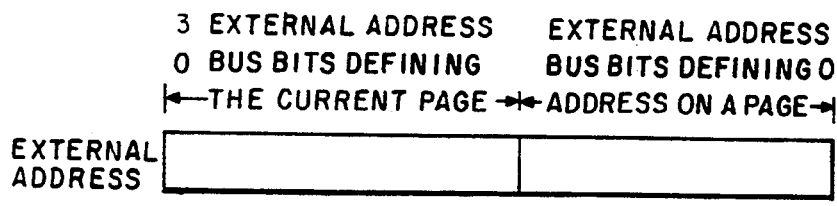
FIG. 5d is a block diagram illustrating the relationship between the bits of an address defining the current page and the bits of an address defining the addresses on a current page.

The preferred embodiment, using a 32-bit address, has independent page sizes for the different sets of external strobes. This feature allows great flexibility in the design of external high speed, high-density memory systems and the use of slower external peripheral devices. Both the STRB0 PAGESIZE and STRB1 PAGESIZE fields work in the same manner. The PAGESIZE field specifies the page size for the corresponding strobe. The PAGESIZE field is discussed herein-below. Table 1.1 illustrates the relationship between the PAGESIZE field and the bits of the address used to define the current page and the resulting page size. The page size is from 256 words, with external address bus bits 7-0 defining the location on a page, up to 2 Giga words with external address bus bits 30-0 defining the location on a page. FIG. 5d illustrates an external address showing the relationship between the bits of an address defining the current page and the bits of an address defining the addresses on a current page. As shown in Table 1.1, the field for external address bus bits defining addresses on a page increases as the number of addressable words on a page increases i.e. page size. Inversely, the number of bits defining the current page increases as the number of addressable pages increases. The trade off between bits used to address pages and words is shown in Table 1.1.

TABLE 1.1

| PAGESIZE field | External address bus bits defining the current page | External address bus bits defining address on a page | Page size (32-bit words) |
|---|---|---|---|
| 11111 | Reserved | Reserved | Reserved |
| 11110 | None | 30-0 | $2^{31} = 2G$ |
| 11101 | 30 | 29-0 | $2^{30} = 1G$ |
| 11100 | 30-29 | 28-0 | $2^{29} = 512M$ |
| 11011 | 30-28 | 27-0 | $2^{28} = 256M$ |
| 11010 | 30-27 | 26-0 | $2^{27} = 128M$ |
| 11001 | 30-26 | 25-0 | $2^{26} = 64M$ |
| 11000 | 30-25 | 24-0 | $2^{25} = 32M$ |
| 10111 | 30-24 | 23-0 | $2^{24} = 16M$ |
| 10110 | 30-23 | 22-0 | $2^{23} = 8M$ |
| 10101 | 30-22 | 21-0 | $2^{22} = 4M$ |
| 10100 | 30-21 | 20-0 | $2^{21} = 2M$ |
| 10011 | 30-20 | 19-0 | $2^{20} = 1M$ |
| 10010 | 30-19 | 18-0 | $2^{19} = 512K$ |
| 10001 | 30-18 | 17-0 | $2^{18} = 256K$ |
| 10000 | 30-17 | 16-0 | $2^{17} = 128K$ |
| 01111 | 30-16 | 15-0 | $2^{16} = 64K$ |
| 01110 | 30-15 | 14-0 | $2^{15} = 32K$ |
| 01101 | 30-14 | 13-0 | $2^{14} = 16K$ |
| 01100 | 30-13 | 12-0 | $2^{13} = 8K$ |
| 01011 | 30-12 | 11-0 | $2^{12} = 4K$ |
| 01010 | 30-11 | 10-0 | $2^{11} = 2K$ |
| 01001 | 30-10 | 9-0 | $2^{10} = 1K$ |
| 01000 | 30-9 | 8-0 | $2^9 = 512$ |
| 00111 | 30-8 | 7-0 | $2^8 = 256$ |
| 00110–00000 | Reserved | Reserved | Reserved |

Changing from one page to another has the effect of inserting a cycle in the external access sequence for external logic to reconfigure itself in an appropriate way. The memory interface control logic 104 keeps track of the address used for the last access for each STRB__. When an access begins, the page signal corresponding to the active STRB__ goes inactive if the access is to a new page. The PAGE0 and PAGE1 signals are independent of one another, each having its own page size logic.

Referring to FIG. 5b control signals CE0__ and CE1__ are control enable signals. CE0__ causes lines R/W0__, STRB0__ and PAGE0__ to be in the high-impedance state. Similarly, control signal CD1__ causes lines R/W1__, STRB1__ and PAGE1 to be in the high-impedance state.

The preferred embodiment has separate enable signals for the data bus and address bus. Signal DE__ controls the data bus which has 32-bits and signal AE__ controls the address bus which has 31-bits. There are 4-bits that are used to define the current status of the peripheral port as defined in Table 1.2. The status signals identify STRB0__ and STRB1__ accesses, data reads and writes, DMA reads and writes, program reads, and SIGI (SIGnal Interlock) reads.

Signal interlock is used in configurations where there is sharing of global memory by multiple processors. In order to allow multiple processors to access the global memory and share data in a coherent manner, handshaking and arbitration is necessary.

TABLE 1.2

| STAT3 | STAT2 | STAT1 | STAT0 | Status |
|---|---|---|---|---|
| 0 | 0 | 0 | 0 | STRB0__ access, program read |
| 0 | 0 | 0 | 1 | STRB0__ access, data read |
| 0 | 0 | 1 | 0 | STRB0__ access, DMA read |
| 0 | 0 | 1 | 1 | STRB0__ access, SIGI read |
| 0 | 1 | 0 | 0 | Reserved |
| 0 | 1 | 0 | 1 | STRB0__ access, data write |
| 0 | 1 | 1 | 0 | STRB0__ access, DMA write |
| 0 | 1 | 1 | 1 | Reserved |
| 1 | 0 | 0 | 0 | STRB1__ access, program read |
| 1 | 0 | 0 | 1 | STRB1__ access, data read |
| 1 | 0 | 1 | 0 | STRB1__ access, DMA read |
| 1 | 0 | 1 | 1 | STRB1__ access, SIGI read |
| 1 | 1 | 0 | 0 | Reserved |
| 1 | 1 | 0 | 1 | STRB1__ access, data write |
| 1 | 1 | 1 | 0 | STRB1 access, DMA write |
| 1 | 1 | 1 | 1 | Idle |

Control signal LOCK in the logic "0" state signals an interlocked access is under way. If LOCK__ is a logic "1" state, an interlocked access is not under way.

The memory map for the memory interface control registers is $00100000_h$ for the global memory interface control register and $00100004_h$ for the local memory interface control register. Since both the global and local memory interfaces are functionally identical for purposes of this discussion, references to the global memory interface also applies to the local memory interface. The global memory interface control register has bits defined in terms of logic "0"s and "1"s that control the global memory interface. The memory control register defines the page sizes used for the two strobes, when the strobes are active, wait states, and other similar operations that define the character of the global memory interface.

Figure 5E:
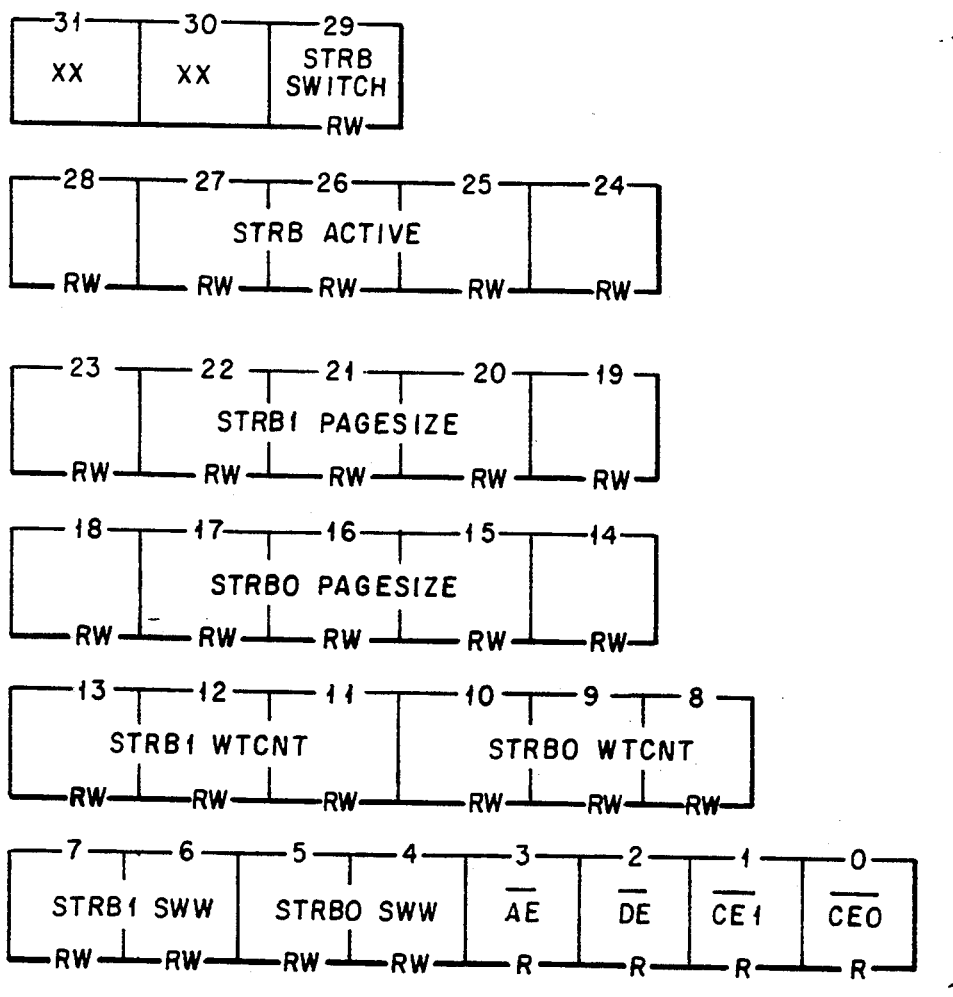
FIG. 5e is a block diagram illustrating the global peripheral interface control register of the microcomputer of FIG. 1.
Figure 5F:
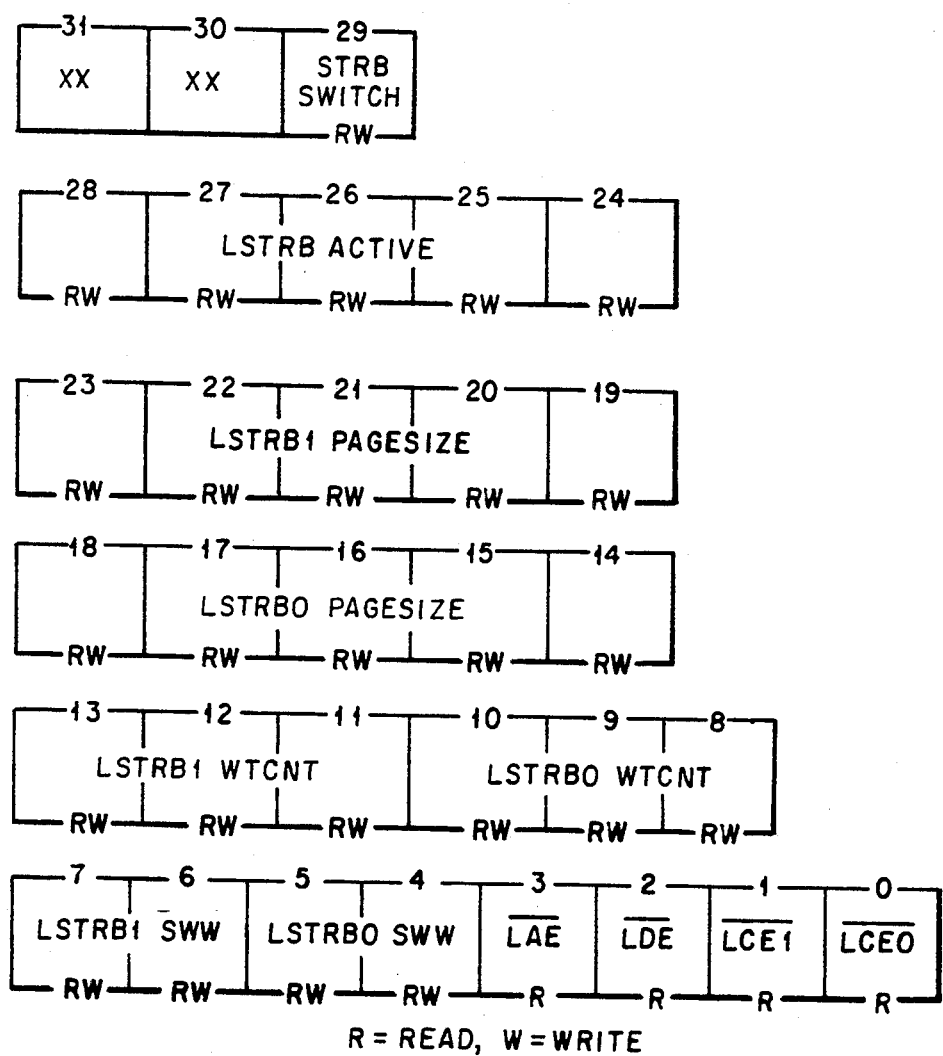
FIG. 5f is a block diagram illustrating the global peripheral interface control register of the microcomputer of FIG. 1.

The bit field definition of the global memory interface control register is shown in FIG. 5e. Table 2.1 defines the register bits, the register bit names, and the register bit functions. The bit field definition of the local memory interface control register is shown in FIG. 5f. Register bit functions and locations are very similar to global memory interface control register, thus Table 2.1 is adequate for describing the local memory interface control register.

TABLE 2.1

| Bit Position | Bit Definition | |
|---|---|---|
| 0 | CE0__ | Value of the external pin CE0__. The value is not latched. |
| 1 | CE1__ | Value of the external pin CE1__. The value is not latched. |
| 2 | DE__ | Value of the external pin DE__. The value is not latched. |
| 3 | AE__ | Value of the external pin AE__. The value is not latched. |
| 4–5 | STRB0 SWW | Software wait state generation for STRB0__ accesses. In conjunction with STRB0 WTCNT, this field defines the mode of wait-state generation. |

TABLE 2.1-continued

| Bit Position | Bit Definition | |
|---|---|---|
| 6-7 | STRB1 SWW | Software wait state generation for STRB1__ accesses. In conjunction with STRB1 WTCNT, this field defines the mode of wait-state generation. |
| 8-10 | STRB0 WTCNT | Software wait-state count for STRB0__ accesses. This field specifies the number of cycles to use when software wait-states are active. The range is zero (STRB0 WTCNT = 000) to seven (STRB0 WTCNT = 111). |
| 11-13 | STRB1 WCTNT | Software wait-state count for STRB1__ accesses. This field specifies the number of cycles to use when software wait-states are active. The range is zero (STRB1 WTCNT = 000) to seven (STRB1 WTCNT = 111) |
| 14-18 | STRB0 PAGESIZE | Page size for STRB0__ accesses. Specifies the number of most significant bits (MSBS) of the address to be used to define the bank size for STRB0__ accesses. |
| 19-23 | STRB1 PAGESIZE | Page size for STRB1__ accesses. Specifies the number of MSBs of the address to be used to define the bank size for STRB1__ accesses. |
| 24-28 | STRB ACTIVE | Specifies the address ranges over which STRB0__ and STRB1__ are active. |
| 29 | STRB SWITCH | When STRB SWITCH is 1, a single cycle is inserted between back to back reads which switch from STRB0__ to STRB1__ (or STRB1__ to STRB0__). When STRB SWITCH is 0, no cycle is inserted between these back to back reads. |
| 30-31 | Reserved | Read as 0. |

Table 2.2 illustrates the relationship between STRB ACTIVE and the address ranges over which STRB0__ and STRB1__ are active, and the size of the address range over which STRB0__ is active. STRB ACTIVE field controls global peripheral port 24, and LSTRB ACTIVE field controls local peripheral port 26. Table 2.3 illustrates the relationship between LSTRB ACTIVE and the address ranges over which LSTRB0__ and LSTRB1__ are active, and the size of the address range over which STRB0__ is active.

TABLE 2.2

| STRB ACTIVE field | STRB0__ active address range | STRB0__ active address range size | STRB1__ active address range |
|---|---|---|---|
| 11111 | Reserved | Reserved | Reserved |
| 11110 | 80000000-FFFFFFFF | $2^{31}$ = 2G | None |
| 11101 | 80000000-BFFFFFFF | $2^{30}$ = 1G | C0000000-FFFFFFFF |
| 11100 | 80000000-9FFFFFFF | $2^{29}$ = 512M | A0000000-FFFFFFFF |
| 11011 | 80000000-8FFFFFFF | $2^{28}$ = 256M | 90000000-FFFFFFFF |
| 11010 | 80000000-87FFFFFF | $2^{27}$ = 128M | 88000000-FFFFFFFF |
| 11001 | 80000000-83FFFFFF | $2^{26}$ = 64M | 84000000-FFFFFFFF |
| 11000 | 80000000-81FFFFFF | $2^{25}$ = 32M | 82000000-FFFFFFFF |
| 10111 | 80000000-80FFFFFF | $2^{24}$ = 16M | 81000000-FFFFFFFF |
| 10110 | 80000000-807FFFFF | $2^{23}$ = 8M | 80800000-FFFFFFFF |
| 10101 | 80000000-803FFFFF | $2^{22}$ = 4M | 80400000-FFFFFFFF |
| 10100 | 80000000-801FFFFF | $2^{21}$ = 2M | 80200000-FFFFFFFF |
| 10011 | 80000000-800FFFFF | $2^{20}$ = 1M | 80100000-FFFFFFFF |
| 10010 | 80000000-8007FFFF | $2^{19}$ = 512K | 80080000-FFFFFFFF |
| 10001 | 80000000-8003FFFF | $2^{18}$ = 256K | 80040000-FFFFFFFF |
| 10000 | 80000000-8001FFFF | $2^{17}$ = 128K | 80020000-FFFFFFFF |
| 01111 | 80000000-8000FFFF | $2^{16}$ = 64K | 80010000-FFFFFFFF |
| 01110- 00000 | Reserved | Reserved | Reserved |

TABLE 2.3

| LSTRB ACTIVE field | LSTRB0__ active address range | LSTRB0__ active address range size | LSTRB1__ active address range |
|---|---|---|---|
| 11111 | Reserved | Reserved | Reserved |
| 11110 | 00000000-7FFFFFFF | $2^{31}$ = 2G | None |
| 11101 | 00000000-3FFFFFFF | $2^{30}$ = 1G | 40000000-7FFFFFFF |
| 11100 | 00000000-1FFFFFFF | $2^{29}$ = 512M | 20000000-7FFFFFFF |
| 11011 | 00000000-0FFFFFFF | $2^{28}$ = 256M | 10000000-7FFFFFFF |
| 11010 | 00000000-07FFFFFF | $2^{27}$ = 128M | 08000000-7FFFFFFF |
| 11001 | 00000000-03FFFFFF | $2^{26}$ = 64M | 04000000-7FFFFFFF |
| 11000 | 00000000-01FFFFFF | $2^{25}$ = 32M | 02000000-7FFFFFFF |
| 10111 | 00000000-00FFFFFF | $2^{24}$ = 16M | 01000000-7FFFFFFF |

TABLE 2.3-continued

| LSTRB ACTIVE field | LSTRB0__ active address range | LSTRB0__ active address range size | LSTRB1__ active address range |
|---|---|---|---|
| 10110 | 00000000-007FFFFF | $2^{23}$ = 8M | 00800000-7FFFFFFF |
| 10101 | 00000000-003FFFFF | $2^{22}$ = 4M | 00400000-7FFFFFFF |
| 10100 | 00000000-001FFFFF | $2^{21}$ = 2M | 00200000-7FFFFFFF |
| 10011 | 00000000-000FFFFF | $2^{20}$ = 1M | 00100000-7FFFFFFF |
| 10010 | 00000000-0007FFFF | $2^{19}$ = 512K | 00080000-7FFFFFFF |
| 10001 | 00000000-0003FFFF | $2^{18}$ = 256K | 00040000-7FFFFFFF |
| 10000 | 00000000-0001FFFF | $2^{17}$ = 128K | 00020000-7FFFFFFF |
| 01111 | 00000000-0000FFFF | $2^{16}$ = 64K | 00010000-7FFFFFFF |
| 01110-00000 | Reserved | Reserved | Reserved |

Figure 5G:
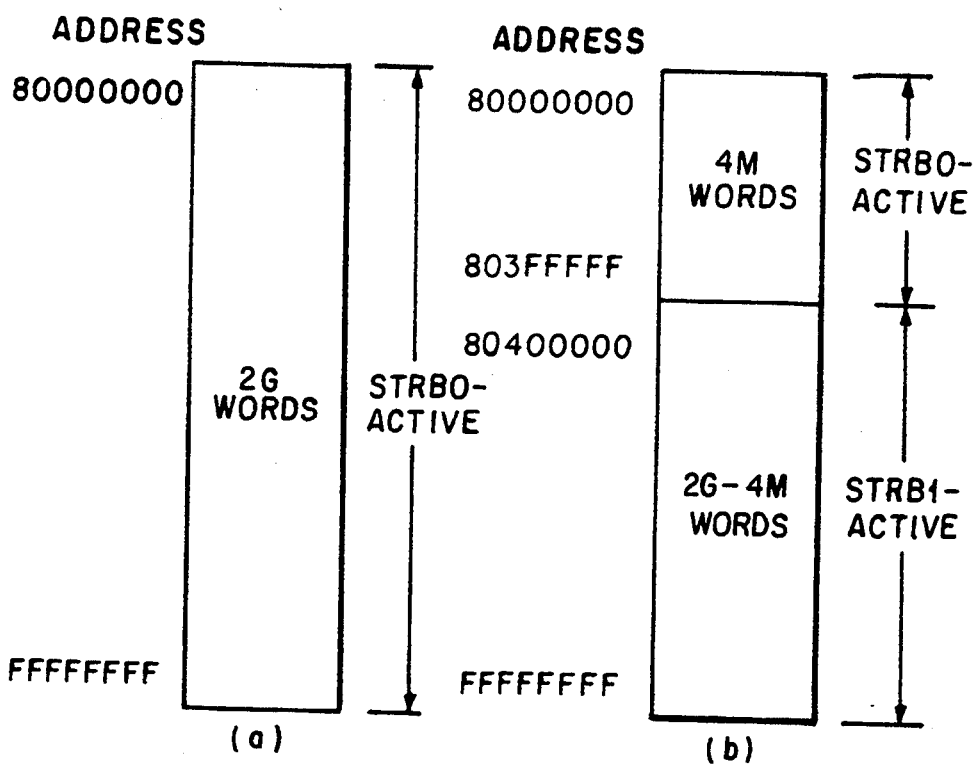
FIG. 5g is a block diagram illustrating the effect of the STRB ACTIVE field on the memory map of the global memory bus of the microcomputer of FIG. 1.

FIG. 5g shows the effect of STRB ACTIVE on the memory map of the global memory bus. Part (a) shows a condition with the STRB ACTIVE field=11110. In this configuration, STRB0__ is active over the entire address range of the global memory bus. Part (b) shows a condition with the STRB ACTIVE field=10101. In this configuration, STRB0__ is active from address 80000000h-803FFFFFh and STRB1__ is active form addresses 80400000h-FFFFFFFFh.

Figure 6A:
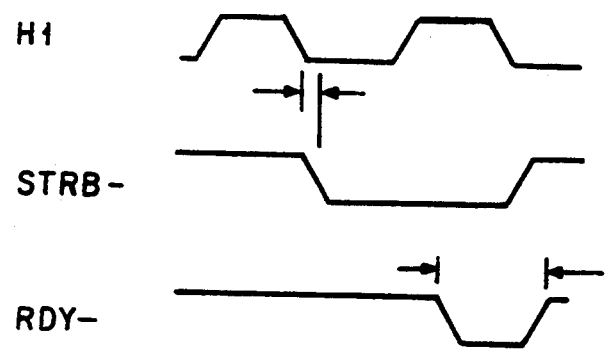
FIG. 6a is a timing diagram illustrating when signal RDY is sampled in relation to the STRB and H1 signals of the global peripheral port of the microcomputer of FIG. 1.

The distinction between global and local interface signals STRB0__ and STRB1__ is dropped except where it is needed for the sake of clarity. It should be noted that signal names shown in the Figures with suffix "-" are equivalent to corresponding signal names with suffix "__" FIG. 6a shows that STRB__ transitions on the falling edge of H1. RDY__ is sampled on the falling edge of H1. Other general guidelines that apply to FIGS. 6b to 6i aid in understanding the illustrated timing diagrams of the parallel external interfaces:

1. Changes of R/W__ are framed by STRB__.
2. A page boundary crossing for a particular STRB__ results in the corresponding PAGE signal going high for one cycle.
3. R/W__ transitions are made on an H1 rising.
4. STRB__ transitions are made on an H1 falling.
5. RDY__ is sampled on an H1 falling.
6. On a read, data is sampled on an H1 falling.
7. On a write, data is driven out on an H1 falling.
8. On a write, data is stopped being driven on H1 rising.
9. Following a read, the address, status and page signal change on H1 falling.
10. Following a write, the address, status, and page signal change on H1 falling.
11. The fetch of an interrupt vector over an external interface is identified by the status signals for that interface (STAT or LSTAT) as a data read.
12. PAGE goes high, STRB__ goes high.

Figure 6B:
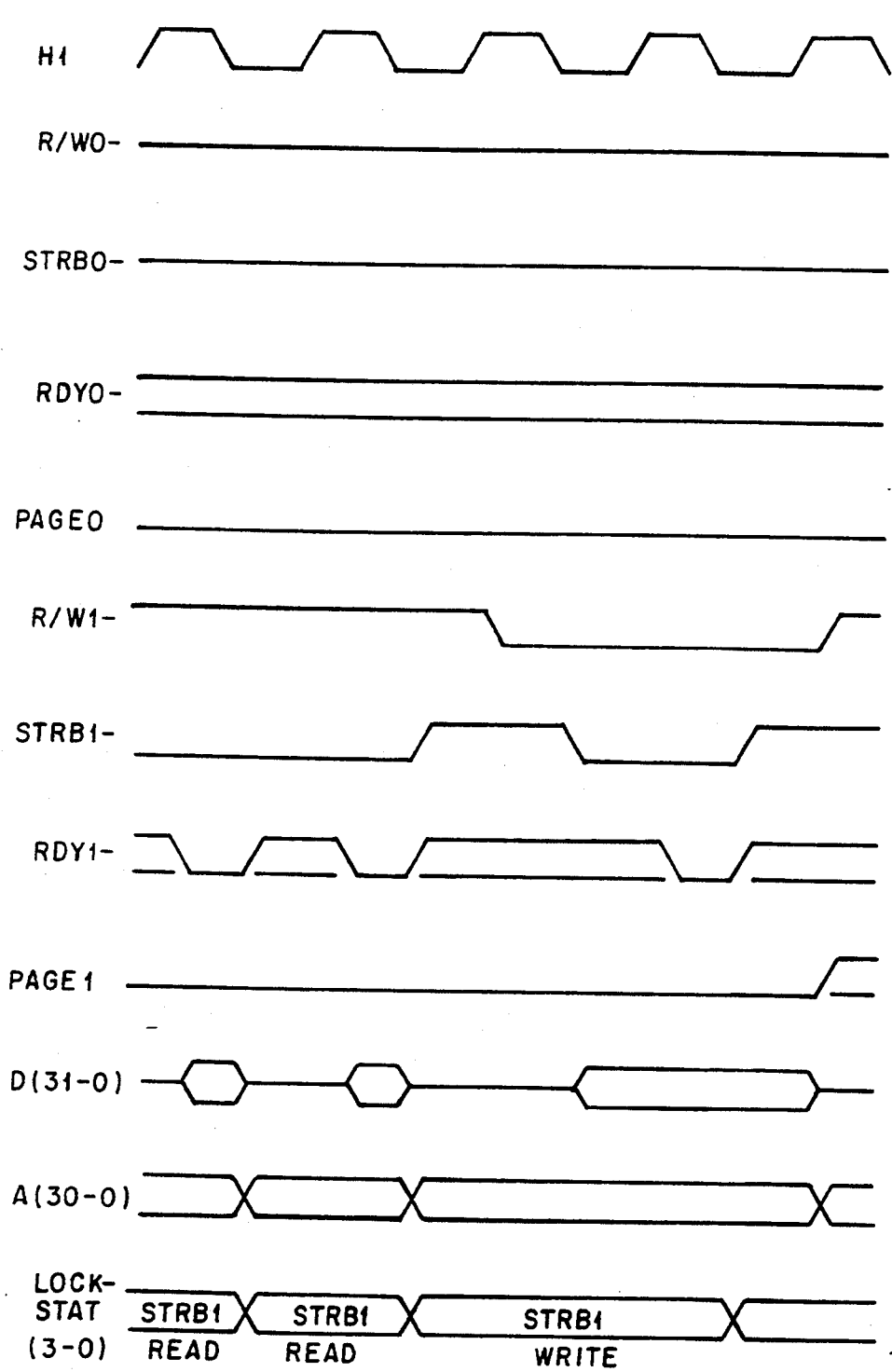
FIG. 6b is a timing diagram illustrating a read, read and write sequence to the same page of an external memory map via the global peripheral port of the microcomputer of FIG. 1.

FIG. 6b illustrates a read, read, write sequence. All three accesses are to the same page and are STRB1__ accesses. Back to back reads to the same page are single-cycle accesses. When transition from a read to a write is done, STRB__ goes high for one cycle in order to frame the R/W__ signal changing.

Figure 6C:
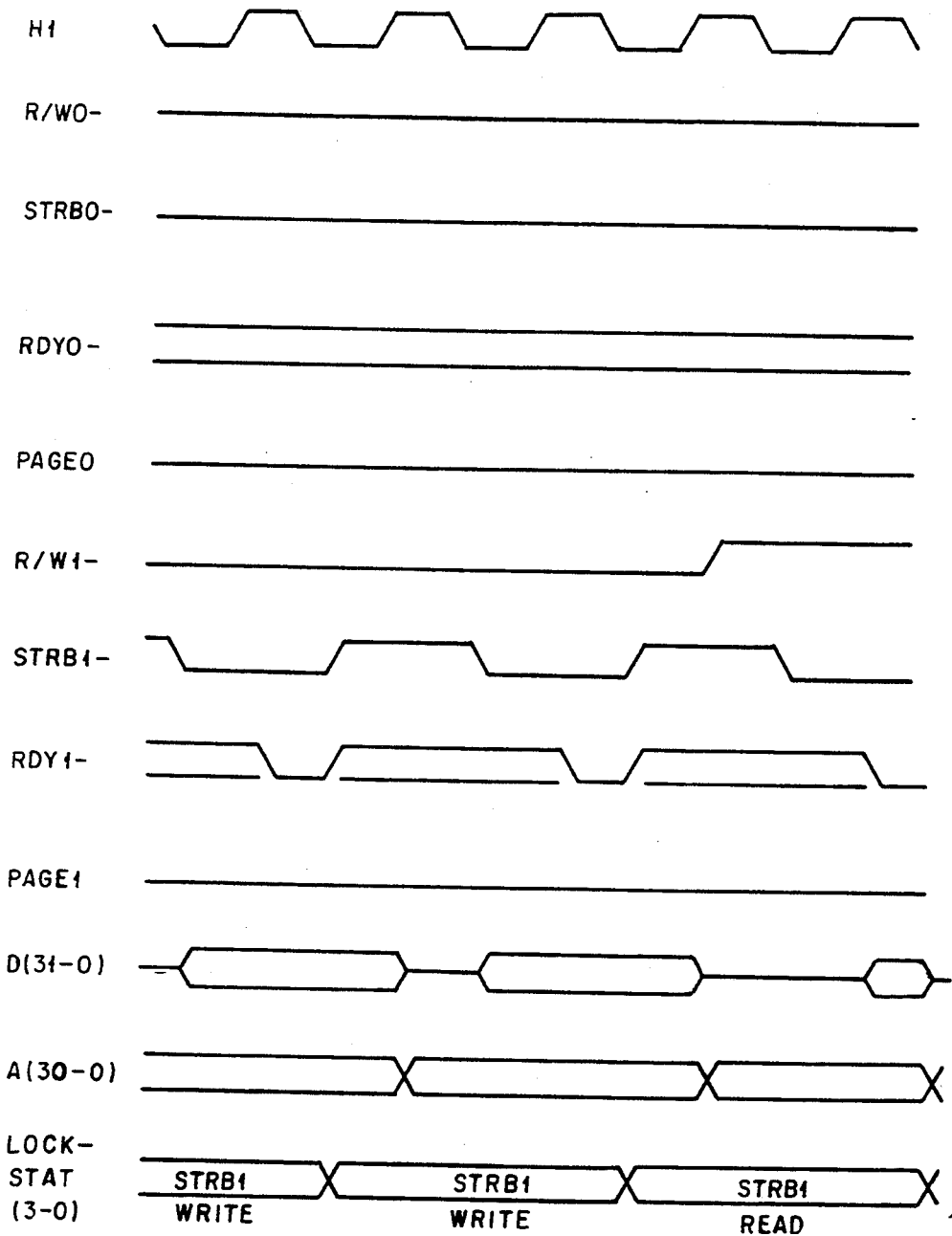
FIG. 6c is a timing diagram illustrating a write, write and read sequence to the same page of an external memory map via the global peripheral port of the microcomputer of FIG. 1.

FIG. 6c illustrates that STRB__ goes high between back to back writes and between a write and a read to frame the R/W__ transition.

Figure 6D:
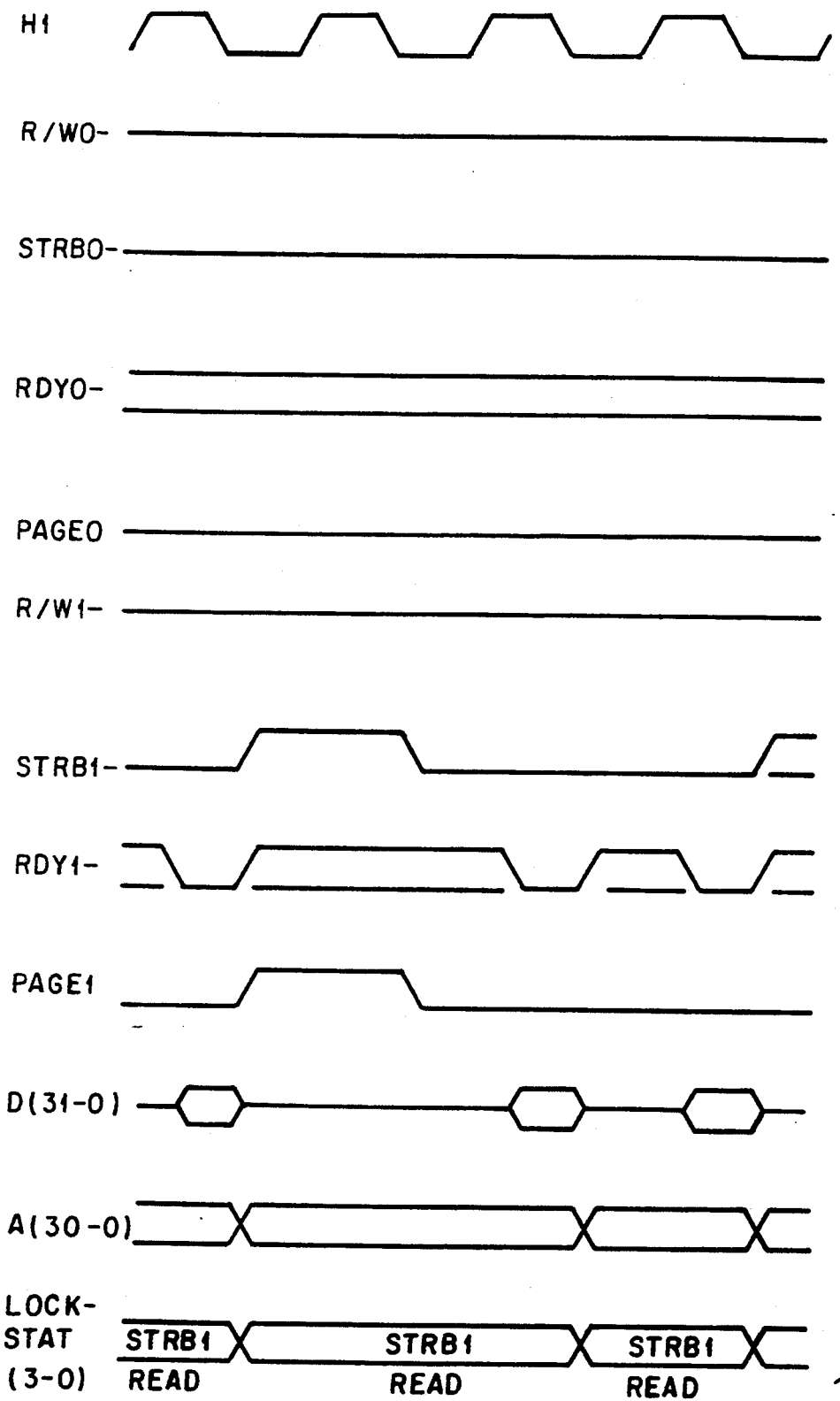
FIG. 6d is a timing diagram illustrating a read same page, read different page and a read same page sequence to an external memory map via the global peripheral port of the microcomputer of FIG. 1.

FIG. 6d illustrates that when going from one page to another on back to back reads, an extra cycle is inserted and the transition is signalled by PAGE going high form one cylce. Also, STRB1__ goes high for one cycle.

Figure 6E:
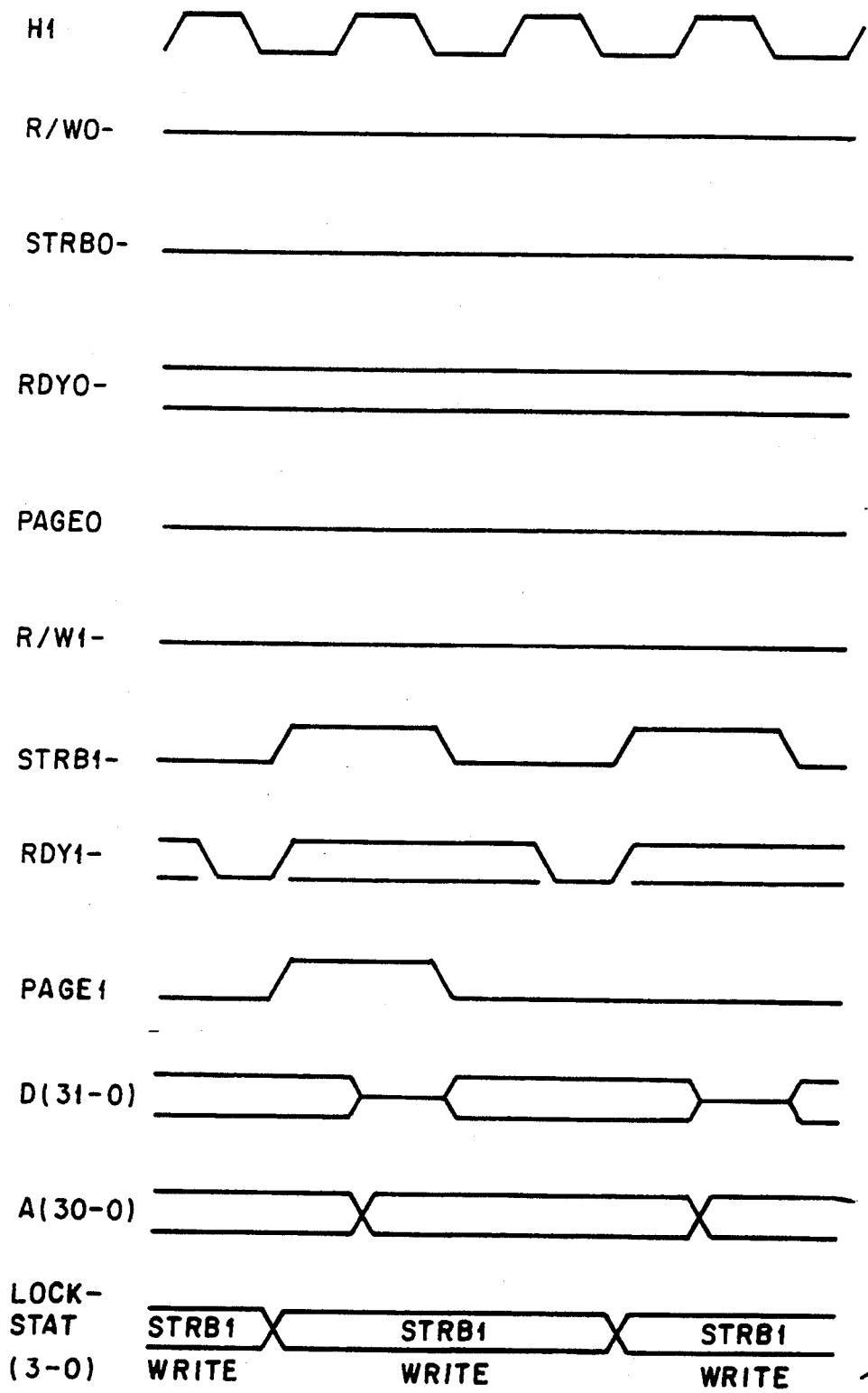
FIG. 6e is a timing diagram illustrating a write same page, write different page and a write same page sequence to an external memory map via the global peripheral port of the microcomputer of FIG. 1.

FIG. 6e illustrates that on back to back writes and a page switch occurs, an extra cycle is inserted and is signalled with PAGE high for one cycle.

Other combinations of write, read and page manipulations are shown in the following FIGS. 6f to 6i.

Figure 6F:
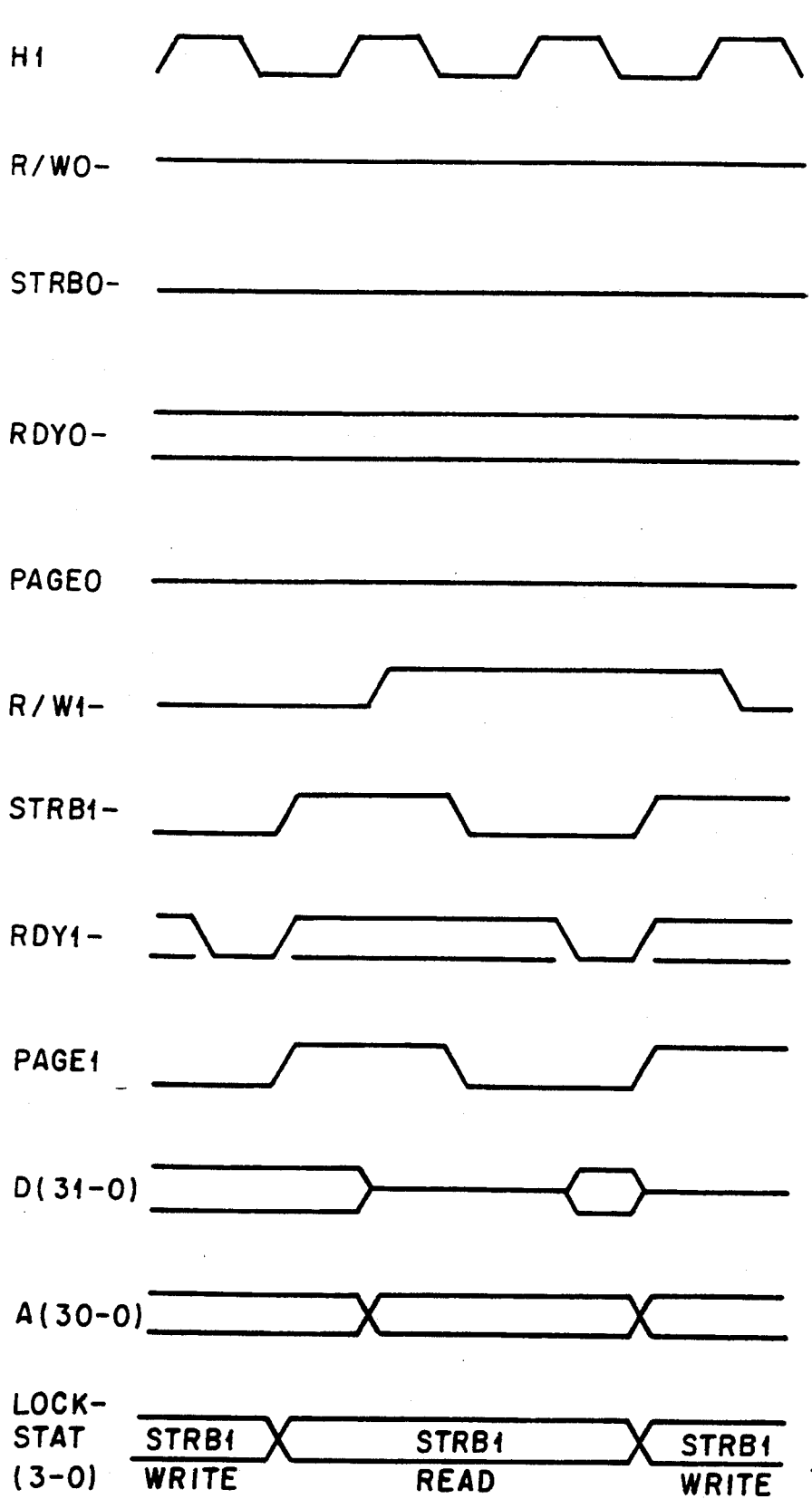
FIG. 6f is a timing diagram illustrating a write same page, read different page and a write different page sequence to an external memory map via the global peripheral port of the microcomputer of FIG. 1.

FIG. 6f illustrates a write same page followed by a read different page and a write different page sequence.

Figure 6G:
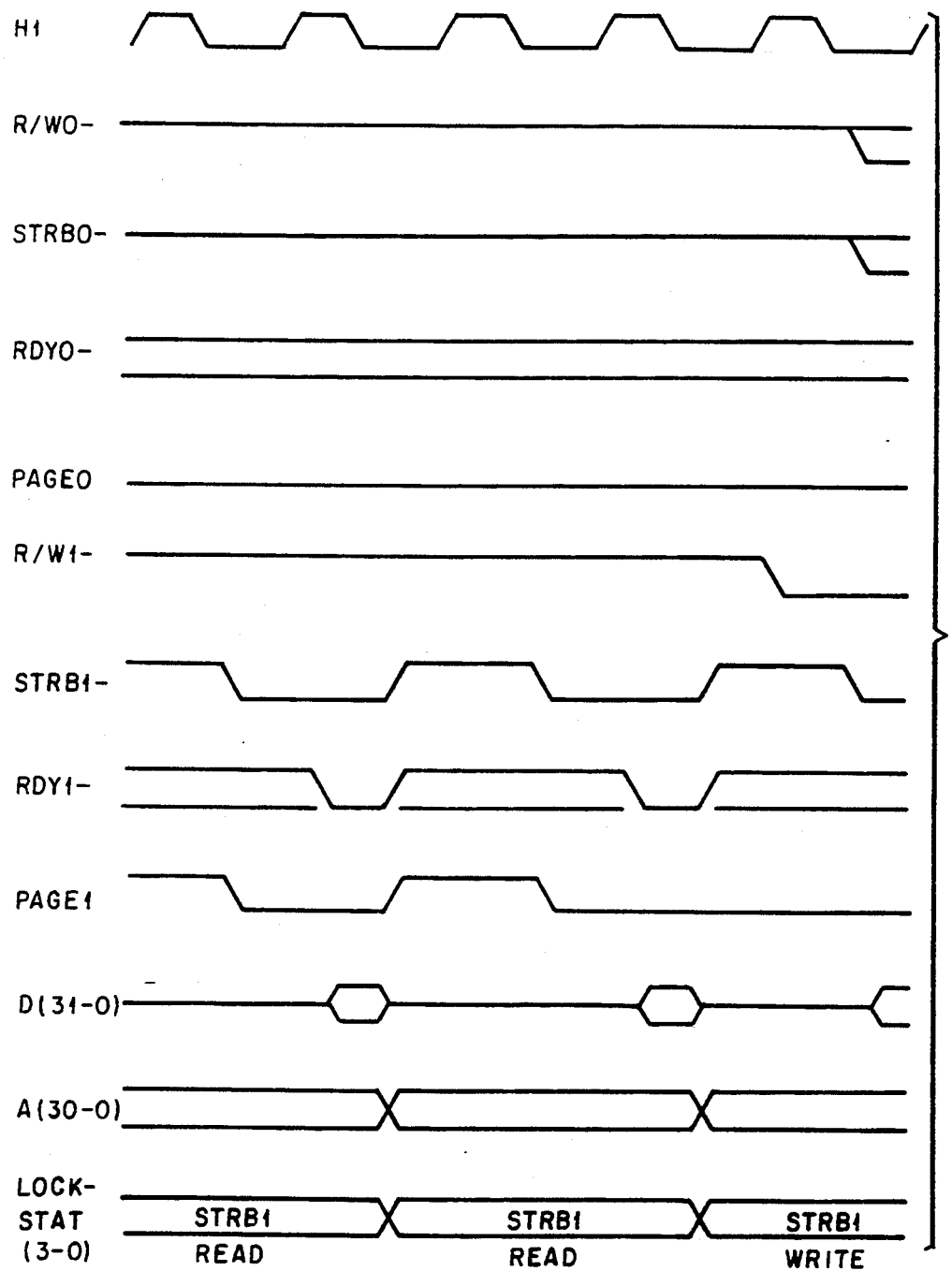
FIG. 6g is a timing diagram illustrating a read different page, read different page and a write same page sequence to an external memory map via the global peripheral port of the microcomputer of FIG. 1.

FIG. 6g illustrates a read different page followed by a read different page and a write same page.

Figure 6H:
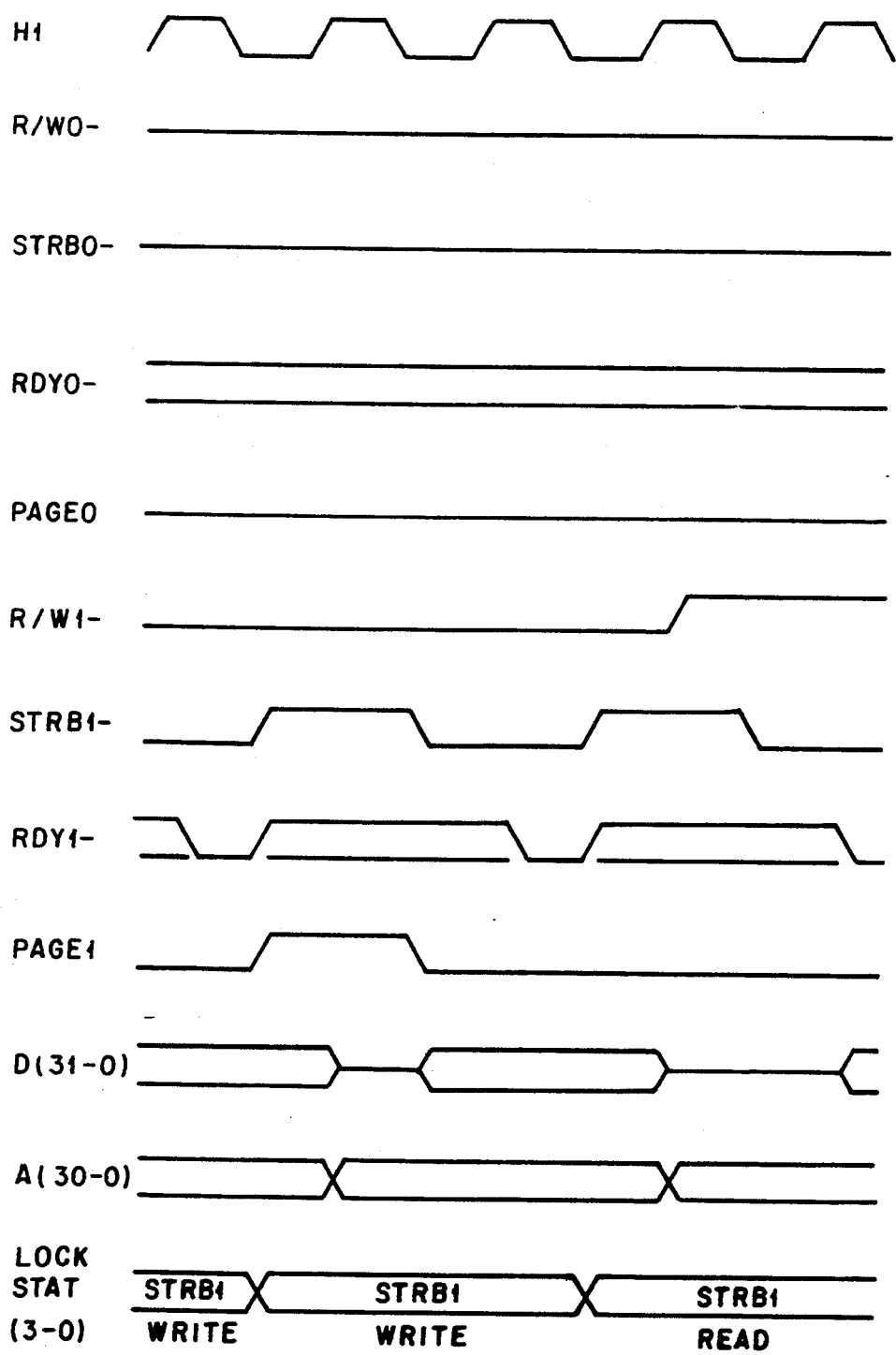
FIG. 6h is a timing diagram illustrating a write different page, write different page and a read same page sequence to an external memory map via the global peripheral port of the microcomputer of FIG. 1.

FIG. 6h illustrates a write different page followed by a write different page and a read same page sequence.

Figure 6I:
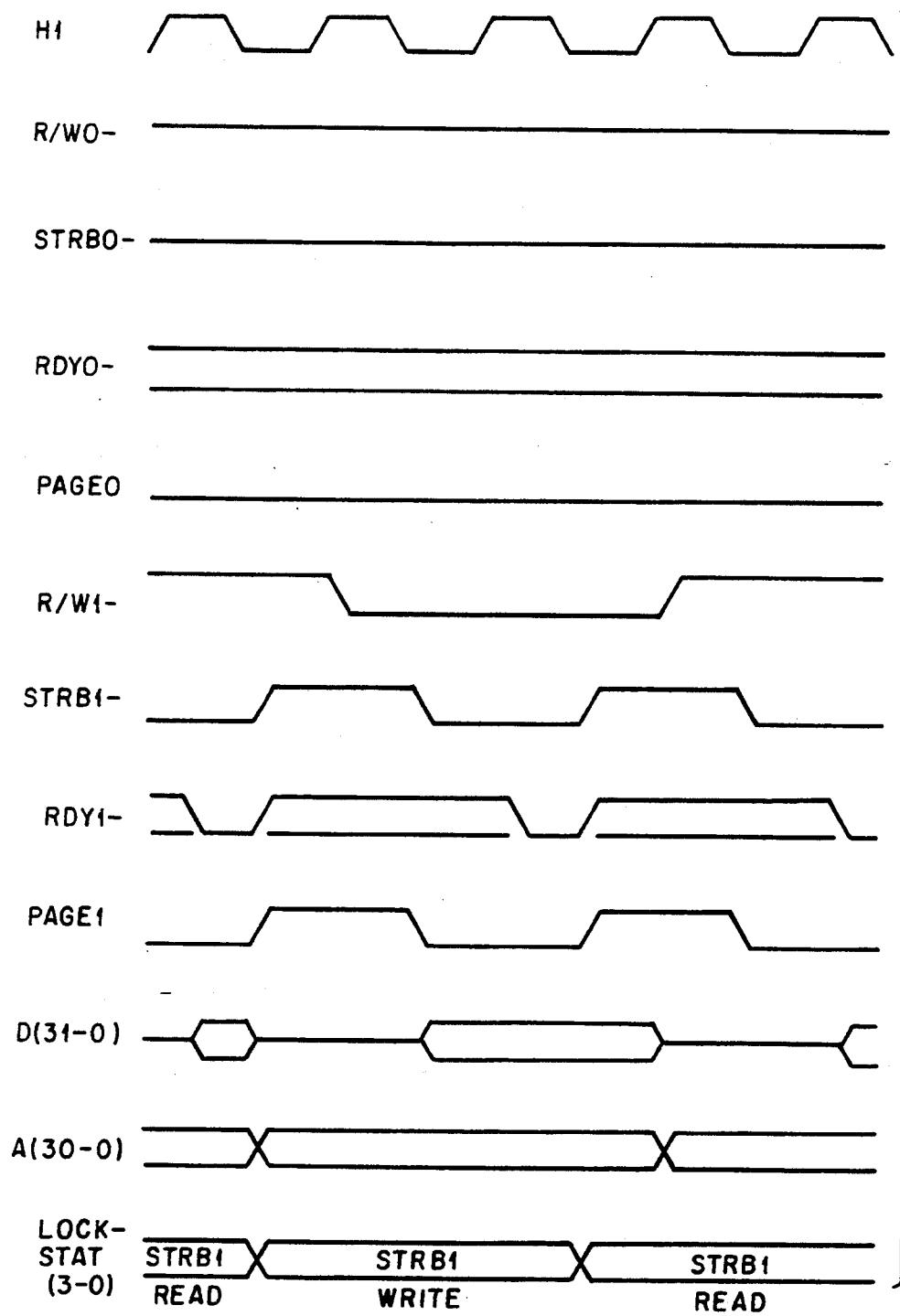
FIG. 6i is a timing diagram illustrating a read same page, write different page and a read different page sequence to an external memory map via the global peripheral port of the microcomputer of FIG. 1.

FIG. 6i illustrates a read same page followed by a write different page and a read different page sequence.

Peripheral port 25 is also similarly constructed as peripheral port 24, but is controlled by lines SEL25 independently from peripheral port 24, so that communication at peripheral ports 24, 25 and 26 can occur simultaneously and independently, so long as the buses 30, 34 and 38 used by the ports are not simultaneously used. Peripheral port 25 is primarily useful in communication with peripheral devices connected to peripheral bus 28. Accordingly, as shown in FIG. 5, peripheral port 25 contains multiplexers 105 and 106 corresponding to like components in peripheral port 24.

A number of control lines are driven by buffers 104 in peripheral port 25, also responsive to signals generated by controller 14 (on lines which are not shown, for purposes of clarity). These control lines output by peripheral port 25 include line R/W__, the "__" designation indicating active low, which specifies the direction of the flow of data through peripheral port 25. The control lines connected to peripheral port 25 further include line STRB__ (as in line R/W__, the "__" designation indicating active low) driven by buffers 104 responsive to controller 14, which is a clock signal indicating to external memory that the set of address lines 30a, 30b, 34a, or 38a connected to lines $A_n$, as the case may be, are presenting a valid address signal to address memory. Line RDY__ is an input to microcomputer 10 from peripheral devices of peripheral bus 28. Line RDY__ is an input to microcomputer 10 and, when driven to its low logic state, indicates that a peripheral device of peripheral bus 28 connected to data lines $D_n$, address lines $A_n$, and control lines R/W__ and STRB__ has completed a communication cycle with microcomputer 10. Controller 14 responds to the RDY__ signal to cause peripheral port 25 to drive said lines to valid states other than that directed to the communication cycle which had ended with the RDY__ signal low. It should be noted that, because of the plurality of buses, 30, 34, and 38 connected to peripheral ports 24, 25 and 26, peripheral ports 24, 25 and 26 can be operating simultaneously.

The preferred embodiment of microcomputer 10 as noted earlier utilizes a single memory address space for all of the memories 16, 18 and 20 and including the address of memory external to microcomputer 10 and accessible via peripheral ports 24, 25 and 26. Table 3 shows the memory map of microcomputer 10 according to the preferred embodiment of the instant invention.

TABLE 3

| Address range (hexadecimal) | Location/function |
|---|---|
| 000000000 through 000000FFF | ROM 20 |
| 000100000 through 0001000FF | I/O & other memory mapped registers |
| 0002FF800 through 0002FFBFF | RAM 16 |
| 0002FFC00 through 0002FFFFF | RAM 18 |
| 000300000 through 0FFFFFFFF | External memory |

Referring now to FIG. 7a, the construction and operation of controller 14 is be described in detail. Controller 14 serves the purposes of controlling the operation of the rest of microcomputer 10, so that the desired operation specified by the instruction codes is be properly executed.

Clock generator 200 in controller 14 is connected to terminals X1 and X2 and generates the internal clock signals which are used in microcomputer 10, for example the system clock on line CLKIN. If a crystal is connected between terminals X1 and X2, clock generator 200 will, by way of an internal oscillator, generate the system clock signal on line CLKIN. Alternatively, an externally-generated clock can be applied to terminal X2, in which case the externally-generated clock signal will generate (such as by a divide-by-n in clock generator 200, not shown) the system clock signal on line CLKIN. Clock generator 200 further generates clock signals Q1 and Q2, which occur on the first and third quarter-cycles of the period of the clock signal on line CLKIN, however generated; clock signals Q1 and Q2 are used by memory access arbitration logic 206 in controller 14, as described below. Additionally, clock signals H1 and H3 are generated and applied to the external terminals of the microcomputer 10. Clock signals H1 and H3 have periods equal to twice CLKIN. However generated, clock signals H1 and H3 are used by the communication ports, the CPU and other internal devices, and externally connected devices. Relative to the fetching of instruction codes and the control of microcomputer 10 responsive to such instruction codes, controller 14 contains program counter 92, instruction register 94, control logic 202, and program counter control logic 204. Program counter 92 is a thirty-two bit register, having an output connected to address lines 34a of program bus 34. The function of program counter 92 is to store the memory address of the next instruction to be fetched, decoded, and executed by microcomputer 10. In an instruction fetch cycle (which occurs during one period of the clock signal H3, the contents of program counter 92 are placed upon address lines 34a of program bus 34 and the one of memories 16, 18 or 20 (or external memory) containing the memory location corresponding to the address signal presents the addressed contents onto data lines 34d of program bus 34; the contents of the memory location having the address contained in program counter 92 constitute the instruction code of the next instruction to be decoded. Instruction register 94 is a thirty-two bit register which is connected to data lines 34d of program bus 34, and which receives the contents of the contents of program counter 92 during the fetch cycle.

During the decode cycle, occurring in the next period of the system clock signal on line H3 after the fetch cycle, the contents of instruction register 94 are decoded by control logic 202, to generate control signals going from controller 14 to the functional circuits of microcomputer 10. To accomplish this, a first portion of control logic 202 contains combinatorial logic for decoding the instruction code. Such combinatorial logic (shown as logic 202a in FIG. 4) can be realized in different well-known ways, such as a programmable logic array or a read-only memory. The thirty-two bit instruction code from instruction register 94 is thus decoded by combinatorial logic 202a into multiple output lines. Some of these lines are directly connected to functions outside of control logic 202, such as to program counter control logic 204; other of these lines are input into sequential logic 202b within control logic 202. Sequential logic 202b is operative to control the various functions of microcomputer 10 so as to allow the reading of data operands from memory by CPU 12, and so as to control the execution of the data processing operations on said operands by CPU 12. Sequential logic 202b accomplishes this, of course, by way of additional output lines emanating therefrom. The logic states of the output lines from control logic 202, whether from combinatorial logic 202a or sequential logic 202b, are thus determined by the instruction code received by control logic 202 from instruction register 94. It should be noted that the drawing figures referred to herein do not show the connection of these control lines between controller 14 and such functional circuitry for purposes of clarity.

It is therefore apparent that combinatorial logic 202a in control logic 202 can be decoding an instruction code which was stored in instruction register 94 while controller 14 is causing the fetch of the following instruction from memory. In addition, sequential logic 202b is operative to control the operand read for a given instruction simultaneously with the control of the execution of a previously fetched instruction. Accordingly, control logic 202 can be controlling microcomputer 10 in such a manner that portions of four different instruction codes may be carried out simultaneously. Such "pipelining" of the instruction codes will obviously reduce the time required to perform a given sequence of instructions.

Figures 7B, 8A:
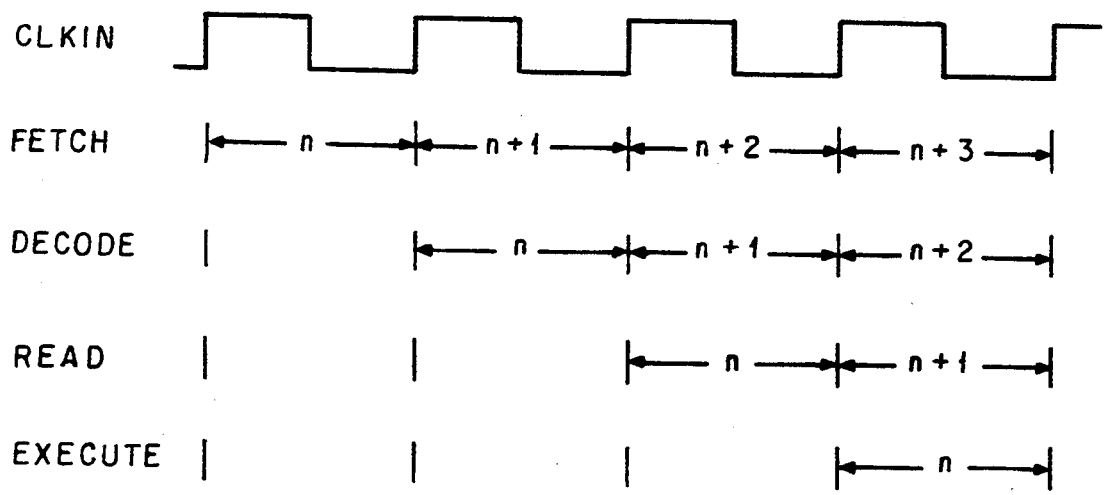

FIG. 7b illustrates an example of how the pipeline is filled, and accordingly how the pipeline operates for a typical instruction. In the first cycle of the system clock signal on line H3, instruction n is being fetched by controller 14, for example from one of memories 16, 18 or 20. During the fetch cycle, however, program counter control logic 204 has incremented the contents of program counter 92 to contain the memory location of the instruction code for instruction n+1. During the second cycle of the system clock signal on line CLKIN, the instruction code for instruction n is being decoded by control logic 202. Also during this second cycle, the contents of program counter 92 are presented to address lines 34a of program bus 34, and the instruction code for instruction n+1 are fetched from program memory and loaded into instruction register 94.

During the third system clock cycle shown in FIG. 7b, sequential logic 202b is effecting a read from memory (e.g., RAM 16) of a data operand necessary for instruction n via data bus 30. In addition, since the instruction code for instruction n+1 has been fetched, the third cycle shown in FIG. 7b illustrates that instruction n+1 is being decoded by combinatorial logic 202a of control logic 202. Simultaneously with the read cycle for instruction n, however, the fetch of the instruction code for instruction n+2 is being done, assuming there is no bus or memory conflict with the read cycle for instruction n. As described above, generally the data operand is read by CPU 12 via data bus 30 while the instruction code is read via program bus 34; assuming that both reside in different memories 16, 18 or 20, or one residing in external memory, no bus conflict will occur.

During the fourth cycle of the system clock, instruction n will be executed under the control of sequential logic 202b in control logic 202, the read operation for instruction n+1 will be effected by sequential logic 202b, the instruction code for instruction n+2 will be decoded, and the instruction code for instruction n+3 will be fetched. Accordingly, the pipeline for microcomputer 10 will be filled, and the performance of a sequence of instructions will be optimal, subject to bus conflicts and to memory access conflicts which may, for certain instruction combinations, cause a wait cycle for one of the operations.

Data lines 30d of data bus 30 are received by controller 14, for control of the program flow in other than incremental fashion, such as a branch instruction, requiring that program counter 92 be loaded by CPU 12 or from memory. For example, in the event of an unconditional branch, the value of an operand contained in the instruction code, read from memory, or read from a register in CPU 12 may contain the address of the memory location containing the next instruction code to be executed. Program counter control logic 204 will then receive the value presented upon data lines 30d, and load program counter 92 accordingly, so that program control can pass to the desired location.

As illustrated in FIG. 7a, program counter control logic 204 contains an adder 203 which receives the contents of program counter 92. Control logic 202 (preferably combinatorial logic 202a therein), controls adder 203 so that generation of the contents of program counter 92 for the next cycle may be performed in a variety of manners. As explained above, adder 203 may merely increment the prior contents of program counter 92, to step through the instruction sequence. However, program counter control logic 204 further contains an register 205, which can receive a value from data lines 30d of data bus 30. Program counter control logic 204 can thus calculate the contents of program counter 92 in various ways. For example, branching to a relative address (relative to program counter 92) may occur by way of loading register 205 with a value presented on data lines 30d of data bus 30; this value could then be added to the prior contents of program counter 92 to generate a new value for program counter 92. In addition, an absolute branch may be effected by loading register 205 with the desired memory address from data lines 30d of data bus 30, and by control logic 202 causing adder 203 to perform a "zero-add" with the contents of register 205 for application to program counter.

It should be further noted that microcomputer 10 is capable of performing a "delayed" branch instruction, so that the branch instruction is fetched three instructions before it is actually to occur. The delayed branch instruction, when executed, loads register 205 with the destination memory address of the branch as in a direct branch. However, control logic 202 will continue to increment the contents of program counter 92 for the next three instructions following the execution of delayed branch instruction. Upon the third instruction, adder 203 will apply the contents of register 205 to program counter 92, thereby effecting the branch while continuing to take advantage of the pipeline scheme. The pipeline may, of course, remain full after the branch, as the destination location may continue to be incremented as before by adder 203.

Trap routines are supported in the preferred embodiment. Referring to FIG. 8a, trap instructions differ from branch instructions such that trap instructions entail indirect addressing to arrive at the trap routine address while branch instructions entail relative addressing (which is less involved) to arrive at the branch address. As a result, the throughput of a pipeline machine suffers from the indirection that occurs when arriving at the trap routine address, because to execute a trap sequence, no instructions are fetched for the next three stages after a trap fetch. The address for the trap routine has not been determined. Consequently, the pipeline is flushed whenever a trap instruction is executed. It should be noted that often when invoking a trap routine, it is advantageous to disable interrupts and freeze cache memory. The inherent nature of trap routines in many circumstances is incompatible with interrupts and cache memory and improvements remedy such problems herein.

Figure 8B:
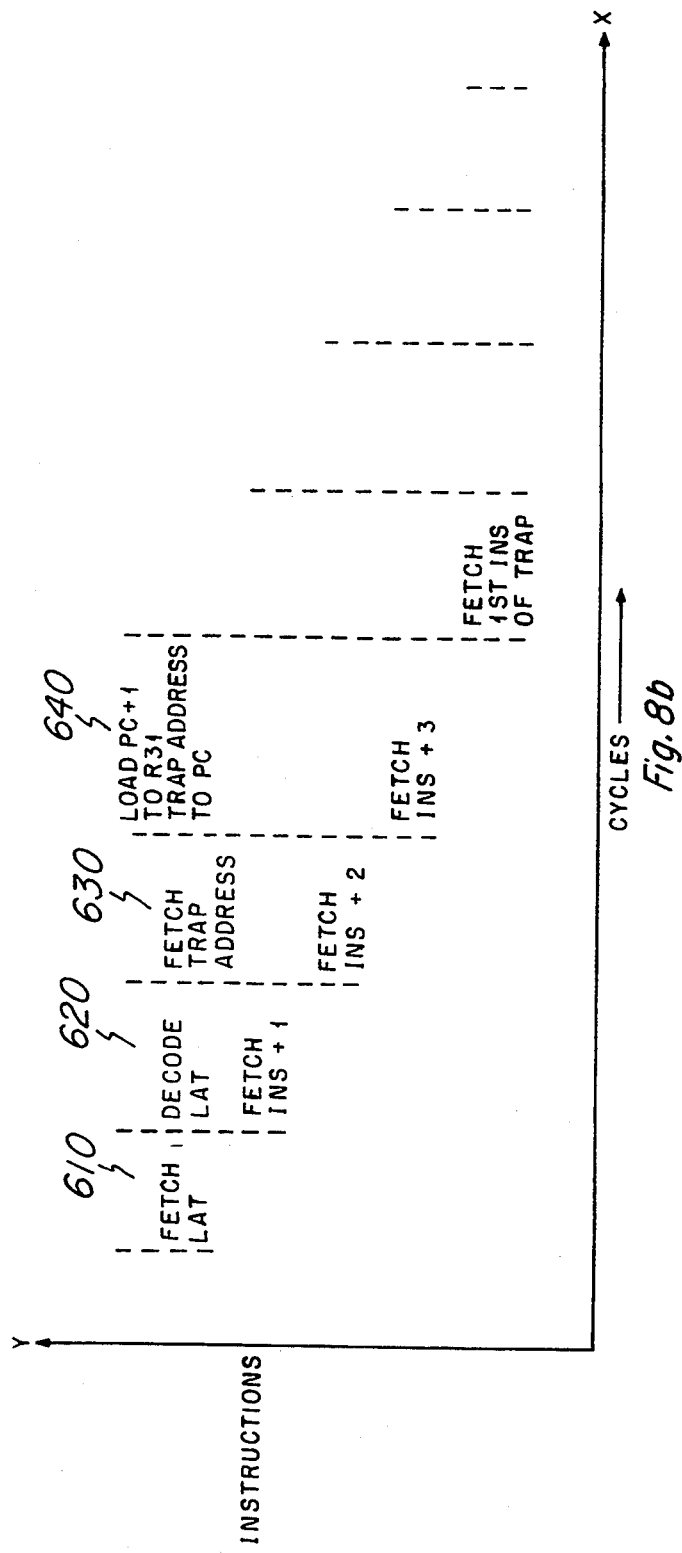
FIG. 8b is a diagram illustrating the initiation of the delayed trap instruction in relation to the intervals of the pipeline of the microcomputer of FIG. 1.

A delayed trap instruction (LAT) incorporated in the preferred embodiment remedies the undesirable effects of executing a trap routine. The LAT instruction is fetched three cycles before the trap instruction is executed. FIG. 8b shows the sequence of events in relation to system cycle clock cycles of microcomputer 10. During system cycle clock cycle 610 the LAT instruction is fetched from program memory. Decode cycle 620 decodes the LAT instruction. Instructions are being fetched while the LAT instruction is executing thus maintaining the data flow from the pipeline. During the third system cycle clock cycle 630, the address of the first instruction of the trap routine is fetched from memory. The memory can be any one of the memories discussed herein. Clock cycle 640 saves the contents of the program counter (INS+4 representing the next instruction) to register PC+4 and loads the fetched trap address into program counter. Thus, during the next system cycle clock cycle, the first instruction of the trap routine is fetched from the memory. Using the LAT instruction one system cycle clock cycle is used to initiate the trap sequence, thus maintaining a constant data flow from the pipeline. The program counter value representing the next instruction is stored before loading the address of the first instruction of the trap routine thus ensuring program execution to resume at the point prior to executing the trap routine.

Figure 8C:
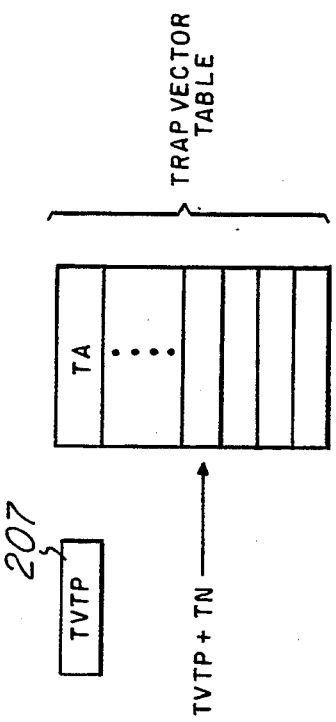
FIG. 8c is a diagram illustrating a trap vector table of the microcomputer of FIG. 1.

FIG. 8c shows a trap vector table which contains trap addresses (TA) that corresponds to locations for the first instruction of trap routines. The trap address is the sum of the trap vector table pointer (TVTP) and trap number N (TN). The summing of the TVTP and TN occurs during system cycle clock cycle 620. Control logic 202 decodes the LAT instruction fetched during system cycle clock cycle 610 and instructs adder 209 to sum operands TVTP and TN during system cycle clock cycle 620.

For example, shown in FIG. 7a is trap address logic 208 containing trap vector table pointer register 207, adder 209, program counter +4 (PC+4) register 210. During system cycle clock cycle 620 (after fetching the LAT instruction, control logic 202 decodes the LAT instruction. Trap number (TN) which specifies a particular trap routine is extracted from the LAT instruction by decoder 202a and combined with trap vector table pointer (TVTP) register 207 using adder 209. The result is a trap address (TA) specifying a location in memory that contains the trap vector which is the address of the first instruction for the trap routine to be executed. The contents of the TVTP register 207 can be altered thus offering even more flexibility in placing trap routines within the memory map of microcomputer 10. During the third cycle of the system clock after fetching the LAT instruction, the trap address is sent to memory via bus 30a to access the trap vector that is received on bus 30d. Access to memory is in accordance to above herein described technique. On the fourth cycle of the system clock, the current contents of program counter register 92 is transferred to PC+4 register 210 and the trap vector is transferred to program counter 92. Thus, program counter register 92 contains the first instruction of the trap routine, and the previous contents of the program counter register 92 are stored in PC+4 register 210. When the trap routine is complete, the contents of PC+4 are transferred back to program counter register 92 and program execution resumes at the point where the trap routine interrupted. Advantageously, the trap routine interrupts program execution using only one system cycle clock cycle and continues to take advantage of the pipelining scheme by keeping the pipeline full while indirection of program execution is occurring.

Figure 8D:
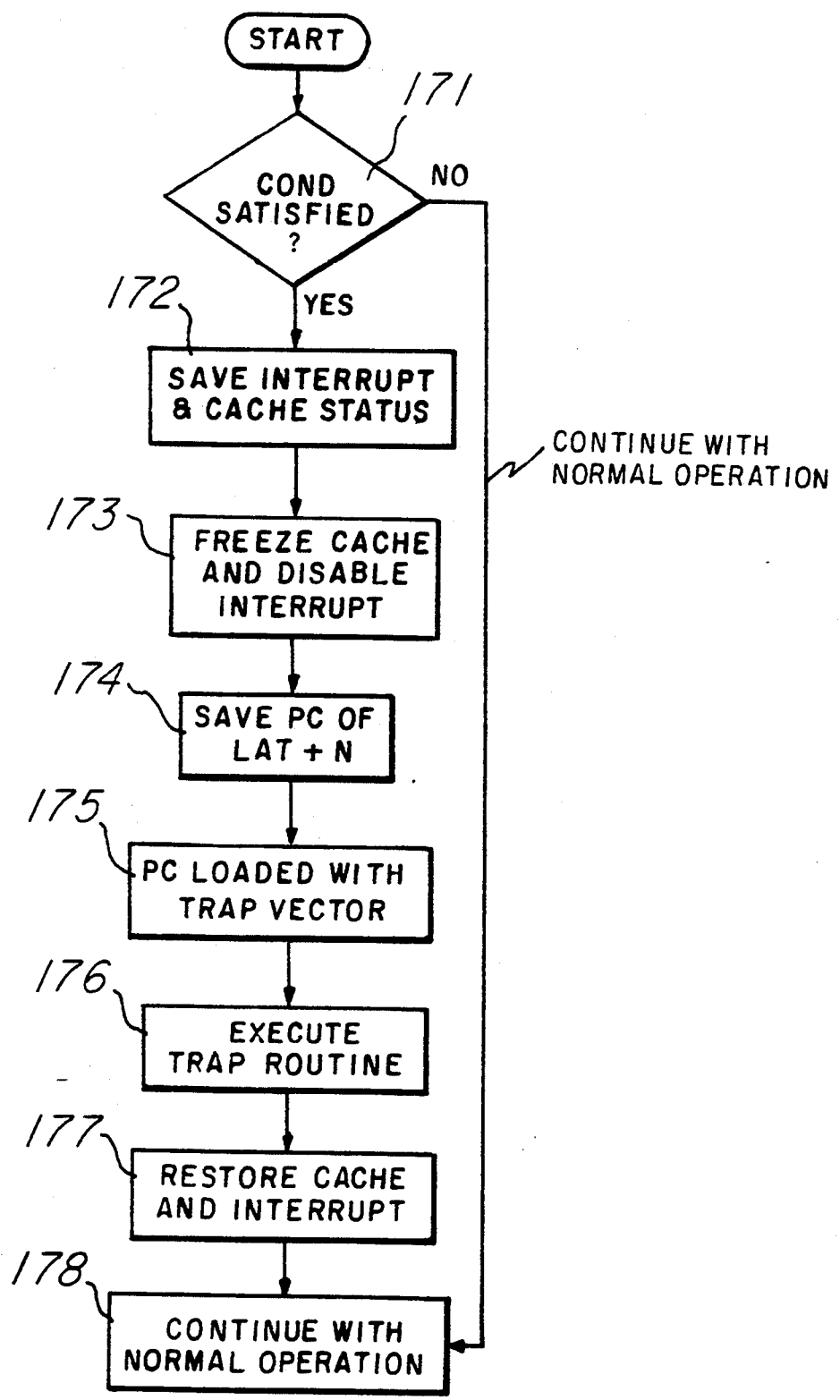
FIG. 8d is a flow chart illustrating the execution of a delayed trap instruction of the microcomputer of FIG. 1.

FIG. 8d shows the flow chart of the steps used in the execution of the link and trap (LAT) instruction incorporated in the preferred embodiment of microcomputer 10 where if condition 171, if not satisfied the normal operation continues and if the condition 171, is satisfied, then interrupt and cache status 172, is saved by freezing the cache and disabling the interrupt 173. Program counter of LAT plus Nth instruction 174 is saved after which the program counter is loaded 175 with the trap vector containing the address of the first instruction of the trap routine. The LAT trap routine is then executed 176. After execution of the trap routine, the interrupt and cache status are restored whereby the cache is no longer frozen (assuming it was not frozen before the LAT) and the interrupt vector is no longer disabled (assuming it was not disabled before LAT) 177. Upon successful completion of these steps, the normal operation continues as if the condition had never been satisfied 178.

U.S. patent application Ser. No. 347,967 TI Docket 14145 gives more details about the operation of conditional instructions which is incorporated herein by reference.

A repeat block delayed instruction (RPTBD) is incorporated in the preferred embodiment. Advantages of the RPTBD instruction are substantially the same as the delayed branch and trap instructions: single system clock cycle execution and maintaining throughput by not flushing the pipeline. A distinct instruction called a repeat block instruction (RPTB) (without delay) is also implmented and allows a block of instructions to be repeated a number of times without penalty for looping; however, in RPTB the pipeline is flushed while the values of repeat start (RS) and repeat end (RE) registers contained in block repeat register 164 are being determined. It should be noted that the repeat count (RC) register (contained in block repeat register 164) is loaded before executing the RPTB instruction.

Figure 8E:
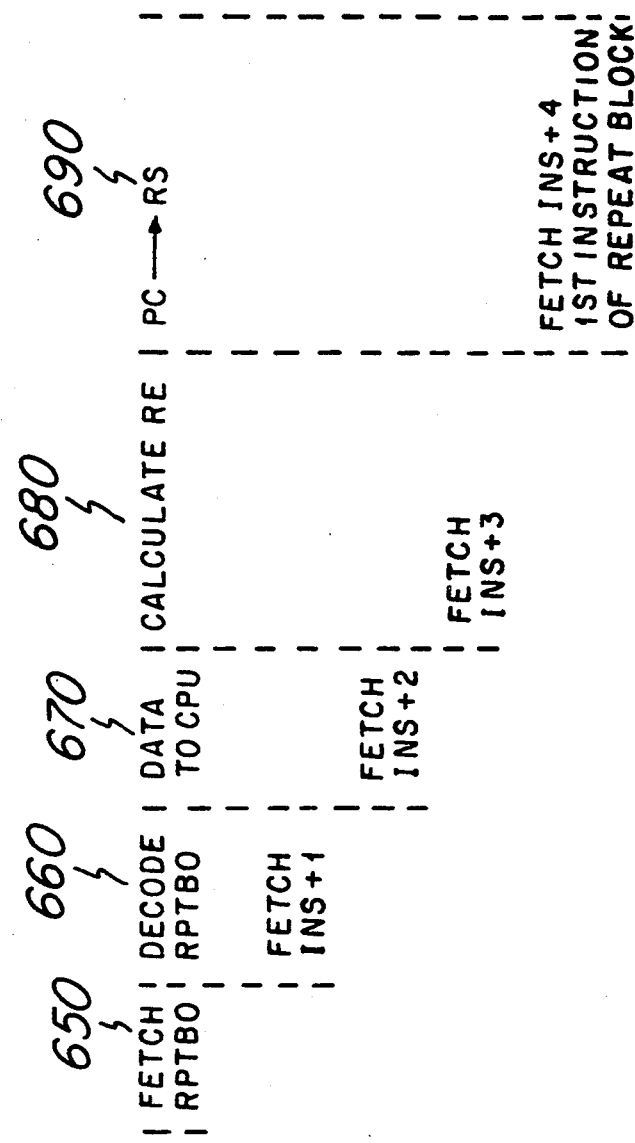
FIG. 8e is a diagram illustrating the initiation of the repeat block delayed instruction in relation to the intervals of the pipeline of the microcomputer of FIG. 1.

The repeat block delayed instruction (RPTBD) compared to RPTB advantageously further fetches the next three instructions before the rest of the RPTBD instruction is executed. FIG. 8e shows the sequence of events in relation to the system cycle clock cycles of microcomputer 10. During system cycle clock cycle 650, the RPTBD instruction is fetched from program memory. Decode cycle 660 decodes the RPTBD instruction. Instructions are continually fetched while the RPTBD instruction is cycled through the pipeline. During the third system cycle clock cycle 670, the decoded RPTBD instruction containing data that is used to determine the repeat end (RE) address for the block of instructions is sent to CPU 12. Clock cycle 680 causes CPU 12 to calculate the repeat end (RE) address. During clock cycle 690 the program counter (PC) is loaded into repeat start (RS) register 223 signaling the start of RPTBD instruction; thus, the first instruction of the repeat block is fetched from the memory. The block of instructions is repeated until the number in the repeat count (RC) register is reached. Program execution continues. The pipeline is not flushed because the RPTBD instruction is fetched three system cycle clock cycles before executing the repeat block delay (RPTBD) instruction. A constant data flow from the pipeline is maintained.

Figure 8F:
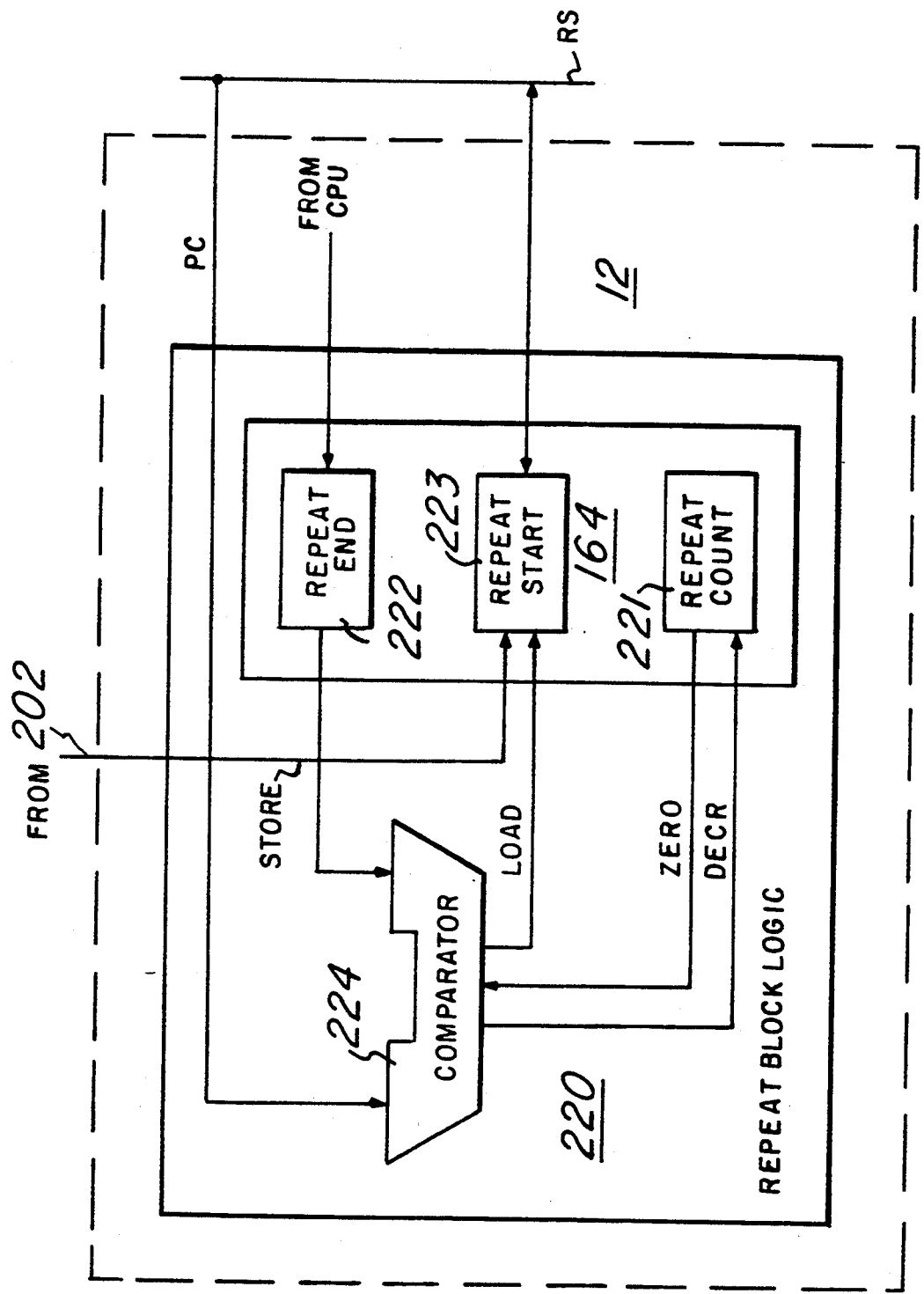
FIG. 8f is a electrical diagram, in block form, of the repeat block logic contained in the CPU of the microcomputer of FIG. 1.

For example, shown in FIG. 8f is repeat block delay logic 220 located in CPU 12. Contained within repeat block delay logic are repeat block register 164. It should be noted that repeat count (RC) register is loaded with a proper value. An RPTBD instruction is loaded into instruction register 94 and is decoded. Data and control signals are sent to CPU 12 along with program counter 92 (PC) where the data and PC are combined and stored in repeat end (RE) register 222. A signal on line STORE from controller 14 places the contents of PC (92) to repeat start (RS) register 223 via repeat start (RS). Each time the program counter (PC) is incremented during the execution of the block of instructions, comparator 224 compares the value of the PC with RE to determine whether PC equals the RE value. If not, then PC via program bus 34a fetches the next instruction. If PC equals RE, then comparator 224 checks if the zero flag is set by the repeat count (RC) register 221 via signal ZERO signaling a zero count. If not, comparator 224 decrements RC by 1 via signal DECR and a signal LOAD is sent to RS register 223 loading the contents to PC register 92. Thus, the contents of PC register 92 fetch the first instruction of the repeat block. The repeat block is repeated until the zero flag is set signaling the number of repetitions is complete. Then, PC is not loaded with the value in RS register 223, and PC is incremented past the RE value. Program execution continues.

Figure 8G:
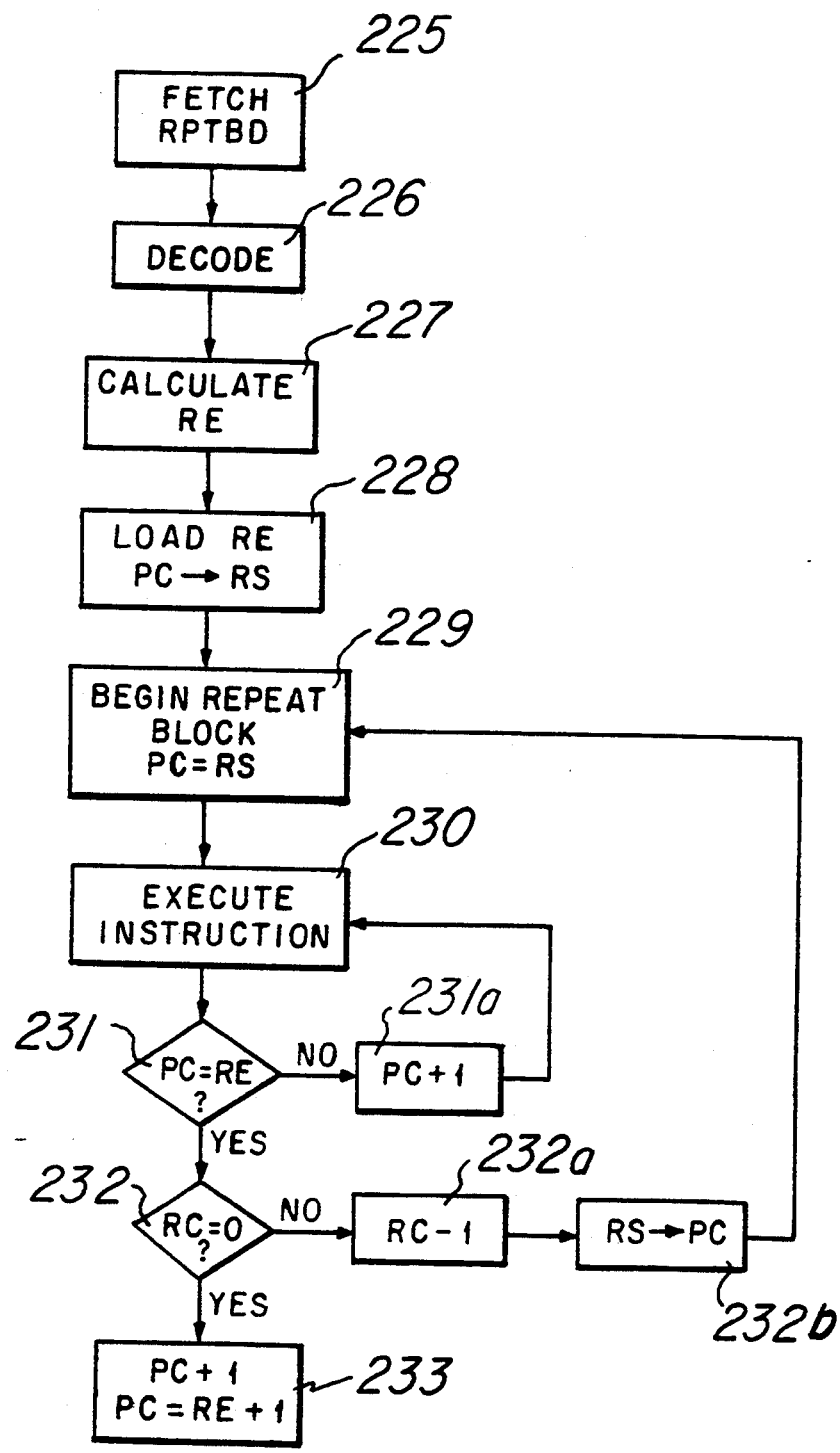
FIG. 8g is a flow chart illustrating the execution of a repeat block delayed instruction of the microcomputer of FIG. 1.

FIG. 8g. is a flow chart of the steps involved in implementing the RPTBD instruction. Operations commence with fetching of the RPTBD instruction in start block 225. Then step 226 decodes the RPTBD instruction. Next step 227 calculates repeat end (RE). Then step 228 stores the value RE to the RE register and PC is stored to RS register. Step 229 begins execution of the block of instructions. Next step 230 executes an instruction. Test step 231 determines whether PC equals RE. If not, branch to step 231a to increment the PC and return to step 230 to execute another instruction. Otherwise (if so) then operations proceed to test step 232 to determine whether RC=0. If not, then operations branch to step 232a decrementing RC by 1 and to step 232b loading RS to PC before returning to execute the repeat block. Otherwise (if RC=0), then operations proceed to step 233 whereupon PC is incremented to RE plus 1 completing the repeat block delay instruction, and program execution continues.

Figure 10:
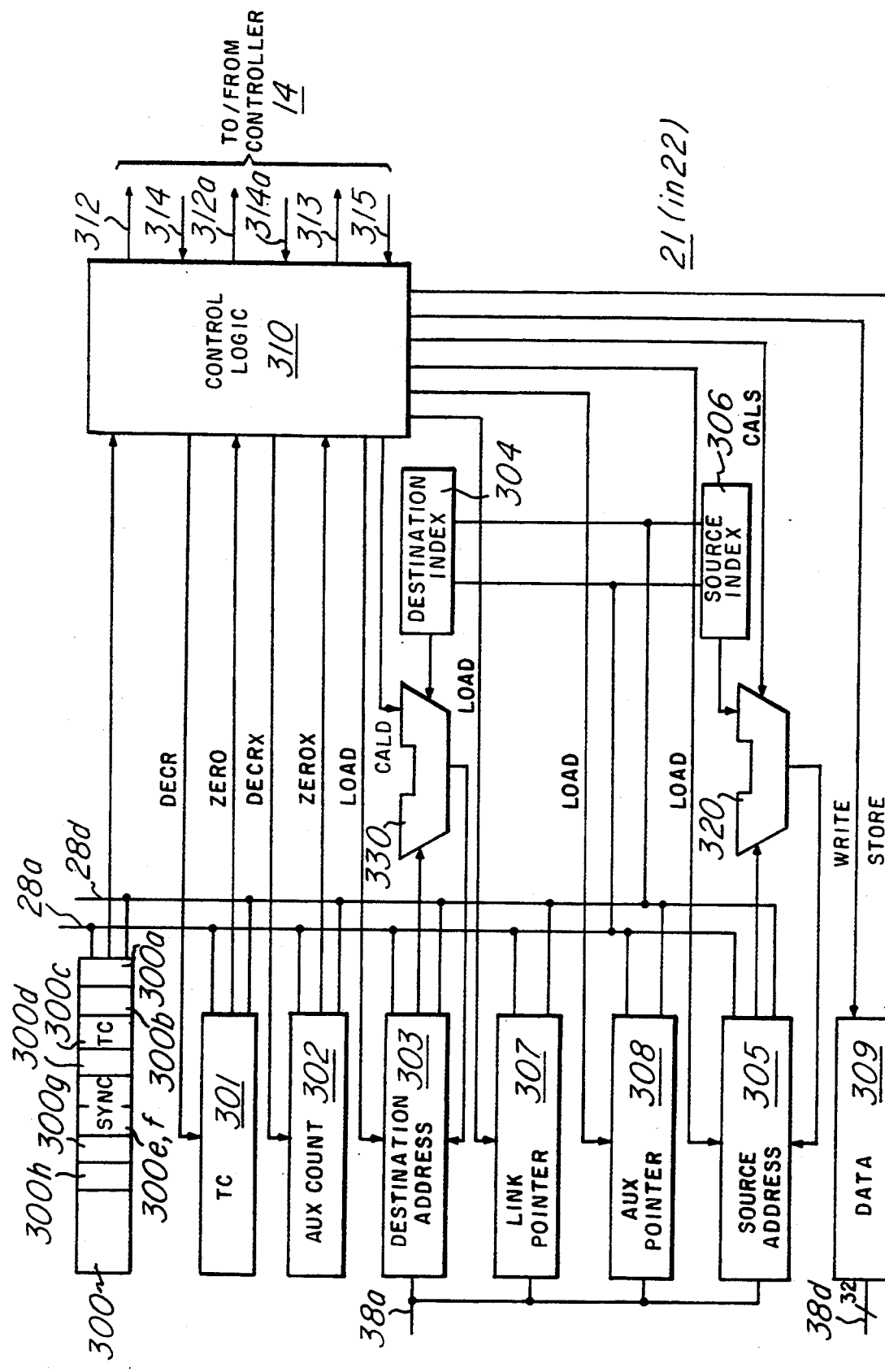
FIG. 10 is an electrical diagram, in block form, of the DMA coprocessor of the microcomputer of FIG. 1.

Controller 14 further includes interrupt logic 250, which is connected to a plurality of external terminals of microcomputer 10, to controller 14, and to various of the functions within microcomputer 10. Interrupt logic 250 serves the purpose of receiving interrupt signals presented to microcomputer 10 on the RESET terminal and on terminals INT0 through INT3, and receiving interrupt signals generated internally to microcomputer 10 from various functions such as DMA coprocessor 22. An example of such an internal interrupt signal is shown in FIG. 10 by line 312, which is an interrupt signal from DMA coprocessor 22. Contained within CPU 12 as a control register is an interrupt enable register, the contents of which specify whether each of the interrupt signals is enabled or disabled. Responsive to the receipt of an enabled interrupt signal, either from terminals INT0 through INT3 or from internal to microcomputer 10, and if controller 14 indicates that an access to an input/output memory location is not current, interrupt logic 250 will cause program counter 92 to be loaded with a memory address corresponding to the particular interrupt signal (the "interrupt vector"), and the execution of the program will continue from the interrupt vector location forward. Responsive to an instruction code generally included in the interrupt handling routine called by the interrupt vector, interrupt logic 250 generates interrupt acknowledge signals on line INTA for external interrupts and, for example, on line 314 for the internal interrupt signal for DMA controller 22. Controller 14 causes the prior contents of program counter 92 to be stored in a predetermined memory location (generally called a "stack"), so that the location of the instruction code which would have been fetched next will be reloaded after the interrupt has been serviced.

External memory devices connected to peripheral port 25, for example, can be used to store the instruction codes for the program being executed by microcomputer 10. However, the access time of the external memory may be sufficiently slower than that of memories 16, 18 and 20 so that controller 14 would have to wait a full system clock period after presenting the contents of program counter 92 on address lines 34a of program bus 34, before the instruction code would be presented by the external memory onto data lines 34d of program bus 34 for receipt by instruction register 94. For any given instruction being executed, often the next instruction code to be executed is located in a memory location in program memory which has an address close to the address of the given instruction. Such proximity in program memory of the next instruction code occurs especially often in digital signal processing applications, because of the repetitive nature of the calculations therein. A instruction cache memory 36 as shown in FIG. 1 is one way to take advantage of this repetitive nature.

Figure 9:
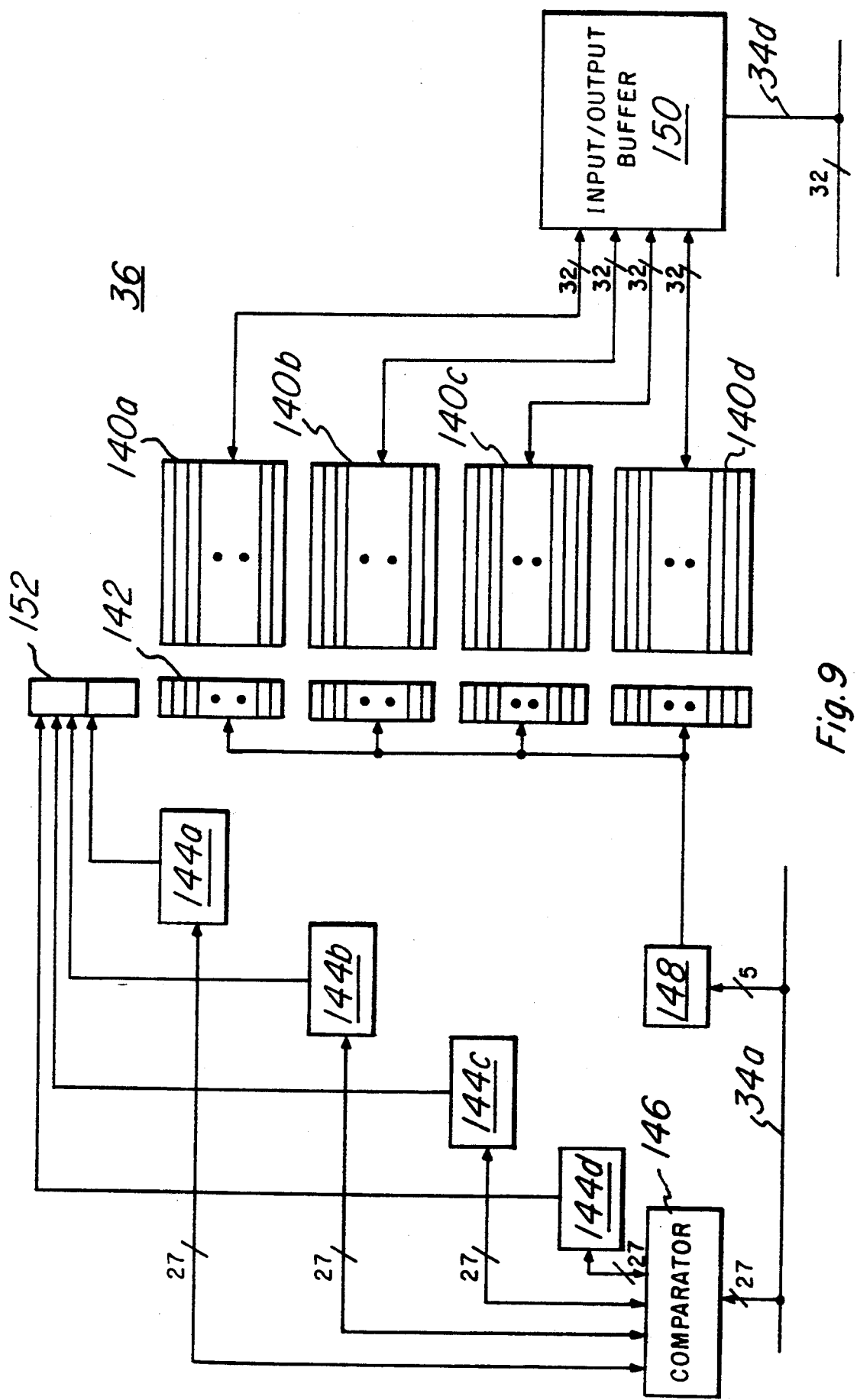
FIG. 9 is an electrical diagram, in block form, of the instruction cache of the microcomputer of FIG. 1.

Instruction cache 36, as described above relative to FIG. 1, is connected to address lines 34a and data lines 34d of program bus 34. As shown in FIG. 9, instruction cache 36 contains 128-word memory 140 which is organized into four 32-word segments 140a, 140b, 140c and 140d. Instruction cache 36 further contains segment start registers 144a, 144b, 144c, and 144d each of which stores a predetermined number of the most significant bits of the addresses for the instruction codes stored in the respective segments 140a, 140b, 140c, and 140d. In the preferred embodiment of the invention, since the address signal is thirty-two bits wide, and because each of segments 140a, 140b, 140c and 140d contain thirty-two (25) bits, the number of bits stored by segment start registers 144a, 144b, 144c and 144d is twenty-seven. Associated with each of the thirty-two words stored in each of segments 140a, 140b, 140c and 140d is a flag bit 142 for indicating the presence of the instruction code within the corresponding word when set, and for indicating the absence of an instruction code therewithin when not set. MSB comparator 146 is connected to address lines 34a, for comparing the twenty-seven most significant bits on address lines 34a with the contents of the segment registers 144a, 144b, 144c, and 144d. LSB decoder 148 is also connected to address lines 34a and, as will be discussed below, is for decoding the five least significant bits of the address lines 34a. Input/output buffer 150 is connected between data lines 34d and segments 140a, 140b, 140c and 140d, for controlling the output of instruction cache 36 to program bus 34. Instruction cache 36 further contains least-recently-used (LRU) stack 152 which points to segment registers 144a, 144b, 144c and 144d corresponding to the order in which they were most recently used.

In operation during a fetch cycle, where the memory address of the instruction code to be fetched does not reside in RAMs 16 or 18, or in ROM 20, but in external memory, MSB comparator 146 receives the twenty-seven most significant bits of the address signal on address lines 34a of program bus 34, and compares them to the contents of segment registers 144a, 144b, 144c and 144d. In the event that a match is found, LSB decoder 148 then decodes the five least significant bits of the address signal on address lines 34a, to select the one of flag bits 142 corresponding to the one of thirty-two words within either segment 140a, 140b, 140c or 140d of the full address signal on address lines 34a. If the corresponding flag bit 142 is set, input/output buffer 150 will present the contents of the corresponding word within the matched segment 140a, 140b, 140c or 140d onto data lines 34d of program bus 34, and the access of the instruction code stored in instruction cache 36 is completed. In addition, the segment register 144a, 144b, 140c or 140d which was matched is pointed to by the top of LRU stack 152, and the non-matching segment register 144a, 144b, 144c or 144d is pointed to by the bottom of LRU stack 152. The segment pointed to by the bottom of LRU stack 152 is the least recently used one of segments 140a, 140b, 140c and 140d, and will be the segment which is replaced in the event of a cache "miss", as will be explained below.

In some applications, some of the words in segments 140a, 140b, 140c and 140d may not be loaded with instruction codes. Therefore, the possibility arises that the twenty-seven most significant bits on address lines 34a of program bus 34 will match the contents of one of segment registers 144a, 144b, 144c and 144d, but the word within the matching one of segments 140a, 140b, 140c or 140d corresponding to the five least significant bits will not contain an instruction code. In this event, the flag bit 142 for the corresponding word is not set (i.e., contains a "0" logic state). This is a cache "miss", and the instruction code for the corresponding address must be read from the addressed memory location in external memory; input/output buffer 150 will load the instruction code from data lines 34d of program bus 34 into the corresponding word within the matched segment 140a, 140b, 140c or 140d, with the corresponding flag bit 142 being set to a "1" logic state. However, since the most significant bits matched one of segment registers 144a, 144b, 144c and 144d, the matching one of segment registers 144a, 144b, 144c or 144d will be pointed to by the top of LRU stack 152, and the other one of segment registers 144a, 144b, 144c and 144d will be pointed to by the bottom of LRU stack 152.

In the event that the nineteen most significant bits on address lines 34a of program bus 34 match the contents of neither one of segment registers 144a, 144b, 144c or 144d, a cache "miss" also occurs. In this event, flag bits 142 will be reset for all words in the one of segments 140a, 140b, 140c or 140d which corresponds to the least recently used one of segments 140a, 140b, 140c and 140d, which is pointed to by the bottom of LRU stack 152. The twenty-seven most significant bits on address lines 34a will then be stored into the segment register 144a, 144b, 144c or 144d, for the least recently used one of segments 140a, 140b, 140c or 140d, and the instruction code received from external memory on data lines 34d will be loaded into the corresponding one of the thirty two words in the "new" segment corresponding to the five least significant bits on address lines 34a, and its flag bit 142 will be set to a "1" state. The one of segment registers 140a, 140b, 140c or 140d containing the newly loaded instruction code will be pointed to by the top of LRU stack 152, with the other segment register 140a, 140b, 140c or 140d pointed to by the bottom of LRU stack 152.

A status register is contained in CPU 12 (not shown). Three bits are contained within the status register which control the operation of instruction cache in a manner apart from that described above. A first bit is the cache clear bit which, when set, resets all of flag bits 142, in effecting clearing the contents of instruction cache 36. A second such control bit in the status register is the cache enable bit which, when set, enables operation of instruction cache 36; conversely, when the cache enable bit is not set, instruction cache 36 is disabled to the extent that it is in no way accessed, regardless of the address value on address lines 34a. During such time that the cache enable bit is not set, the contents of segment registers 144a, 144b, 144c and 144d, flag bits 142, and the words within segments 140a, 140b, 140c and 140d themselves, are not alterable. The third such bit within the status register is the cache freeze bit. When the cache freeze bit is set, only fetches from instruction cache 36 are allowed in the event of cache "hits". In the event of a cache "miss", however, no modification of flag bits 142, segment registers 144a, 144b, 144c and 144d, or LRU stack 152 is performed; the instruction code fetch is merely performed from external memory without affecting instruction cache 36.

Referring now to FIG. 1 and 10, the construction and operation of DMA coprocessor 22 will be described. Direct memory access operations are useful in moving blocks of stored data from one memory area to another without intervention of the central processing unit (e.g., CPU 12). For microcomputer 10 described herein, direct memory access is also useful for moving blocks of data between external memory and on-chip memories 16 and 18. As shown in FIGS. 1 and 8, DMA communications of data occur on DMA bus 38 and receipt of control and source/destination address information occur from peripheral bus 28.

It should be noted that peripheral bus 28 contains address lines 28a and data lines 28d, which carry address information and data, respectively, in the same manner as data bus 30, program bus 34, and DMA bus 38 discussed heretofore. Referring back to FIG. 1, it is apparent that address lines 28a and data lines 28d of peripheral bus 28 are directly connected, and therefore correspond, to the lines I/OAn and I/ODn, respectively, at the output of peripheral port 25. Accordingly, in order to present an address, or communicate data from or to, peripheral bus 28, the desired address is made to correspond to a value within an address space serviced by peripheral port 25. The memory-mapped registers within DMA coprocessor which are described below are therefore within the memory address space 0001000A0$_h$ through 0001000FF$_h$.

For purposes of clarity, the DMA coprocessor 22 shown in FIG. 10 shows in detail only one DMA channel 21. It should be noted that five additional DMA channels similar to DMA channel 21 are also incorporated in DMA coprocessor 22 of the preferred embodiment. DMA channel 21 has some registers that have a corresponding auxiliary register. Those auxiliary registers are used during split-mode operation that splits one DMA channel to have separate source and destination paths that bound one half to the input FIFO and the other half to the output FIFO of a communication port. The channel utilizing the non-auxiliary registers is called the primary, and the channel utilizing the auxiliary registers for DMA transfers is called the auxiliary channel. Thus, the functions of the auxiliary registers are similar to their non-auxiliary counterparts. Auxiliary registers are used during split-mode operation and not used during unified mode. A detailed description of the split-mode operation will be described herein below.

DMA channel 21 contains control register 300, transfer counter register 301, auxiliary count register 302, destination address register 303, destination index register 304, source address register 305, source index register 306, link pointer register 307 and auxiliary pointer 308, each of which are connected to address lines 28a and data lines 28d of peripheral bus 28 and each of which are mapped into corresponding address locations of the memory address space of microcomputer 10. DMA channel 21 further contains data register 309, which is connected to data lines 38d of DMA bus 38. Address lines 38a of DMA bus are connected to destination address register 303, source address register 305, link pointer register 307 and auxiliary pointer 308. Control logic 310 is connected to control register 300 so that the contents of the bits therein will effect the control of DMA channel 21. Control logic 310 generates a signal to transfer counter register 301 and auxiliary count register 302 on line DECR and DECRX respectively and receives a signal from transfer counter 301 and auxiliary count register 302 on line ZERO and ZEROX respectively. Control logic 310 provides a LOAD signal to destination address register 303 and source address register 305; control logic 310 further provides signals to data register 309 on lines WRITE and STORE. To effect the desired memory read/write operations, control logic 310 generates read/write signals which are connected to controller 14, so that controller 14 can generate such control signals to memories 16, 18 and 20, and to peripheral ports 24, 25 and 26, as discussed above relative to memory access control by controller 14.

Control register 300 is a thirty-two bit addressable register which is written to in order to configure DMA-channel 21. The DMA channel 21 is very flexible as evident from the multitude of different control variations configurable by setting the bits in the various positions of control register 300 to either a logic "1" or "0" state. Each of the thirty-two control bits in the control register 300 are described in detail in Table 4.

TABLE 4

| | | DNA Channel Control Register |
|---|---|---|
| Bit Position | Bit Definition | |
| 0-1 | DNA PRI | DMA PRIority. Defines the arbitration rules to be used when a DMA channel and the CPU are requesting the same resource. Affects unified mode and the primary channel in split mode. |
| 2-3 | TRANSFER MODE | Defines the transfer mode used by the DMA channel. Affects unified mode and the primary channel in split mode. |
| 4-5 | AUX TRANSFER MODE | Defines the transfer mode used by DMA channel. Affects the auxiliary channel in split mode only. |
| 6-7 | SYNCH MODE | Determines the mode of synchronization to be used when performing data transfers. Affects unified mode and the primary channel in split mode. If a DMA channel is interrupt driven for both reads and writes, and the interrupt for the write comes before the interrupt for the read, the interrupt for the write is latched by the DMA channel. After the read is complete, the write will be able to be done. |
| 8 | AUTO INIT STATIC | If AUTO INIT STATIC = 0, the link pointer is incremented during autoinitialization. If AUTO INIT STATIC = 1, the link pointer is not incremented (it is static) during autoinitialization. Affects unified mode and the primary channel in split mode. |
| 9 | AUX AUTO INIT STATIC | If AUTO INIT STATIC = 0, the link pointer is incremented during autoinitialization. If AUTO INIT STATIC = 1, the link point is not incremented (it is static) during autoinitialization. Affects the auxiliary channel in split mode only. It is useful to keep the link pointer constant when autoinitializing from the on-chip com ports of other stream oriented devices such a FIFOs. |
| 10 | AUTOINIT SYNCH | If AUTO INIT SYNCH = 0 then the interrupt enabled by the DMA interrupt enable register in the CPU used for DMA reads is ignored and the autointialization reads are not synchronized with any interrupt signals. If AUTO INIT SYNCH = 1, then the interrupt enabled by the DMA interrupt enable register in the CPU used for DMA reads is also used to synchronize the autoinitialization reads. Affects unified mode and the primary channel in split mode. |
| 11 | AUX AUTOINIT SYNCH | Affects split mode only. If AUX AUTOINIT SYNCH = 0 then the interrupt enabled by the DMA interrupt enable register in the CPU used for DMA reads is ignored and the autoinitialization reads are not synchronized with any interrupt signals. If AUTOINIT SYNCH = 1, then the interrupt enabled by the DMA interrupt enable register in the CPU used for DMA reads is also used to synchronize the autoinitialization reads. Affects the auxiliary channel in split mode only. |
| 12 | READ BIT REV | If READ BIT REV = 0, then the source address is modified using 32-bit linear addressing. If READ BIT REV = 1, then the source address is modified using 24-bit bit-reversed addressing. Affects unified mode and the primary channel in split mode. |
| 13 | WRITE BIT REV | If WRITE BIT REV = 0, then the source address is modified using 32-bit linear addressing. If WRITE BIT REV = 1, then the source address is modified using 24-bit bit-reversed addressing. Affects unified mode and the auxiliary channel in split mode. |
| 14 | SPLIT MODE | Controls the DMA mode of operation. If SPLIT MODE = 0, then DMA transfers are memory to memory. This is referred to as unified mode. If SPLIT MODE = 1, the DMA is split into two channels allowing a single DMA channel to perform memory to communication port and communication port to memory transfers. May be modified by autoinitialization in unified mode or by autoinitialization by the auxiliary channel in split mode. |
| 15-17 | COM | Defines a communication port to be used for DMA |

TABLE 4-continued

| Bit Position | | Bit Definition |
|---|---|---|
| | DNA Channel Control Register | |
| | PORT | transfers. If SPLIT MODE = 0, then COM PORT has no affect on the operation of the DMA channel. If SPLIT MODE = 1, then COM PORT defines which of the six communication ports to use with the DMA channel. May be modified by autoinitialization in unified mode or by autoinitialization by the auxiliary channel in split mode. |
| 18 | TCC | Transfer counter interrupt control. If TCC = 1, a DMA channel interrupt pulse is sent to the CPU after the transfer counter makes a transition to zero and the write of the last transfer is complete. If TCC = 0, a DMA channel interrupt pulse is not sent to the CPU when the transfer counter makes a transition to zero. Affects unified mode and the primary channel in split mode. DMA channel interrupts to the CPU are edge triggered. |
| 19 | AUX TCC | Auxiliary transfer counter interrupt control. If AUX TCC = 1, a DMA channel interrupt pulse is sent to the CPU after the auxiliary transfer counter makes a transition to zero and the write of the last transfer is complete. If AUX TCC = 0, a DMA channel interrupt pulse is not sent to the CPU when the auxiliary transfer counter makes a transition to zero. Affects the auxiliary channel in split mode only. The DMA channel interrupts pulse is sent if TCC = 1 and the transfer counter is 0 and the write of the last transfer is complete or if AUX TCC = 1 and the transfer counter is 0 and the write of the last transfer is complete. |
| 20 | TCINT FLAG | Transfer counter interrupt flag. This flag is set to 1 whenever a DMA channel interrupt pulse is sent to the CPU due to a transfer counter transition to zero and the write of the last transfer completing. Whenever the DMA control register is read this flag is cleared unless the flag is being set by the DMA in the same cycle as the read. In this case TCINT is not cleared. Affected by unified mode and the primary channel in split mode. |
| 21 | AUX TCINT FLAG | Auxiliary transfer counter interrupt flag. This flag is set to 1 whenever a DMA channel interrupt pulse is sent to the CPU due to an auxiliary transfer counter transition to zero and the write of the last transfer completing. Whenever the DMA control register is read, this flag is cleared unless the flag is being set by the DMA in the same cycle as the read. In this case AUX TCINT is not cleared. Affected by the auxiliary channel in split mode only. Since only one DMA channel interrupt is available for a DMA channel, you can determine what event set the interrupt by examining TCINT FLAG and AUX TCINT FLAG. |
| 22-23 | START | Starts and stops the DMA channel in several different ways. Affects unified mode and the primary channel in split mode. |
| 24-25 | AUX START | Starts and stops the DMA channel in several different ways. Affects the auxiliary channel in split mode only. The START and AUX START bits, if used to hold a channel in the middle of an autoinitialization sequence, will hold the autoinitialization sequence. If the START or AUX START bits are being modified by the DMA channel (for example, to force a halt code of 10 on a transfer counter terminated block transfer) and a write is being performed by an external source to the DMA channel control register, the internal modification of the START or AUX START bits by the DMA channel has priority. |
| 26-27 | STATUS | Indicates the status of the DMA channel. Updated in unified mode and by the primary channel in split mode. Updates are done every cycle. |
| 28-29 | AUX STATUS | Indicates the status of the DMA channel. Updated by the auxiliary channel in split mode only. In split-mode, updates are done every cycle. The STATUS and AUX STATUS bits are used to determine the current status of the DMA channels and to |

TABLE 4-continued

| | DNA Channel Control Register |
|---|---|
| Bit Position | Bit Definition |
| | determine if the DMA channel has halted or been reset after writing to the START or AUX START bits. |
| 30-31 Reserved | Read as 0. |

Source address generator 320 calculates a source address by adding the contents of source address register 305 with the contents of the corresponding source index register 306 with the result stored in source address register 305 whereby source address register 305 contains the source address for the data to be transferred from. Likewise, destination address generator 330 calculates a destination address by adding the contents of destination address register 303 with the contents of the corresponding destination index register 304 with the results stored in destination address register 303 whereby destination address register 303 contains the destination address for the data to be transferred to. Depending upon the logic state of bit 12 (READ BITREV) and of bit 13 (WRITE BITREV) in control register 300, the source and destination address generators, respectively can perform either linear (normal addition) or bit reversed (reverse carry propagation) addition. The source index register 306 and the destination source index register 304 are signed values thus when combined respectively with the source address register 305 and destination address register 306, addresses may be incremented or decremented for DMA accesses. Data register 309 is a temporary register for buffering data from and to data lines 38$d$ of DMA bus 38; the value of data line 38$d$ is loaded into data register 309 responsive to a signal on line WRITE, and the contents of data register 309 are presented to data line 38$d$ responsive to a signal on line STORE.

Control logic 310 is further connected to controller 14, so that the operation of DMA channel 21 is controlled consistently with the operation of the rest of microcomputer 10. As will be evident below, the DMA can be interrupt synchronized, so that the receipt or transmission of data from external sources can be done without conflict among CPU 12, DMAcoprocessor 22, and the external source. START bit 300$a$ of control register 300 enables and disables the operation of DMA channel 21, while AUX START bit 300$b$ of control register 300 enables and disables the split-mode operation of DMA coprocessor. A logic "1" state in the corresponding bit position enables operation and a logic "0" state disables operation. TCC bit 300$c$ of control register 300 controls ready logic 310 so that, when TCC bit 300$c$ is set to a "1" state, the DMA transfer is terminated upon transfer counter register 301 reaching zero. AUX TCC bit 300$d$ of control register 300 controls ready logic 310 the same way as the TCC bit 300$c$ except that the DMA transfer is terminated upon auxiliary count register 302 reaching zero. Sync bits 300$e$ and 300$f$ allow configuration of the synchronization of DMA channel 21 with either the source or destination of the transferred data. TCINT bit 300$g$, when set to a "1" state, creates an internal interrupt when the contents of transfer counter register 301 reach zero. Control logic 310 is connected to controller 14 to generate an internal interrupt signal on line 312, and to respond to the interrupt acknowledge signal from interrupt logic 250 on line 314. AUX TCINT bit 300$h$ functions like TCINT except creates an internal interrupt when the contents of the auxiliary count register 302 reach zero. Interrupt lines responding are 312$a$ and 314$a$ for sending an interrupt and receiving an acknowledge signal to and from interrupt logic 250, respectively.

The DMAoperation performed under the control of DMA controller 22 can be interrupt-driven in conjunction with controller 14, so that the operation can be externally controlled. As described above relative to controller 14, internally generated interrupts are received and handled by interrupt logic 250 in controller 14. Control logic 310 further generates an interrupt request signal to controller 14 on line 313, and receives an interrupt active signal therefrom on line 315. The interrupt request signal on line 313 indicates that DMA controller is waiting for a DMA-related interrupt generated by an external device, and the interrupt active signal on line 315 indicates that such an interrupt has been received by controller 14 and is to be serviced. Synchronization is controlled by control logic 310 generating the interrupt request signal at predetermined points in the DMA transfer cycle and waiting for the interrupt active signal before proceeding; the selection of the synchronization points is made by loading bits 300$e$ and 300$f$ of control register 300. Table 5 lists the synchronization modes performable by DMA coprocessor 22.

TABLE 5

| Bits 300e/f | Interrupt synchronization |
|---|---|
| 00 | No interrupt synchronization. |
| 01 | Source synchronization; DMA read on interrupt, write when available |
| 10 | Destination synchronization; DMA read when available; write on interrupt |
| 11 | Source and destination sync; DMA read on interrupt; write on next interrupt |

In operation, the transfer counter register 301, destination address register 303, and source address register 305 of DMA channel 21 are first loaded with the initial conditions as desired. Each of these registers 301, 303 and 305 are addressable by address lines 28$a$ of peripheral bus 28 using a normal memory write instruction executed by microcomputer 10; implicit in FIG. 10 for each of the registers 301, 303 and 305 is decoding logic for controlling the loading of said registers 301, 303 and 305 when addressed. Control register 300 is also loaded by addressing its memory location, thereby configuring DMA channel 21 as desired. Control logic 310 is responsive to START bit 300$a$ being set to a "1" state, enabling the operation of DMA controller 22.

By way of example, control register 300 of DMA channel 21 is loaded with the necessary data so that the selected synchronization mode will be destination synchronization. Thus, control logic 310 will first disable control logic 310 from accepting internal interrupt signals from interrupt logic 250. The source address register 305 of DMA channel 21 is loaded with the address of the source memory. The destination address register 303 (of DMA channel 21) is loaded with the address of the destination memory, and transfer counter 301 is loaded with the number of words to be transferred. According to the example, control register 300 is configured for sequential transfer of data for both the source and the destination data thus, source index register 306 and destination index register 304 are set to 1. The START bit of control register 300 initiates the DMA transfer.

Control logic 310 sends signals CALS and CALD to source address and destination address generators to calculate source and destination addresses for data and to store the addresses in the source address register 305 and destination address register 303. Upon a LOAD pulse from control logic 310 to source address register 305, the contents of source address register 305 will be placed on address lines 38a of DMA bus 38. The addressed memory location (either in external memory via peripheral port 24 or 26, or in memories 16, 18 or 20) will be read. Control logic 310 will pulse the STORE line connected to data register 309, to load the value on data lines 38d of DMAbus 38 into data register 309. After the read operation, control logic 310 pulses CALS and the contents of source index register 306 is added to the contents of source address register 305 with the result written back to source address register 305. Also during this time, DECR is pulsed by control logic 310 decrementing the count of the transfer counter register 302 by one.

According to the destination synchronization mode selected by control register 300, control logic 310 will now generate an interrupt request signal on line 313 to interrupt logic 250. Responsive to controller 14 receiving an enabled interrupt directed to DMA, such an event communicated to DMA controller by the interrupt active signal on line 315, control logic 310 will begin the DMAwrite operation. Accordingly, the contents of destination register 303 will be presented upon address lines 38a of DMA bus 38 responsive to control logic 310 presenting the LOAD signal to destination address register 303. Control logic 310 also pulses the WRITE line connected to data register 309, so that the contents of data register 309 are presented upon data lines 38d of DMA bus 38. The addressed memory location is accessed as described before, with controller 14 providing the necessary write control signals to effect the writing of the contents of data register 308 into the addressed location.

After completing the write, the contents of destination address register 303 are added to the contents of destination index register 304 by control logic 310 via line CALD with the result written back to destination address register 303. It should be noted that separate source and index registers allows for variable step sizes or continual reads and/or writes from/to a fixed location.

DMA transfers continue until transfer counter 301 goes to zero and the write of the last transfer is complete. The DMA channel 21 has the ability to reinitialize another set of source and destination addresses to perform another DMA transfer without intervention by CPU 12. When the TRANSFER MODE bits are set to 10 (refer to Table 6) in control register 300, the link pointer register 307 initializes the registers which control the operation of the DMA channel. The link pointer register 307 contains the address of a structure in memory for a new control register and other pertinent values which are loaded into the registers of DMA channel 21 such as: source address register, source index register, destination address register, destination index register, link pointer register and auxiliary registers if using split-mode operation. It should be noted that autoinitialization of the DMA channel occurs without intervention by CPU 12.

TABLE 6

The effect of the TRANSFER MODE field.

| TRANSFER MODE | Effect |
|---|---|
| 00 | Transfers are not terminated by the transfer counter and no autoinitialnation is performed. TCINT can still be used to cause an interrupt when the transfer counter makes a transition to zero. The DMA channel continues to run. |
| 01 | Transfers are terminated by the transfer counter. No autoinitialization is performed. A halt code of 10 is placed in the START field. |
| 10 | Autoinitialization is performed when the transfer counter goes to zero without waiting for CPU intervention. |
| 11 | The DMA channel is autoinitialized when the CPU restarts the DMA using the DMA register in the CPU. When the transfer counter goes to zero, operation is halted until the CPU starts the DMA using the DMA start field in the CPU DMA register and a halt code of 10 is placed in the start field by the DMA. |

Figure 11:
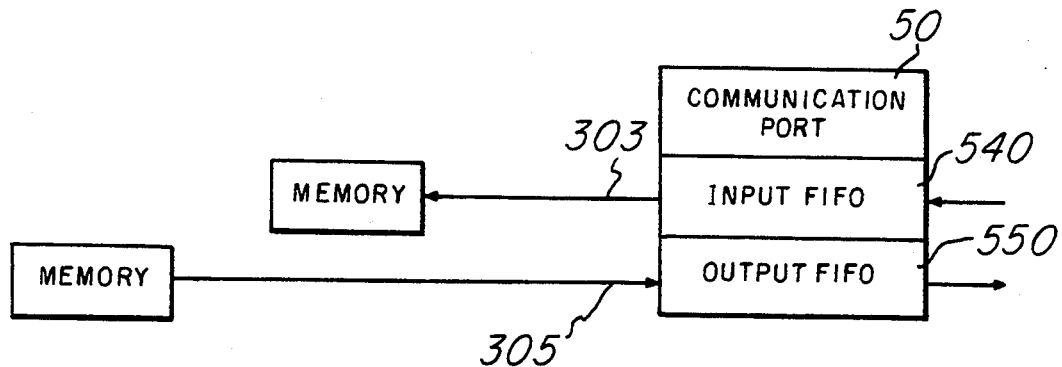
FIG. 11 is a block diagram of the split-mode DMA operation of the microcomputer of FIG. 1.

In the preferred embodiment, any one of the six DMA channels can operate in conjunction with any one of the six communication ports 50–55 using a special DMA transfer mode called split-mode operation as shown in FIG. 11. Split-mode operation separates one DMA channel into two concurrent operations: one dedicated to receiving data from a communication port and writing the data to a location in the memory map, and one dedicated to reading data from a location in the memory map and writing the data to a communication port. The control register 300 has a SPLIT MODE bit that can be set to indicate split mode operation and COM PORT bits to select which communication port is used for split-mode operation (refer to Table 4 register bit 14). During split-mode operation, the DMA channel dedicated to reading data operates independently from the DMAchannel dedicated to writing data. Thus, an auxiliary count register and an auxiliary pointer register for the DMA channel are dedicated to writing data (auxiliary channel) and respectively correspond to transfer count registers and link pointer registers used for the DMA channel dedicated to reading data (primary channel). It should be noted that there are six auxiliary count registers and six auxiliary pointer registers—one for each DMA channel.

Figure 12A:
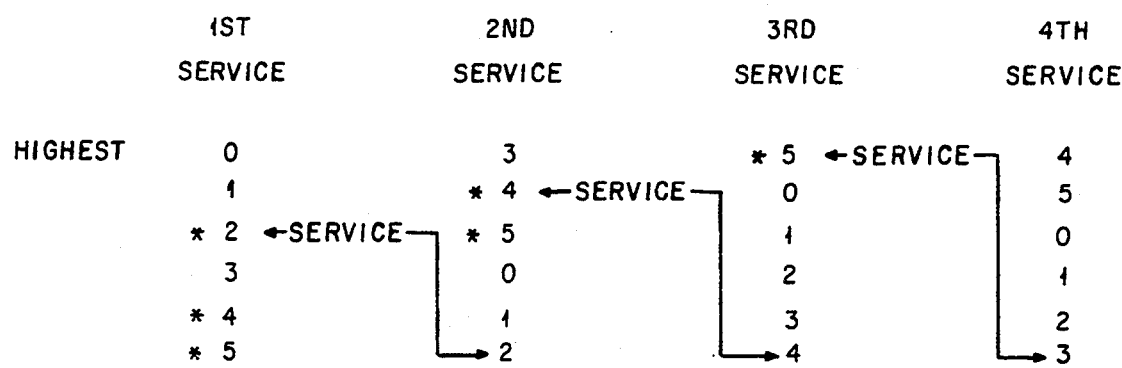
FIG. 12a is a diagram illustrating the rotating priority scheme implemented for the six DMA channels of the microcomputer of FIG. 1.

In the preferred embodiment, as many as six DMA channels are accessing the DMAbus 38 at the same time (and sometimes as much as twelve DMA channels are accessing the DMA bus 38 simultaneously which occurs when operating in split-mode when all six DMA channels are configured to operate in conjunction with all six communication ports). Thus, contained within coprocessor 22 is a priority controller (not shown) that implements a rotating priority scheme. The last DMA channel to get service becomes the lowest priority DMA channel. The other DMA channels rotate through a priority list with the next lower DMA channel from the DMA channel serviced having the highest priority on the following request. The priority rotates every time the most recent priority-granted channel completes its access. FIG. 12a illustrates the rotation of priority across several DMA coprocessor accesses. An asterisk indicates the DMA channel requesting service. When a DMA channel is running in split-mode the arbitration between channels is similar to the just discussed unified DMA channel. The split-mode DMA-channel participates in the rotating priority scheme having the same priority as if it were a unified DMA channel.

Figure 12B:
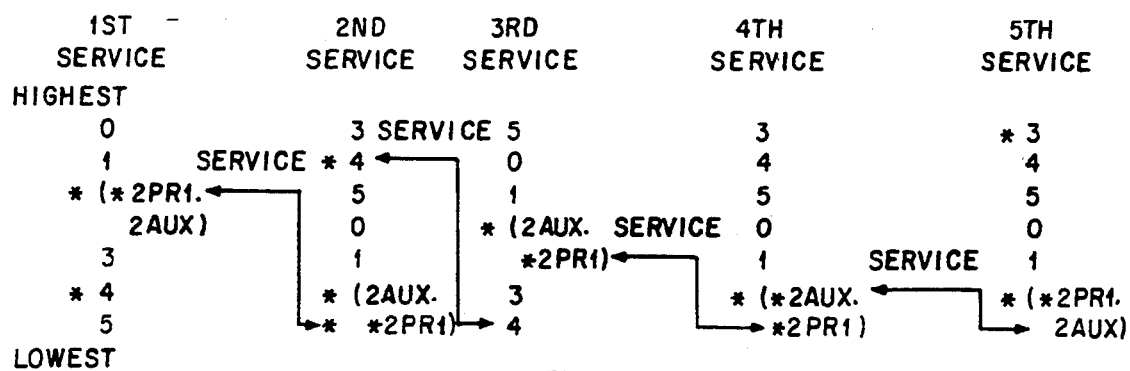
FIG. 12b is a diagram illustrating the rotating priority scheme implemented for split-mode DMA operation of the microcomputer of FIG. 1.

The split-mode DMA channel complicates the process by having a primary channel transfer and an auxiliary channel transfer. Since primary and auxiliary channels can run independent of each other, the two subchannels compete for priority within the host DMA channel while the host DMA channel competes with the other unified DMA channels. FIG. 12b illustrates this priority mechanism that is controlled by the priority controller (not shown) contained within coprocessor 22. In this case assume that only channel two is running in split-mode. The primary channel is designated as 2pri and the auxiliary channel as 2aux. Again, an asterisk (*) indicates the DMA channel requesting service. The first service is a request by 2pri. After 2pri is serviced, channel 2 is moved to the lowest priority level, and 2pri is moved to a lower priority level below 2aux within channel 2. It should be noted that the two subchannels (2pri and 2aux) are prioritized within themselves. Channel 4 having a higher priority than channel 2 is serviced next. On the third service 2pri is serviced. On the 4th service, with 2aux and 2pri both requesting, 2aux is serviced first, channel two becomes the lowest priority channel and 2aux becomes lower priority than 2pri. On the 5th service channel 3 is serviced. If no higher priority services are requested, 2pri would be serviced next.

As is evident from this description, DMA coprocessor 22 is thus operable to transfer the contents of memory locations from memory beginning with the initial source address, to memory locations beginning with the destination address. After completion of the transfers, the DMA coprocessor can autoinitialize itself by fetching from memory the necessary information to perform another DMA transfer sequence. This operation as described herein does not require the intervention of CPU 12 and, since DMA bus 38 provides a separate address and data path for DMA purposes, can allow such a DMA operation to take place simultaneously with program and data accesses in the normal operation of microcomputer 10. DMA operations can occur essentially transparent to the operation of microcomputer 10, greatly enhancing its performance.

Figure 13:
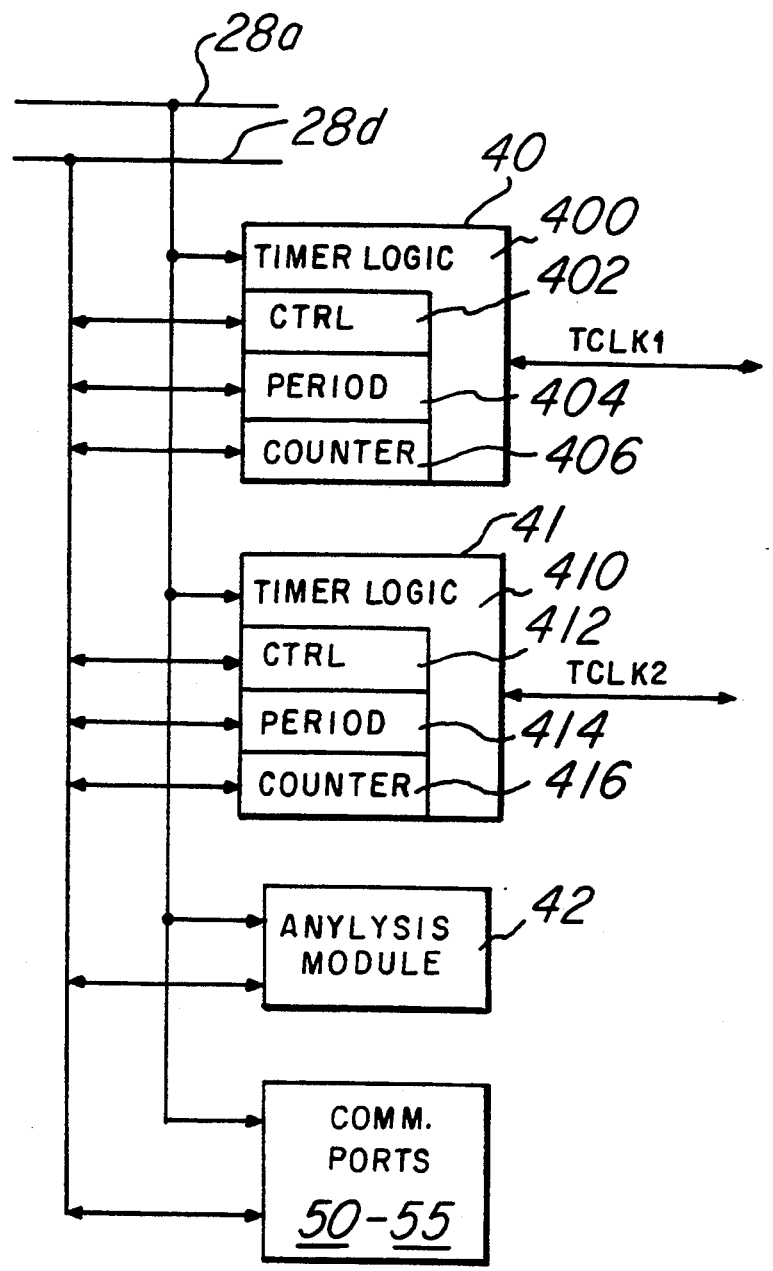
FIG. 13 is an electrical diagram, in block form, of the peripheral modules and peripheral bus of the microcomputer of FIG. 1.

Referring now to FIG. 13, the operation of peripheral bus 28, and its communication with various peripheral functions will be explained. By way of example, timer 40 and 41, analysis module 42 and communication ports 50–55 are the peripheral functions connected to microcomputer 10 described herein. These three functions provide certain communication and/or data processing functions depending upon their construction, but each of said peripheral functions communicate with peripheral bus 28, and thereby with the rest of microcomputer 10, in the same manner. Each of peripherals 40, 41, 42 and 50–55 are configured and operated by microcomputer 10 by using memory mapped registers, addressable by peripheral bus 28, in the manner described below. It should be recalled that, as in the case of the memory-mapped registers contained within DMA controller 22, the memory-mapped registers contained in the peripheral functions described below reside in the input/output address space $000100000_h$ through $0001000FF_h$. The preferred embodiment of microcomputer 10 consists of two timers; each timer operates independently of the other. Thus only timer 40 will be described in detail herein below because timer 41 has similar functions as timer 40 and also that the registers of timer 41 corresponds to those registers of timer 40. For example, timer logic 400 corresponds with timer logic 410, control register 402 corresponds with control register 412, period register 404 with period register 414, counter register 406 with counter register 416, and TCLK1 with TCLK2.

Timer 40 performs the function of measuring predetermined time periods for external control, or for internal control of microcomputer 10. Timer 40 contains timer logic 400, connected to address lines 28a of peripheral bus 28; timer logic 400 is operable to evaluate the address signal on lines 28a of peripheral bus 28, and to allow access to the various memory-mapped registers within timer 40 accordingly. Each of the registers within timer 40 (described below) are addressable by an address signal within the single address space of microcomputer 10. The memory-mapped registers within timer 40 include a control register 402 which contains certain control information necessary to control the operation of timer 40, such as an enable/disable bit, and such as whether timer 40 is controlled by the system clock of microcomputer 10 to provide an external output, or is controlled by external clock pulses to provide an internal signal. Timer 40 further contains addressable period register 404, which is loaded from data lines 28d with the value specifying the period of time to be measured by timer 40. Counter register 406 is also contained within timer 40, and which is incremented by each pulse of either the system clock or a clock pulse received on line TCLK1 externally. In operation, timer logic 400 is responsive to the contents of counter register 406 equaling the contents of period register 404, at which time timer logic 400 generates an internal interrupt signal to controller 14 if control register 402 has so chosen; if control register 402 has selected external output, timer logic 400 generates a pulse on line TCLK1 when the contents of counter register 406 equal the contents of period register 404.

Analysis module 42 is to provide improved emulation, simulation and testability architectures and methods which provide visibility and control without physical probing or special test fixtures. One such analysis module is described in co-pending and co-assigned U.S. application Ser. No. 388,270 filed Jul. 31, 1989 (TI Docket 14141). Some features supported by analysis module 42 are specifically discussed below. A trace feature enables tracing of the start address of the previous program block, end address of the previous program block, and start address of current block, with current program counter (PC) equal to the end address of the current block. This facilitates a reverse assembly of where the program has come from and allows a trace back feature to be implemented in combination with the PC context switch breakpoints.

Sufficient machine state information is implemented to retrieve the last program counter executed and to determine if any repeat single, repeat block, or delayed instruction is active. The machine state information also recalls the machine states required to restart execution from these cases in any of the CPU stop modes. A stop may occur within repeats. Single stepping of the code results in a single instruction being executed. This means only one instruction within a repeat single or block loop is executed.

Faster downloads are supported by implementing short scan paths in the CPU. Short scan paths are accomplished using a partial scan of the CPU and a HLT applied to the CPU MPSD test port.

The behavior of the memory interface differs during emulation mode and simulation mode. In emulation mode, control of the memory interface allows normal operation of the interface to continue while the CPU domain test port is in a scan, pause or halt state. Control signals remain inactive in a high impedance state while Hold functions continue to operate. Memory control signals are to be asserted in the inactive state with correct timing when the system domain test port is in a pause state or scan state. Control signals cannot toggle or glitch because of MPSD test port code changes. In simulation mode, control of the interfaces are such that the control signals are asserted in the machine state with correct timing when the system domain test port is in a SDAT, SCTRL, or PAUS state. Memory interface logic (hold, holda) do not function unless the system test port is in the CNTRL or FUNC state and suspend is not active. Simulation mode slaves system domain clock to the CPU domain execution clock, MPSD codes FUNC, CNTRL, or HLT applied.

Peripherals have independence of operation when the chip is operating in the emulation mode. In simulation mode their operation is tightly coupled to the CPU domain. The peripherals may have from one to three of the following operating modes when the chip is operating in the emulation mode: free, soft and hard. When a peripheral, such as a timer, is allowed to have up to three modes, the specific mode is made available to the user through two dedicated bits in a peripheral control register. These bits do not affect the operation of the peripherals provided the system test port has FUNC applied.

Peripheral free mode means the peripheral continues to operate normally regardless of the CPU domain state or the state of SUSPEND provided the system test port has CNTRL applied.

Peripheral soft allows the coupling of a CPU or system assertion of SUSPEND i.e., CPU domain halted, with the subsequent halt of the peripheral. With peripheral soft, the peripheral continues to operate normally after SUSPEND is asserted until a predefined condition within the peripheral occurs. When this event occurs the peripheral halts execution. The peripheral resumes execution when SUSPEND becomes inactive and the system test port has CNTRL applied.

Peripheral hard allows the direct coupling of a CPU or system assertion of SUSPEND i.e., CPU domain halted, with an immediate halt of the peripheral. With peripheral hard, the peripheral appears as if it is tightly coupled to the CPU domain, halting immediately when SUSPEND is asserted. This assumes the system test port has CNTRL applied. When this occurs the peripheral halts execution. The peripheral resumes execution when SUSPEND becomes inactive and the system test port has CNTRL applied. This mode makes the peripheral execute the same number of clocks of user code as the CPU domain executes.

Peripheral operation in the Simulation Mode is controlled by the System test port, suspend, and the CPU test port. The peripheral clocks may run when, the CPU domain and the System domain test ports have CNTRL applied and the CPU clocks are on, and SUSPEND is not active.

Five instructions are used in the emulation architecture to manage analysis and emulation requested stops. These instructions are:

| a) | ESTOP | - | Emulation Stop |
|---|---|---|---|
| b) | ETRAP | - | Emulation Trap |
| c) | ASTOP | - | Analysis Stop |
| d) | ATRAP | - | Analysis Trap |
| e) | ERET | - | Emulation Return |

These instructions provide the mechanism where by Emulation SW and Analysis generated execution halt requests are processed in conjunction with TRAPEN, allowing the determination of the cause of the trap or stop. The emulation return instruction is separate from a normal return as the two trap instructions set a suspend bit (TRPSUSP) and the emulation return instruction resets this bit. The emulation and analysis traps and returns are identical normal traps and returns with the exception of managing TRPSUSP.

Emulation stop (ESTOP) is placed in memory by the Emulation SW or imbedded in the functional code by the user or compiler. It causes a stop with the pipeline empty regardless of the CPU stop mode. Execution of this instruction causes an associated emulation interrupt. An ESTOP status is set in the CPU and instruction fetches to fill the pipeline do not occur until this flag is reset by Emulation SW. The pipeline may be loaded with a non empty state while this flag is set and the pipeline executes to the empty state when CPU test port codes HLT, or CNTRL are applied. FUNC causes this flag to be reset.

Emulation trap (ETRAP) is placed in memory by the Emulation SW or imbedded in the functional code by the user or compiler. If TRAPEN is true to the CPU, this instruction causes a trap, sets TRPSUSP, and generates an associated emulation interrupt. The pipeline is empty behind it. When TRAPEN is not true to the CPU, the instruction is executed, the emulation interrupt generated, but TRPSUSP is not set and the trap is not taken. In both cases an ETRAP status flag is set in the analysis domain. This bit is resetable by scan.

Analysis stop (ASTOP) is jammed into the instruction pipeline at the earliest time when the analysis requests a stop condition and TRAPEN is false to the CPU. ASTOP has the same characteristics as ESTOP except it has its own status flag which has the same characteristics as the ESTOP status flag.

Analysis trap (ATRAP) is jammed into the instruction pipeline at the earliest time when the analysis requests a stop condition and TRAPEN is true to the CPU. This instruction causes a trap, sets TRPSUSP, and generates an associated emulation interrupt. The pipeline is empty behind it. An ATRAP status flag is set in the analysis domain. This bit is resetable by scan.

Emulation return (ERET) resets TRPSUSP and otherwise acts like a normal return instruction.

Message status register contains status information for controlling the transfer of data and commands to and from the device. These status bits are readable and some are writable.

| The status bits are: | | | Bit Number |
|---|---|---|---|
| a) | WBFUL | - write buffer full | 4 |
| b) | RBFUL | - read buffer full | 3 |

| -continued | | |
|---|---|---|
| The status bits are: | | Bit Number |
| c) CMD | - Command transfer | 2 |
| d) GXFER | - Good transfer | 1 |
| e) MACK | - Message acknowledge | 0 |

ABUSACT indicates that the analysis test port has HLT, CNTRL, or FUNC applied.

The WBFUL status bit is in the analysis domain. It is set via a device write to the message register when the RBFUL flag is not true and ABUSACT is true. This bit is reset via scan.

The RBFUL status bit is in the analysis domain. It is set via scan and reset via a read to the CMD address of the MSG register when CMD is set or a read to the data address of the MSG register when CMD is not set provided ABUSACT is true in both read instances.

The CMD status bit is in the analysis domain. It is set via a device write to the command message register address, when the RBFUL flag is not true and ABUSACT is true. It is reset when a write occurs to the data message register address and the RBFUL flag is not true and ABUSACT is true. The CMD bit scanable and settable to either logical value.

The GXFER status bit is in the system domain. It is set when:
a) A read to the command message address occurs, CMD is true, RDRUL is true, and ABUSACT is true;
b) A read to the data message address occurs, CMD is false, RDFUL is true, and ABUSACT is true;
c) A write to a data or command message address occurs, RBFUL is false, and ABUSACT is true.

The GXFER bit is reset on system FUNC or a read or write to a message register address without a, b, or c being true.

Message acknowledge (MACK) is a writable and readable bit connected to the emulation control block and resides in the system domain. The MACK bit is selectable to appear on EMUO pin and it serves as the handshaking for message transfers.

The message passing register and message register status bits in the analysis domain are on a short analysis scan path. The short analysis scan path is the first path out of the analysis domain. The message register is the first output followed by the message status register bits. It should be noted that both the message passing register and the message register status bits are transferred out in an order starting with the least significant bit (LSB).

Figure 14:
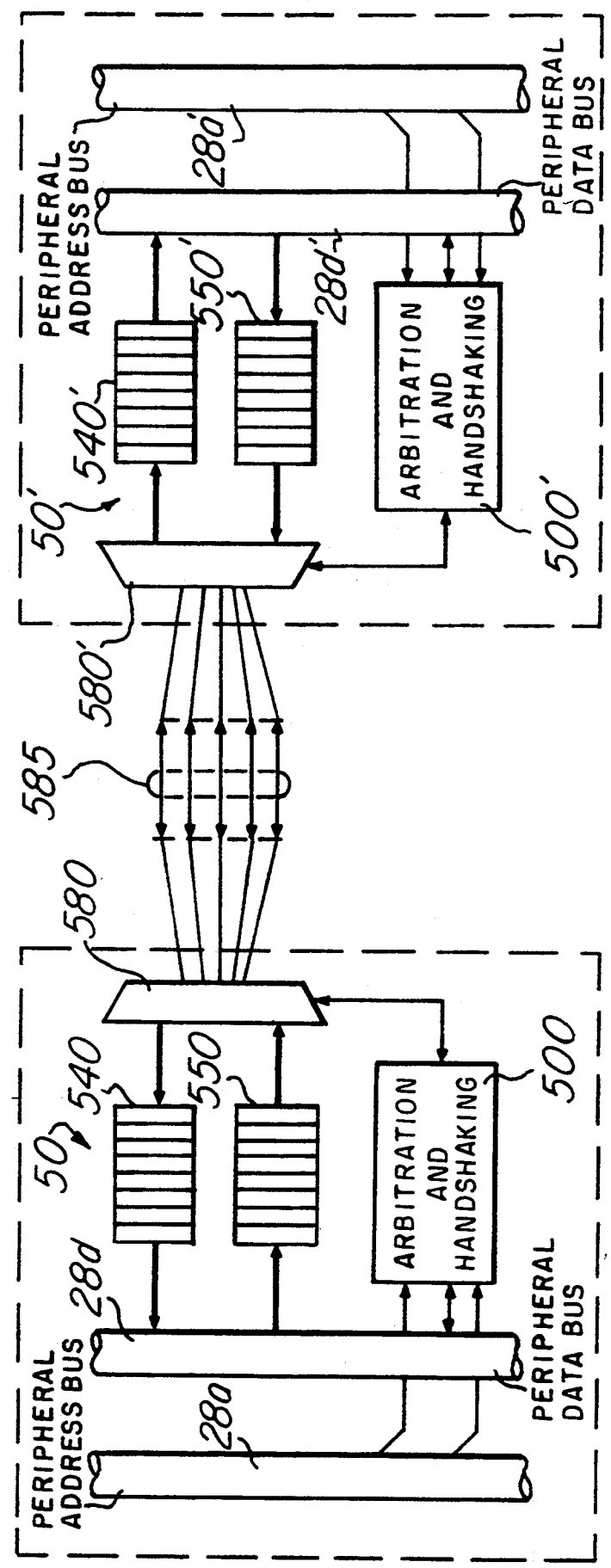
FIG. 14 is an electrical diagram, in block form, of two communication ports directly interfaced.

In one variation of the preferred embodiment another microcomputer similar to the microcomputer 10 hereindescribed is directly coupled to microcomputer 10 via one or more or all of the communication ports 50–55. FIG. 14 illustrates the connection between two microcomputers 10 where one communication port is connected to the other communication port via control and data signals 585. When two microcomputers 10 are coupled via the communication ports, the input and output FIFO registers are combined and thus the number of FIFO registers is doubled. The buffering capacity of the combined communication port is the sum of each individual communication port. The two coupled microcomputers 10 have provisions for pin for pin compatibility enabling the two microcomputers to directly connect via any one of the six communication ports 50–55. It should be noted that with pin for pin compatibility between microcomputers 10, the microcomputers are readily connected using the communication ports.

Figure 15:
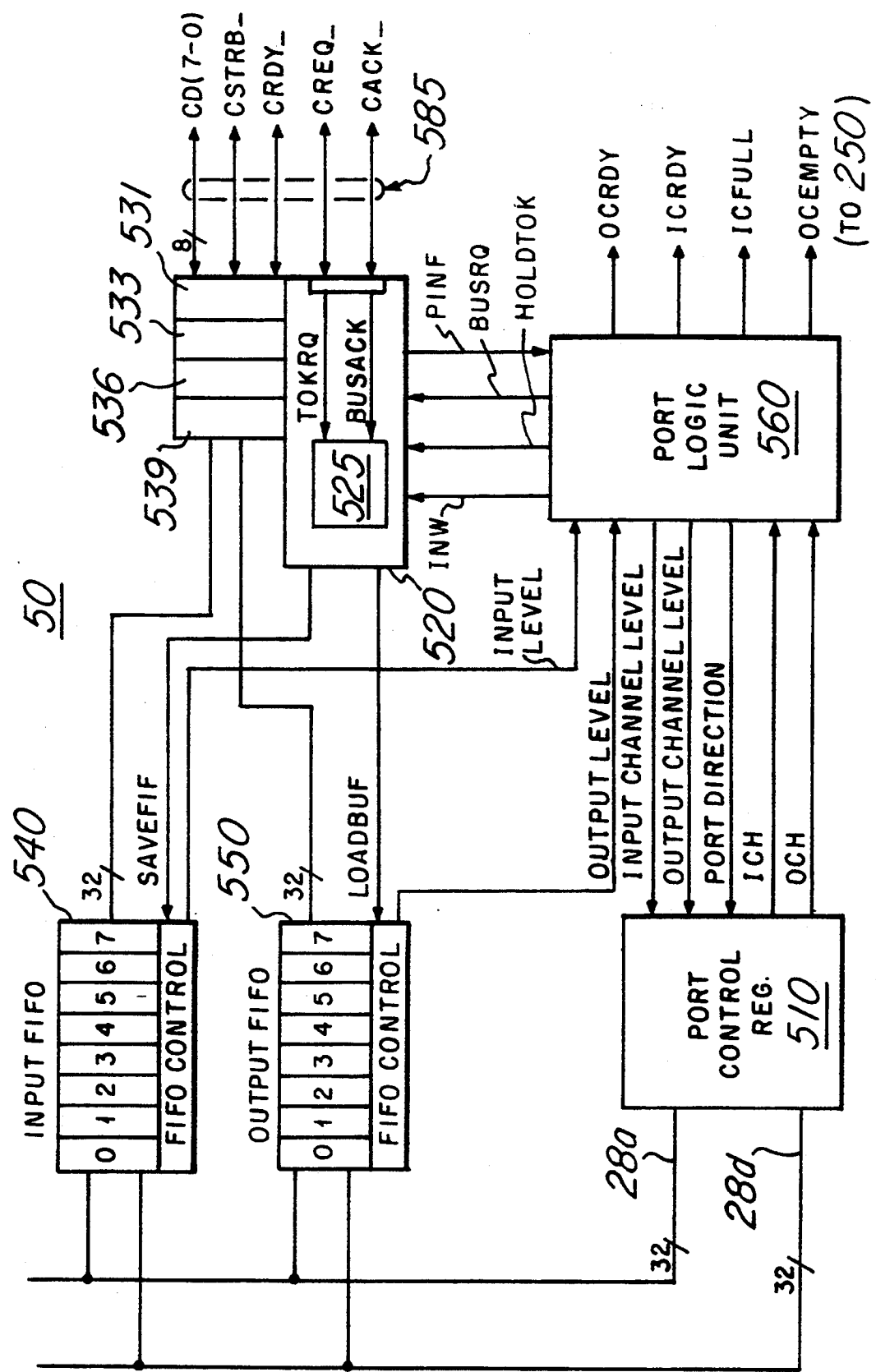
FIG. 15 is an electrical diagram, in block form, of the communication port of the microcomputer of FIG. 1.

Referring now to FIG. 15, the operation of communication ports 50–55 will be explained. FIG. 15 shows the internal architecture of communication port 50, which for purpose of this discussion is functionally identical to the other five communication ports. In order for data transfer to occur with communication ports 50–55, the desired address presented via peripheral bus 28 is made to correspond to a value within the memory address space of microcomputer 10 that corresponds to an address serviced by peripheral port 25. The memory-mapped registers within communication ports 50–55 which are described below are within the memory address space $00010040_b$ through $0001009F_h$.

Communication port 50 contains port control register 510, input first-in-first-out (FIFO) 540, and output FIFO 550, each of which are connected to address lines 28a and data lines 28d of peripheral bus 28, and each of which are mapped into corresponding address locations of the memory address space of microcomputer 10. The input FIFO 540 and the output FIFO 550 each have a corresponding FIFO control that is attached to the respective FIFO unit. Communication port 50 further contains an interface port 530. A port arbitration unit 520 provides handshaking signals to an external device for effectuating data transfers from or to interface port 530. The port control register 510 contain control and status bits for the communication channel. Port logic unit 560 control the interfacing between to the port arbitration unit 520, input and output FIFO units 540 and 550 and the port control register 510. The port logic unit 560 also provides interrupts to the interrupt logic 250.

In order to transmit data, a qualifying token is used for data flow control of the connected communication port. For example, a signal on line BUSRQ from port logic unit 560 to port arbitration unit 520 signals the port arbitration unit 520 to arbitrate for control over the eight-bit communication channel data bus CD(7-0) from external request to use the data bus. It should be noted that arbitrating is not necessary if port arbitration 520 has possession of the qualifying token. The qualifying token is used to determine whether communication port 50 or an external port has control of the communication channel data bus. The qualifying token is passed between the port arbitration unit 520 of communication port 50 and the external port. The port arbitration unit 520 is a state machine having four defined states. Table 7 defines these states.

TABLE 7

| Definition of PAU states | |
|---|---|
| PAU STATE | PAU Status |
| 00 | PAU has token (PORT DIR = 0) and channel not in use 0UTPUT LEVEL = 0). |
| 01 | PAU does not have token (PORT DIR = 1) and token not requested by PAU (OUTPUT LEVEL = 0). |
| 10 | PAU has token (PORT DIR = 0), channel in use (OUTPUT LEVEL not = 0). |
| 11 | PAU does not have token (PORT DIR = 1), token requested by PAU (OUTPUT LEVEL not = 0). |

Figure 16:
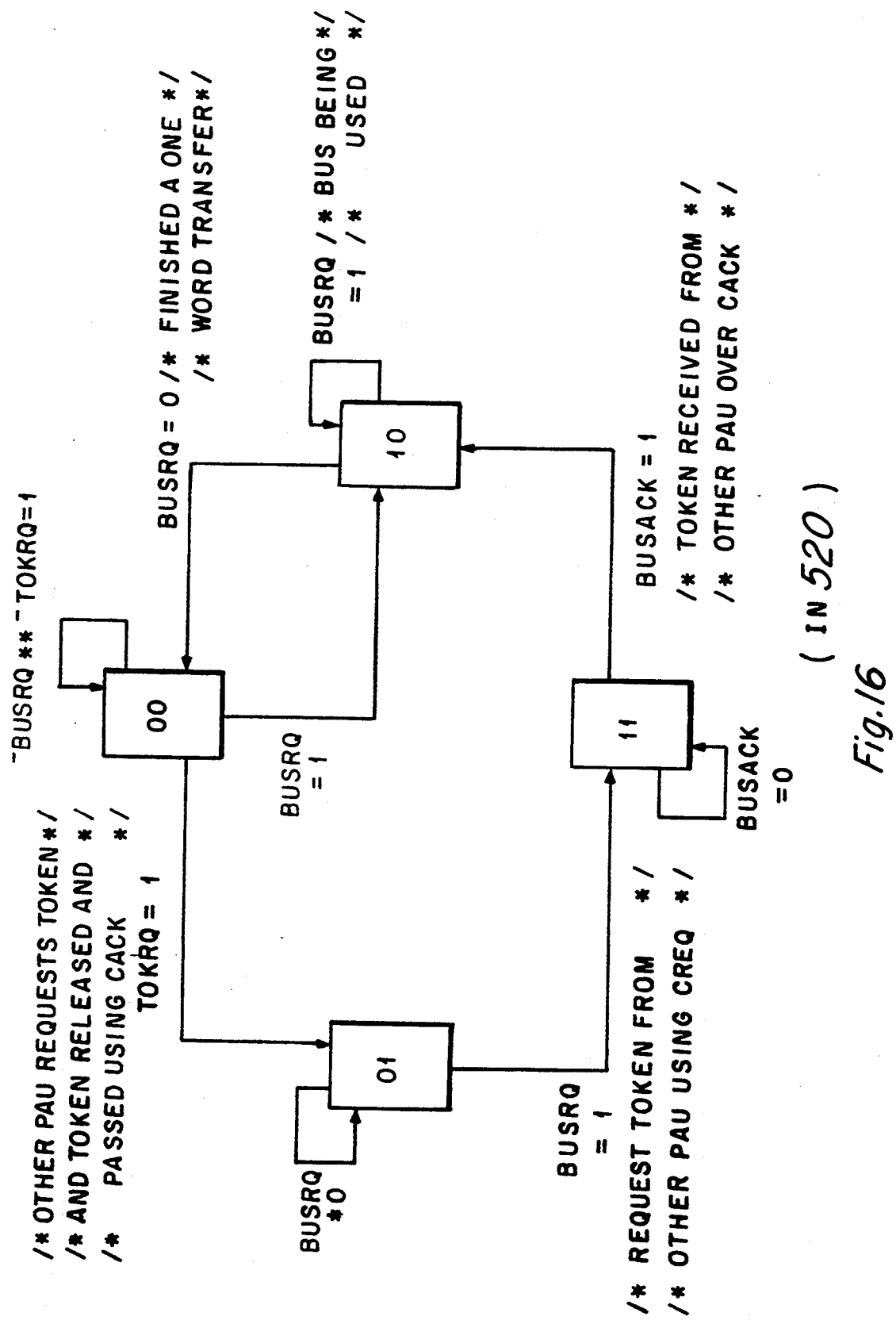
FIG. 16 is a state diagram, in block form, of the communication port arbitration unit of the microcomputer of FIG. 1.

These four states aid in determining whether or not the token can be passed to the requesting communication port and are defined in terms of status information that is available in the port control register 510. FIG. 16 shows the state diagram and controlling equations for the state transitions of the port arbitration unit 520.

For this example, communication port 50 is connected to an external port similarly equipped as shown in FIG. 14. Operation begins with port arbitration unit 520 of communication port 50 in state 00 (with token, channel not in use) connected to a port arbitration unit of the external port in state 01 (without token, token not requested). Communication port 50 is instructed to transmit data to the external port. Port arbitration unit 520 receives a request from port logic unit 560 on line BUSRQ to use the communication port data bus. Port arbitration unit 520 allows the output FIFO to transmit one word immediately, since it has the token, and enters state 10 (with token, channel in use). After the output FIFO transmits that one word, port logic unit 560 removes the bus request (BUSRQ=0) and then port arbitration unit 520 returns to state 00.

Next port arbitration unit of external port receives a request from its port logic unit to use the bus (BUSRQ), port arbitration unit of the external port requests the token from port arbitration unit 520 over the CREQ__ line, state 11, (without token, token requested). This request is seen inside state machine 525 of port arbitration unit 520 via the state variable TOKRQ. When port arbitration unit 520 is in state 00 (with token, channel not in use) the token is transferred using the CACK__ line. When port arbitration unit of the external port receives the bus, this is signalled internally within the port arbitration by a bus acknowledge signal (BUSACK). As a result of the token transfer port arbitration unit 520 enters state 01 (without token, token not requested) and port arbitration unit of the external port enters state 10 (with token channel in use). It should be noted that communication port 50 is not limited to communications with external ports similarly equipped but can interface to external ports that provide proper handshaking signals.

Since port arbitration unit 520 always returns to state 00 after transmitting a single word, tokens may be passed back and forth allowing for a word to be transmitted from communication port 50 and the external port and then from the external port to communication port 50. This provides an inherently fair means of bus arbitration by not allowing any one output FIFO from continually monopolizing the communication data bus thus, preventing the other output FIFO module from being continually blocked. In other words, commensurate loading of the FIFOs is accomplished. If an input FIFO becomes full, a signal INW is sent to port arbitration unit 520 which causes I/O port 531 not to bring CRDY__ low because at the start of the next transmission the first incoming eight-bits will overflow the input FIFO and data will be lost.

Another feature incorporated into the communication ports is the ability effectuate input and output FIFO halting. Input and output FIFO halting is the ability to prevent additional transfers from and to the output and input FIFOs respectively. During system development, debugging and use, the ability to stop an input and output FIFO without the loss of any data that is being sent or received is a very desirable feature. In the preferred embodiment, after a transfer of a word via the communication channel bus the port arbitration unit 520 returns to state 00, by setting either the input channel halt (ICH=1) or the output channel halt (OCH=1) in the port control register 510, port logic unit in turn sends signal HOLDTOK to port arbitration unit 520.

Port arbitration unit 520 has a couple of options after receipt of the HOLDTOK signal. It having possession of the token refuses to relinquish the qualifying token thus preventing data from entering input FIFO 540 via the communication channel bus or it refuses to arbitrate for the qualifying token, thus successfully stopping output FIFO 550 from transmitting data via the communication channel bus.

For example, input FIFO 540 of communication port 50 (connected to external port) has ICH=1. Then the input FIFO 540 is halted based upon the communication channel's current state. The input channel is unhalted when ICH=0. When the input FIFO 540 of communication port 50 is unhalted (ICH=0) communication port 50 releases the qualifying token if requested.

Output FIFO halting is analogous to input FIFO halting. For example, output FIFO 550 of communication port 50 (connected to external port) has OCH=1. Then the output FIFO 550 is halted based upon its current state. If communication port 50 does not have the qualifying token, output FIFO 550 is halted by communication port 50 not requesting the qualifying token. If the communication port 50 has the qualifying token and is currently transmitting a word, then after the transmission is complete, no new transfers will be initiated.

Following the FIFO halting rules discussed above, other possible scenarios of the preferred embodiment include: 1) communication port 50 has the qualifying token, input FIFO 540 is not halted, and output FIFO 550 is halted, then it will transfer the token when requested by the external port; 2) communication port 50 has the qualifying token, input FIFO 540 is halted, and output FIFO 550 is halted, then it will not transfer the token when requested by the external port; 3) coming out of a halted state, if the communication port 50 has the token it may transmit data if necessary, if it needs the token, it will arbitrate for the token as described herein-above.

FIG. 15 further shows port logic unit 560 with interrupt signals OCRDY (output channel ready), ICRDY (input channel ready), ICFULL (input channel full), and OCEMPTY (output channel empty) that are connected to interrupt logic 250. Port logic unit 560 generates those interrupts based upon signals on line input level and output level from input FIFO 540 and output FIFO 550 respectively. But information (PINF) from port arbitration unit 520 and FIFO information from the FIFO registers are fed to port logic unit 560 which supplies port arbitration register 510 input channel level, output channel level and port direction information.

The communication ports support three principle modes of synchronization: a ready/not ready signal that can halt CPU and DMA accesses to a communication port; interrupts that can be used to signal the CPU and DMA; status flags in the communication port control register which can be polled by the CPU.

The most basic synchronization mechanism is based on a ready/not ready signal. If the DMA or CPU attempt to read an empty input FIFO, a not ready signal is returned and the DMA or CPU will continue the read until a ready signal is received. The ready signal for the output channel is the OCRDY (output channel ready) which is also an interrupt signal. The ready signal for the input channel is ICRDY (input channel ready) which is also an interrupt signal.

Interrupts are often a useful form of synchronization. Each communication port generates four different interrupt signals: ICRDY (input channel ready), ICFULL (input channel full), OCRDY (output channel ready) and OCEMPTY (output channel empty). The CPU responds to any of these four interrupt signals. The DMA coprocessor responds to the ICRDY and OCRDY interrupt signals.

The third mode of synchronization that can be employed in the preferred embodiment is CPU polling. The CPU can be setup to poll the status flags in communication port control registers at predetermined intervals or occurrences during the operation of the data processing device.

In addition to the communication ports 50–55, the preferred embodiment incorporates a special split mode DMA capability that transforms one DMA channel into two DMA channels, one dedicated to receiving data from a communication port and writing it to a location in the memory map, and one dedicated to reading data from a location in the memory map and writing it to a communication port. All six DMA channels can support any of the six communication ports.

In the present embodiment data words are thirty-two bits wide, however interface port 530 has a bus eight-bits wide; thus, interface port 530 adjusts for the disparity by having an I/O port 531, an input and output data shifter 533, a multiplexer 536 and a thirty-two bit buffer register 539. For example, to receive incoming data from the external port, a signal CSTRB__ precedes the data signaling communication port 50 the presence of valid data on bus CD(7-0). Of course, external port has possession of the qualifying token thus allowing it to transmit data. The incoming data is received by I/O port 531 where data shifter 533 shifts the received data via multiplexer 536 to the proper packet location within the thirty-two bit buffer register 539. After I/O port 531 receives data from bus CD(7-0), it sends signal CRDY__ to confirm the receipt of data from the external port. Since bus CD(7-0) is eight-bits wide, a data word is divided into four consecutive eight-bit packets to make up the thirty-two bit word used in the preferred embodiment. When four packets of eight-bits of data are placed in buffer register 539, port arbitration unit 520 sends signal SAVEFIF to FIFO control of input FIFO 540, and the contents of the buffer register 539 is stored to input FIFO 540, where the data is accessed via peripheral bus 28 as described herein-above.

To transmit data to the external port, output FIFO 550 receives thirty-two bit data words from peripheral bus 28d. Port arbitration unit 520 sends signal LOADBUF to FIFO control of output FIFO 550 and the contents of output FIFO 550 is transferred to buffer register 539. Multiplexer 536 selects eight-bit packets that are shifted using data shifter 533 via I/O port 531 onto the eight-bit communication bus CD(7-0). It should be noted that possession of the qualifying token by port arbitration unit 520 is implied to transmit data as described above. Communication port 50 signals valid data with CSTRB__ via I/O port 531. Data is transferred via eight-bit bus CD(7-0). The external port receiving the data from bus CD(7-0) signals the transmitting communication post 50 with CDRDY__ thereby acknowledging data is received completing a packet transfer. Three other packets are transferred to complete the thirty-two bit data word.

Figure 18A:
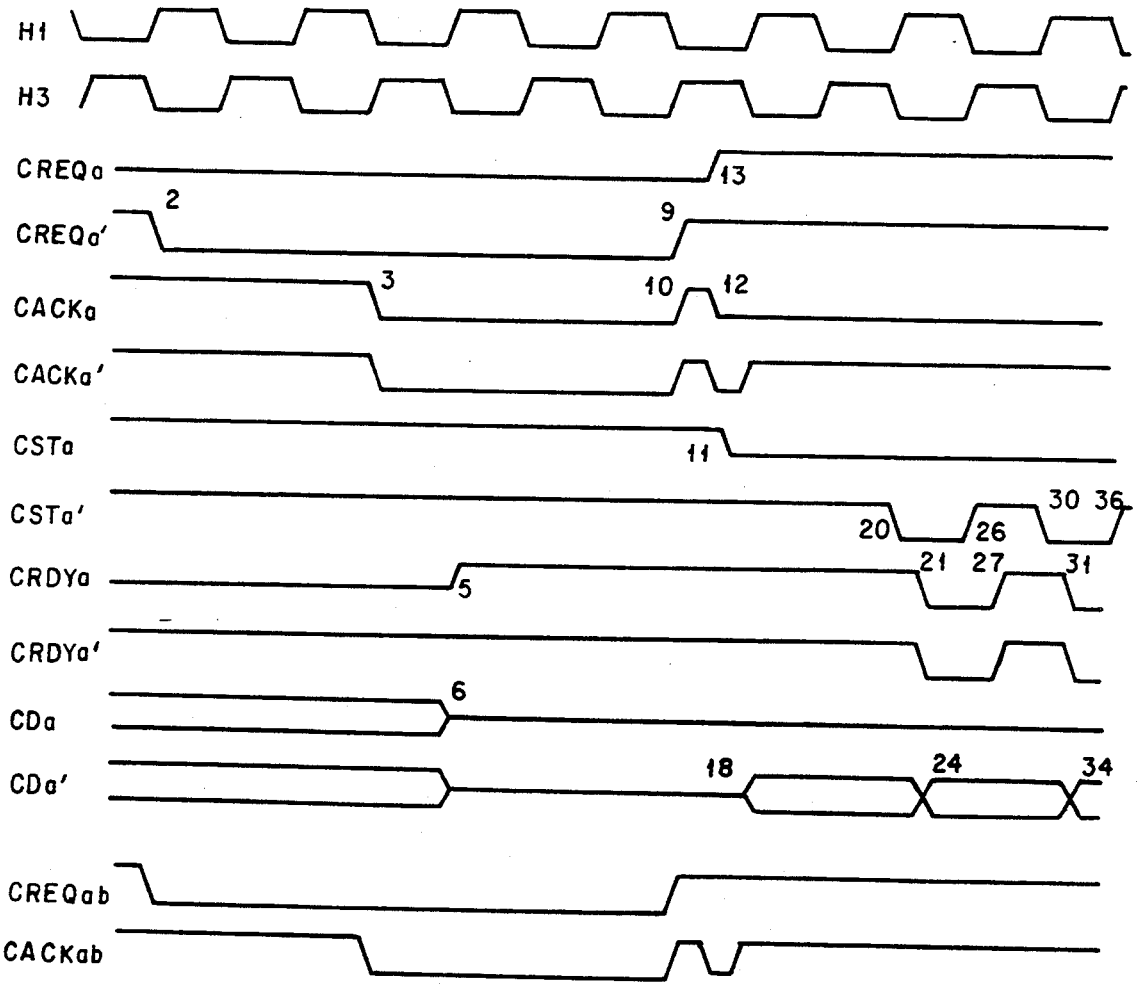
FIG. 18a is a timing diagram illustrating a token transfer between communication ports A and B.

FIG. 18a illustrates the timing for a token transfer sequence between two communication ports, A and B.

Figure 17:
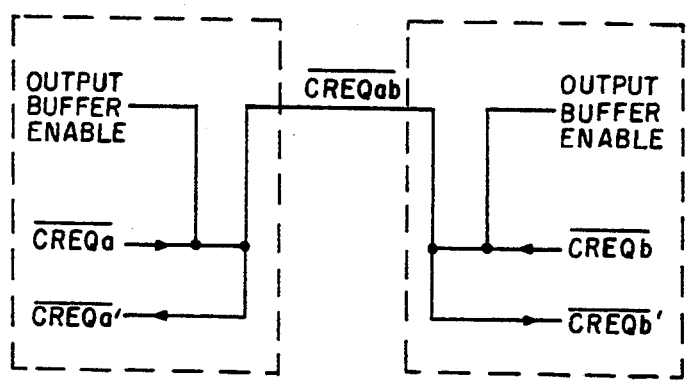
FIG. 17 illustrates the signal convention used between two connected communication ports A and B.
Figure 18B:
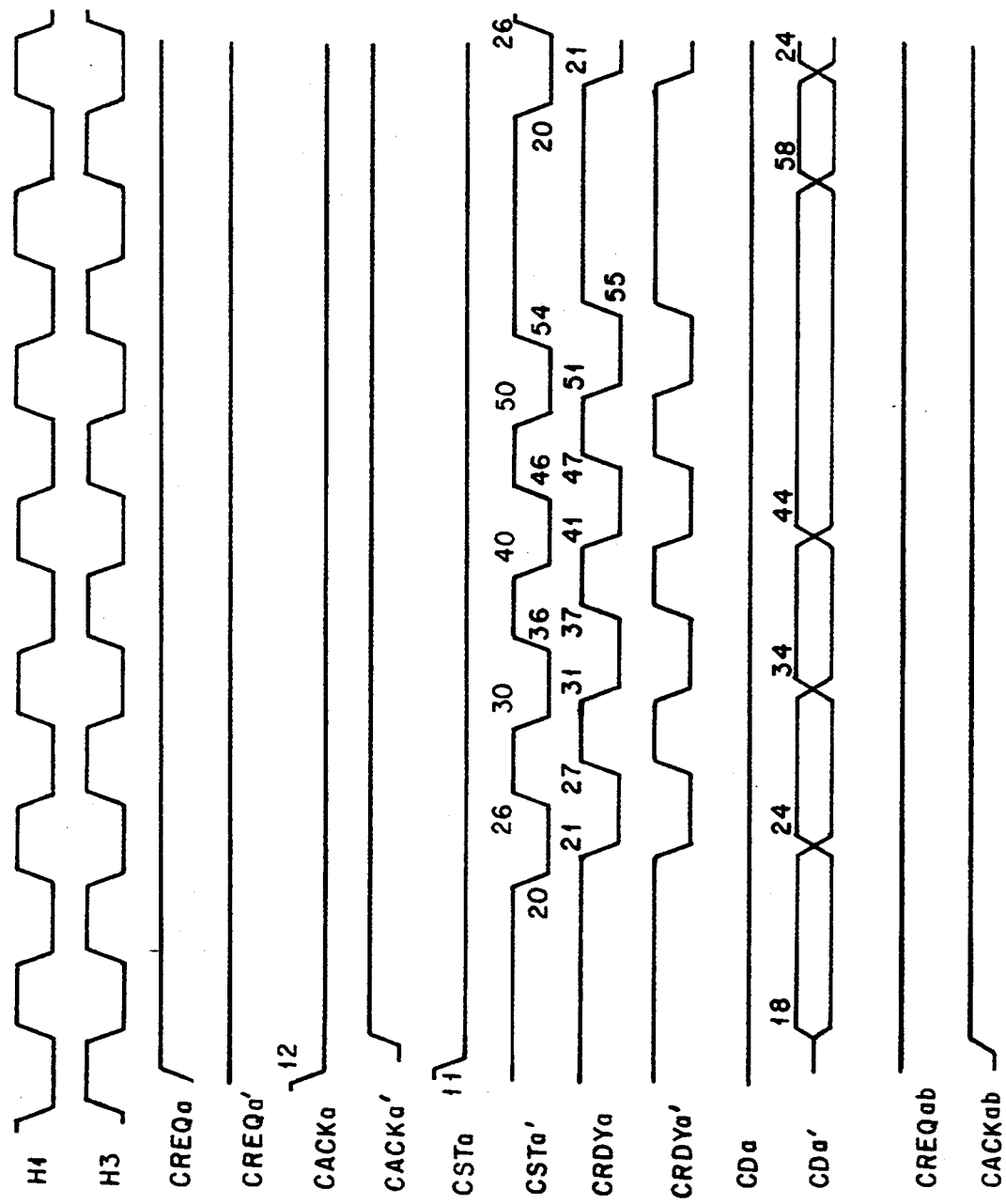
FIG. 18b is a timing diagram illustrating data transfer between communication ports A and B.
Figure 18B:
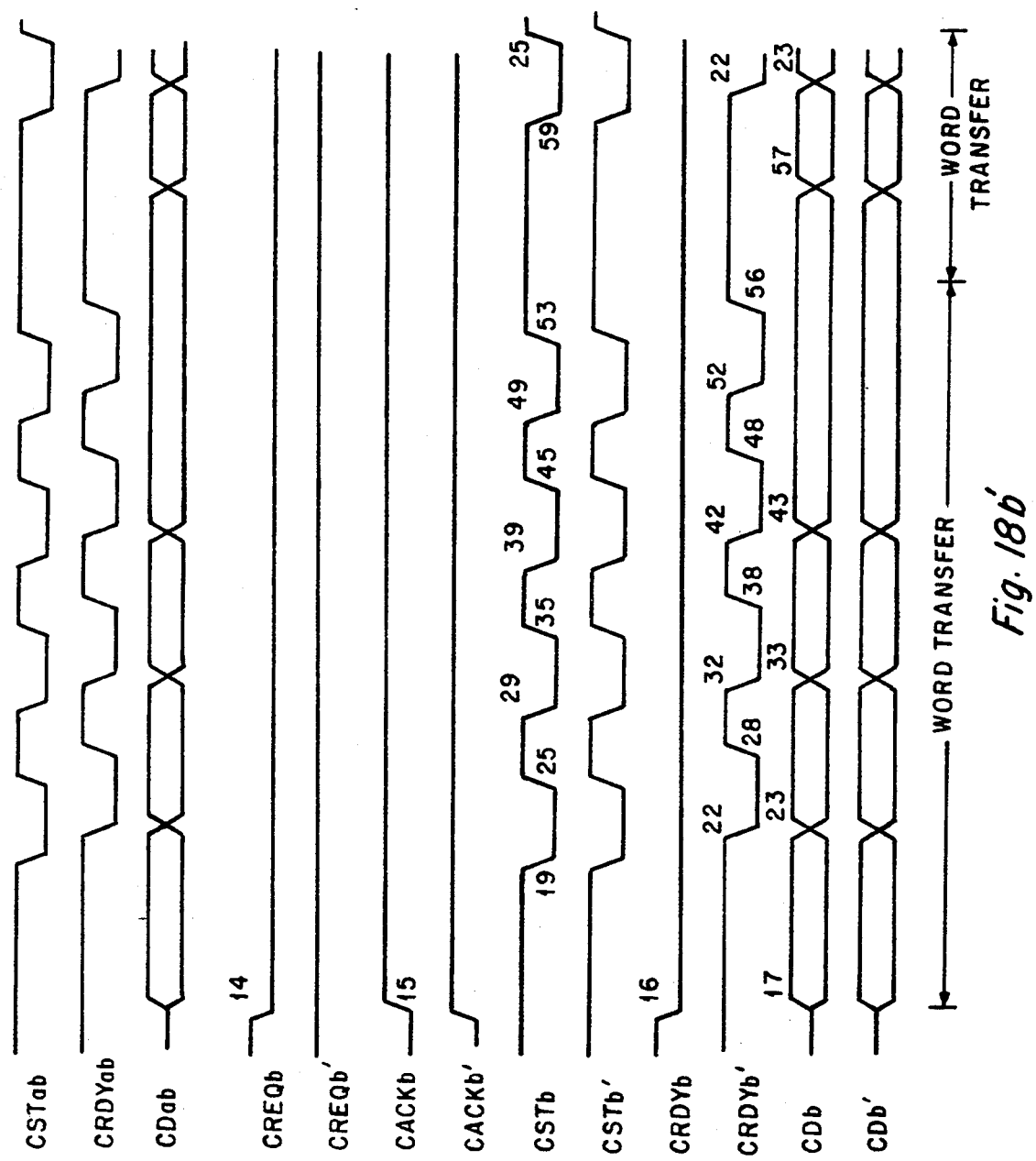

FIG. 18b continues the timing diagram to illustrate a word transfer sequence followed by the start of another word transfer sequence. In order to accurately describe the timing of the operation of the communication ports, it is important to differentiate between the internal signals applied to the pins and the external status seen at the interface between the communication ports. Referring to FIG. 17, internal signals applied to a buffer with a suffix 'a' depicts processor A and 'b' depicts processor B. The external signal between the two connected communication ports is denoted by a concatenation of 'a' and 'b.' The value that a processor sees by sampling the output pad is denoted with a single right quote ('). All signals are buffered and can be placed in a high impedance state. Clocks H1 and H3 are generated within the clock generator circuit 200 and are used to synchronize communication port transfers.

The numbers shown on FIGS. 18a and 18b correspond to the numbers in the following description. Each number describes the events occurring that correspond to an instant represented by the corresponding number on the timing diagrams shown in FIGS. 18a and 18b. It should be noted that negative true signals are represented with a bar above the signal in FIGS. 18a and 18b while an underscore after the signal is used in the following description. Also the signal CST of FIG. 18a and 18b is equivalent to the signal CSTRB in the herein description.

Referring to FIG. 18a, a token request and token transfer sequence proceeds as follows:

1- B requests the token by bringing CREQb__ low.
2- A sees the token request when CREQa'__ goes low.
3- A acknowledges the request, after a type 1 delay from CREQa'__ falling, by bringing CACKa__ low.
4- B sees the acknowledge from A when CACKb'__ goes low.
5- A switches CRDYa__ from tristate to high on the first H1 rising after CACKa__ falling.
6- A tristates CDa(7-0) on the first H1 rising after CACKa__ falling.
7- B switches CSTRBb from tristate to high after a type 2 delay from CACKb'falling.
8- B brings CREQb__ high after type 1 delay from CACKb'__ falling.
9- A sees CREQa'__ go high.
10- A brings CACKa__ high after CACKa'__ goes high.
11- A tristates CSTRBa__ after CREQa__ goes high.
12- A tristates CACKa__ after CREQa'__ goes high and after CACKa__ goes high.
13- A switches CREQa__ from tristate to high after CREQa'__ goes high.
14- B tristates CREQb__ after CREQb__ goes high.
15- B switches CACKb__ from tristate to high after CREQb__ goes high.
16- B tristates CRDYb__ on the H1 rising after CREQb__ goes high.
17- B drives the first byte onto CDb(7-0) on the H1 rising after CREQb__ goes high.
18- A sees the first byte on CDa'(7-0).
19- B brings CSTRBb__ low on the second H1 rising after CREQb__ rising.
20- A sees CSTRBa'__ go low, signalling valid data.
21- A reads the data and brings CRDYa__ low.
22- B sees CRDYb'__ go low, signalling data has been read.
23- B drives the second byte on CDb(7-0) after CRDYb'__ goes low.
24- A sees the second byte on CDa'(7-0).

25- B brings CSTRBb__ high after CRDYb'__ goes low.
26- A sees CSTRBa'__ go high.
27- A brings CRDYa__ high after CSTRBa'__ goes high.
28- B sees CRDYb'__ go high.
29- B brings CSTRBb__ low after CRDYb'__ goes high.
30- A sees CSTRBa'__ go low, signalling valid data.
31- A reads the data and brings CRDYa__ low.
32- B sees CRDYb'__ go low, signalling data has been read.
33- B drives the third byte on CDb(7-0) after CRDYb';__ goes low.
34- A sees the third byte on CDa(7-0).
35- B brings CSTRBb__ high after CRDYb'__ goes low.
36- A sees CSTRBa'__ go high.

The following events are used in FIG. 18b illustrating the timing for a word transfer between communication ports A and B. It should be noted that the events described above also apply to the timing between communication ports A and B shown in FIG. 18b.

36- A sees CSTRBa'__ go high.
37- A brings CRDYa__ high after CSTRBa'__ goes high.
38- B sees CRDYb'__ go high.
39- B brings CSTRBb__ low after CRDYb'__ goes high.
40- A sees CSTRBa'__ go low, signalling valid data.
41- A reads the data and brings CRDYa__ low.
42- B sees CRDYb'__ go low, signalling data has been read.
43- B drives the fourth byte on CDb(7-0) after CRDYb'__ goes low.
44- A sees the fourth byte on CDa(7-0).
45- B brings CSTRBb__ high after CRDYb'__ goes low.
46- A sees CSTRBa'__ go high.
47- A brings CRDYa__ high after CSTRBa'__ goes high.
48- B sees CRDYb'__ go high.
49- B brings CSTRBb__ low after CRDYb'__ goes high.
50- A sees CSTRBa'__ go low, signalling valid data.
51- A reads the data and brings CRDYa__ low.
52- B sees CRDYb'__ go low, signalling data has been read.
53- B brings CSTRBb__ high after CRDYb'__ goes low.
54- A sees CSTRBa'__ go high.
55- A brings CRDYa__ high after CSTRBa'__ goes high.
56- B sees CRDYb'__ go high.
57- B drives the first byte of the next word onto CDb(7-0) after a type 1 synchronizer delay from CRDYb'__ falling (52).
58- A sees the first byte of the next word on CDa(7-0).
59- B lowers CSTRBb__ after a type two delay from CRDYb'__ falling.

Figure 19:
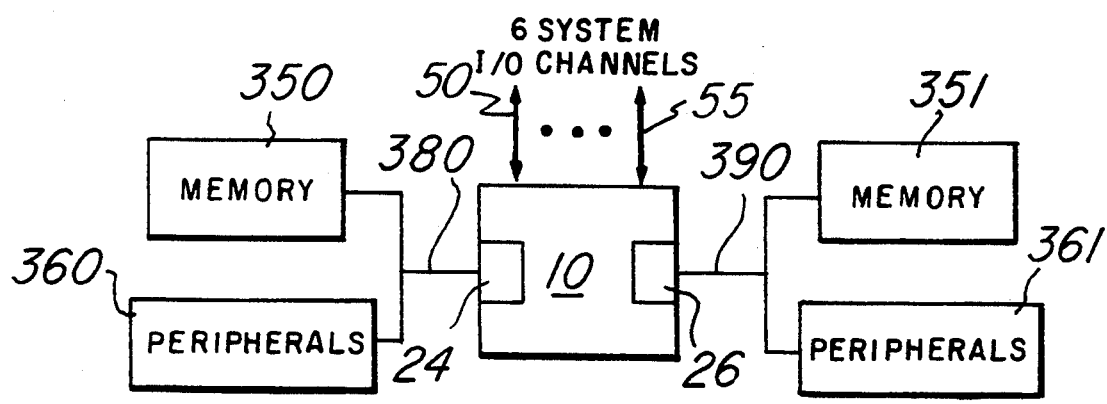
FIG. 19 illustrates a stand-alone configuration of the improved data processing device of FIG. 1 configured to show connection to a plurality of memory and peripheral devices, as well as connection to other systems via communication ports.

FIG. 19 shows an embodiment of a stand alone configuration of the improved data processing configured to show connections to a plurality of memories 350 and 351 and peripheral devices 360 and 361. Global peripheral port 24 and local peripheral port 26 provide the interface to the external devices. For example, bus 380 can be used for program accesses and bus 390 can be used for data or I/O accesses which allows for simultaneous external program and data accesses. Microcomputer 10 also has available six communication channels capable of interfacing to other systems in I/O intensive applications. Peripherals and other external devices such as key boards, monitors, disk drives, printers, displays, transducers, modems, processors, local area networks (LANs), and other known or hereafter devised with which the system commends its use can be connected to the peripheral ports 24 and 26 and communication ports 50–55.

FIGS. 31–43 show embodiments of various parallel processing system architecture configurations which are possible with plurality of improved data processing device of this preferred embodiment with external memory.

Figure 20:
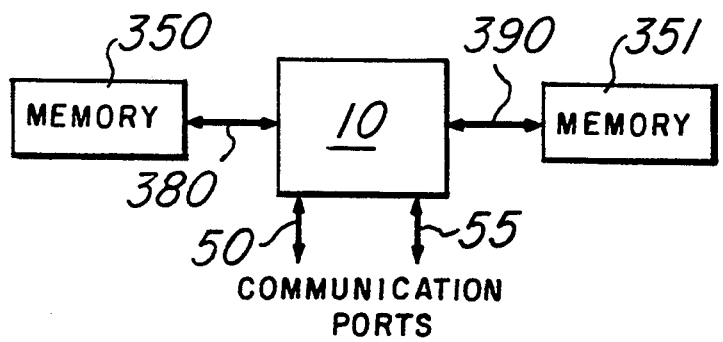
FIG. 20 illustrates a parallel processing system architecture with external memory in the form of building blocks.
Figure 21:
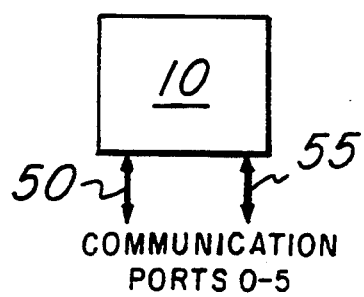
FIG. 21 illustrates a single data processing device without external memory in the form of building blocks.

For example, FIG. 20 specifically shows parallel processing system architecture with external memory in the form of building blocks where memories 350 and 351 can be interfaced via bus 380 and bus 390 and communication ports for communication to additional data processing devices of this preferred embodiment and comparable like communication ports. Alternatively as shown in FIG. 21, the parallel system building block can be another microcomputer 10 effectuating communication via communication ports 50–55 and peripheral ports. The flexibility in the multitude of connections possible with microcomputer 10 offers a vast variety of systems.

Figure 22:
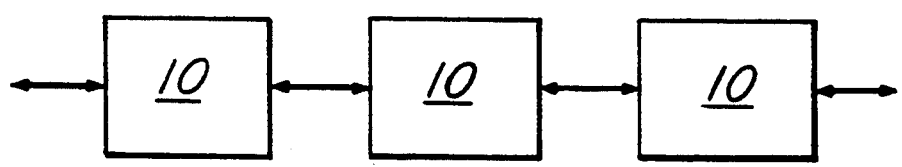
FIG. 22 illustrates another parallel processing system architecture in a pipelined linear array or systolic array.
Figure 23:
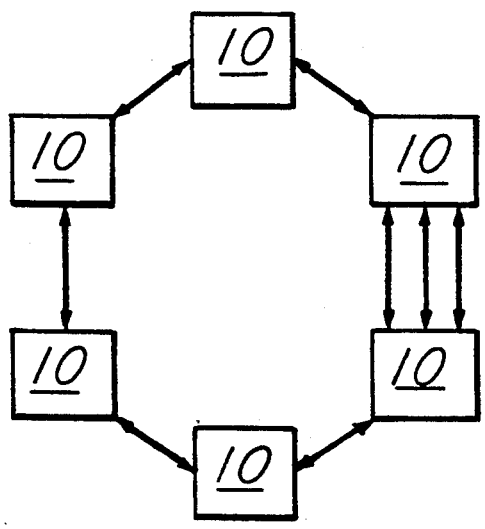
FIG. 23 illustrates another parallel processing system architecture in the form of a bidirectional ring.

One possible system shown in FIG. 22 is a pipelined linear array using three microcomputers 10 connected in a serial configuration. Another system is shown in FIG. 23 where a bi-directional ring utilizing a plurality of microcomputers 10 are connected with more than one communication port between two of the microcomputers 10 thus increasing the communication bandwidth between those two microcomputers.

Figure 24:
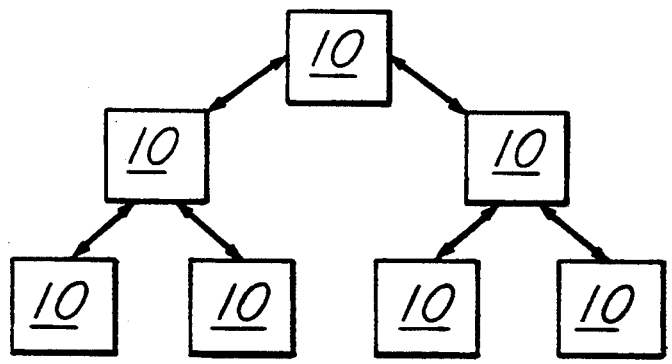
FIG. 24 illustrates another parallel processing system architecture in the form of a tree.

The parallel processing system architecture of FIG. 24 is arranged in the form of a tree. Again the communication ports are used to connect between the trunks and branches and between parent and children and even more architectures are possible by variants of the illustration in FIG. 24.

Figure 25:
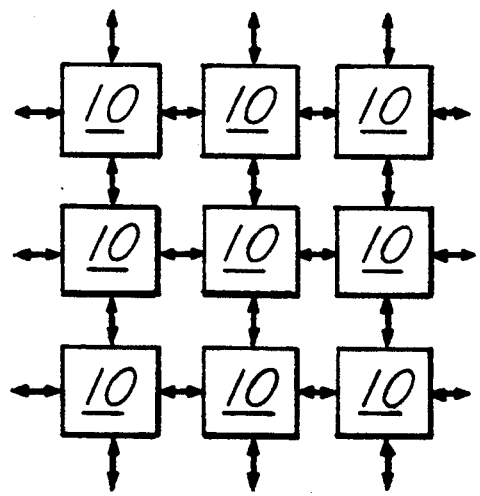
FIG. 25 illustrates another parallel processing system architecture wherein the communication ports are used to support a variety of two-dimensional structures such as a lattice.
Figure 26:
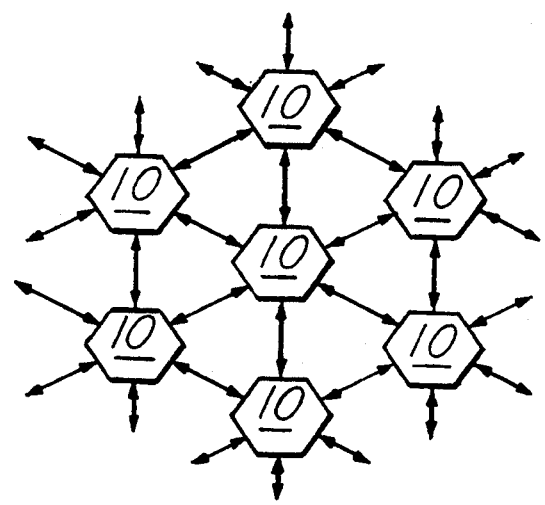
FIG. 26 illustrates another parallel processing system architecture wherein a two-dimensional structure, in the form of a hexagonal mesh, is constructed.

FIG. 25 illustrates how communication ports support a variety of two dimensional structures where a two-dimensional mesh is constructed using only four of the communication ports and nine microcomputers 10. A two-dimensional structure of hexagonal mesh and even higher dimensional structures are also supported as shown in FIG. 26.

Figure 27:
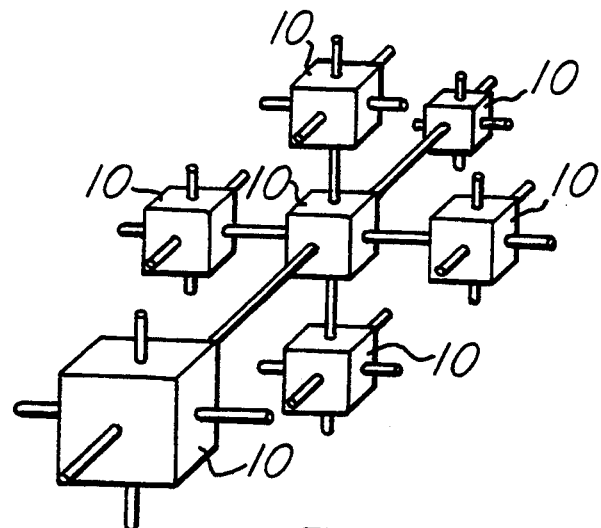
FIG. 27 illustrates another parallel processing system architecture using a three-dimensional grid or cubic lattice.
Figure 28:
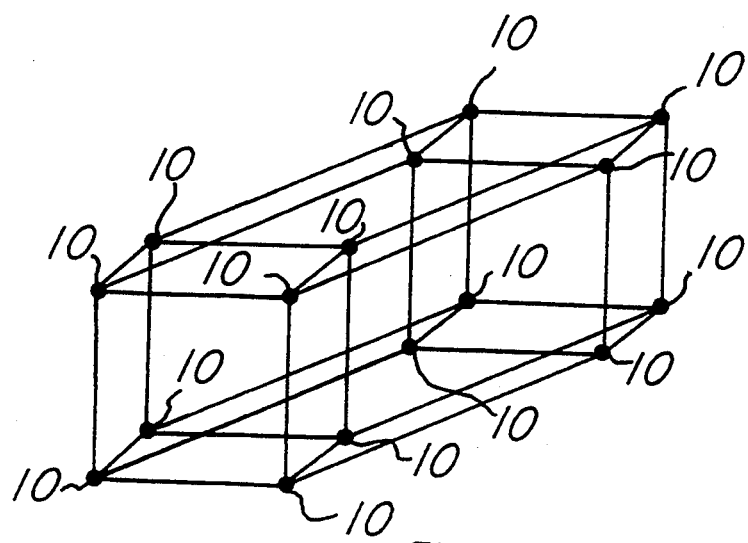
FIG. 28 illustrates another parallel processing system architecture where a four-dimensional hypercube structure is utilized.

FIG. 27 shows a three dimensional grid supported by six communication ports. The microcomputer 10 in the center has all six communication ports connected to six other microcomputers 10 each using only one communication port and having rest of the five communication ports in each unit available for further expansion of this three dimensional grid or extra memory or other like uses. Even higher dimensional structure in the form of a four dimensional hypercube is also possible as shown in FIG. 28. Other higher dimensional structures are also possible to the person of ordinary skill in the art.

Figure 29:
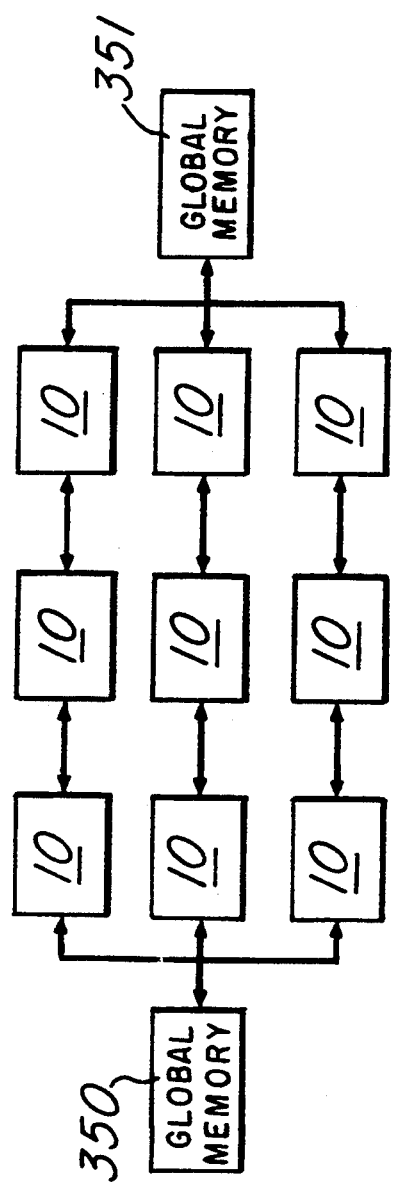
FIG. 29 illustrates another parallel processing system architecture which illustrates a combination of shared memory and processor-to-processor communication.
Figure 30:
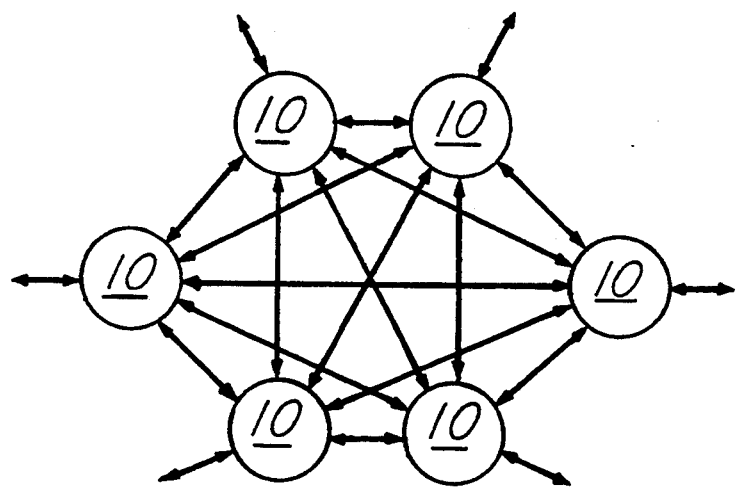
FIG. 30 illustrates yet another configuration of parallel processing system architecture wherein communication ports and support for shared global memories permit a variety of configurations.

A variation of the parallel processing system architecture configuration is illustrated in FIG. 29 where combinations of shared memories 350 and 351 and microcomputer-to-microcomputer communication are possible. FIG. 30 illustrates a parallel system where each microcomputer 10 has local memory that can be shared between other microcomputers 10 via communication ports.

Figure 31:
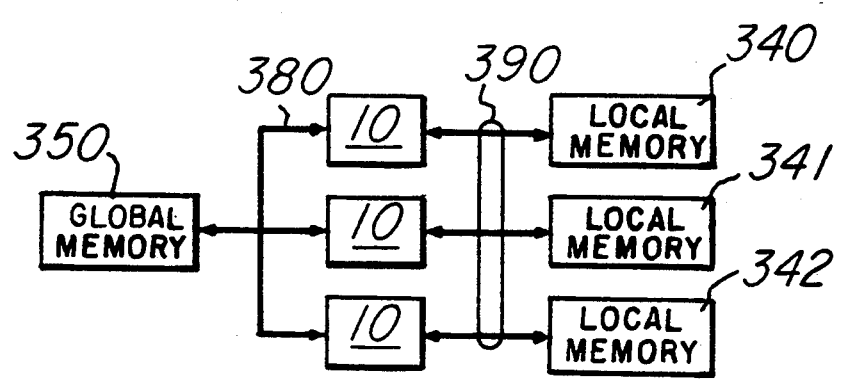
FIG. 31 illustrates another parallel processing system architecture wherein a plurality of improved data processing devices of FIG. 1 interface to global and local memories.
Figure 32:
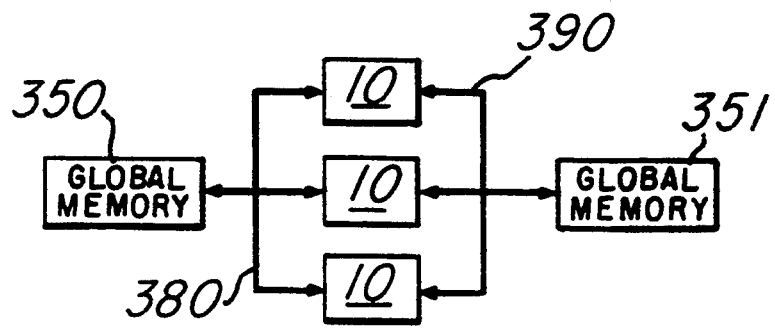
FIG. 32 illustrates yet another configuration of parallel processing system architecture where a plurality of data processing devices of FIG. 1 share a plurality of global memories.

A system application having private local memories 340, 341, and 342 and a shared global memory 350 is illustrated in FIG. 31. Global memory 350 is attached to external bus 380 while local memories 340, 341, and 342 private to each microcomputer 10 are attached to auxiliary bus 390. Another variation is illustrated in FIG. 32 where microcomputers 10 share global memories 350 and 351 via external bus 380 and auxiliary bus 390.

Figure 33:
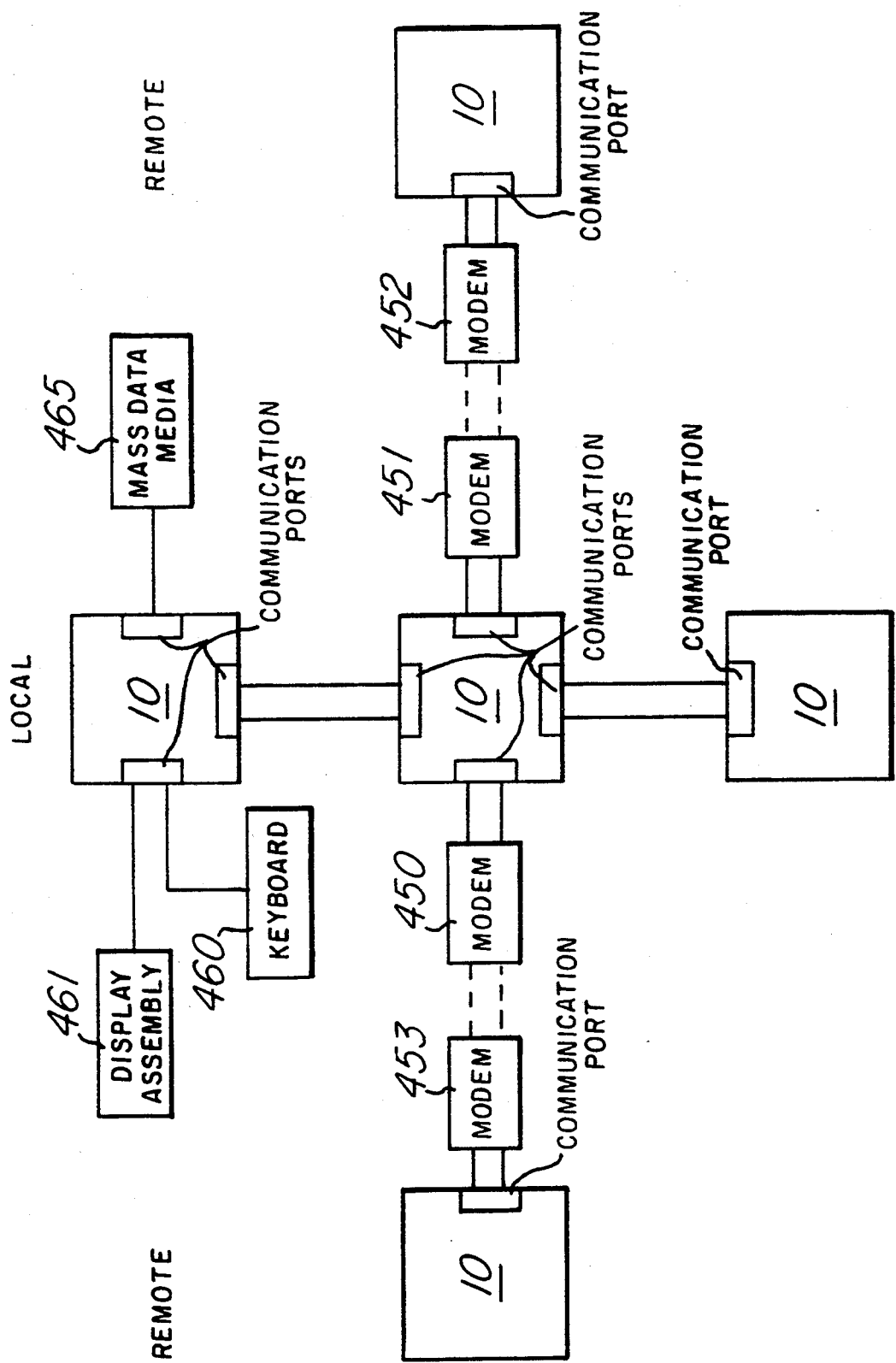
FIG. 33 illustrates another configuration of parallel processing system architecture where communication between some processors are established via modems.

FIG. 33 illustrates a parallel processing system where some remote microcomputers 10 are connected via modem link 450, 451,452 and 453 to their respective communication ports 50-55 while other local microcomputers 10 are connected directly via communication ports 50-55. Keyboard 460, display assembly 461 and mass data media 465 are connected to local microcomputer 10 via communication ports.

Figure 34:
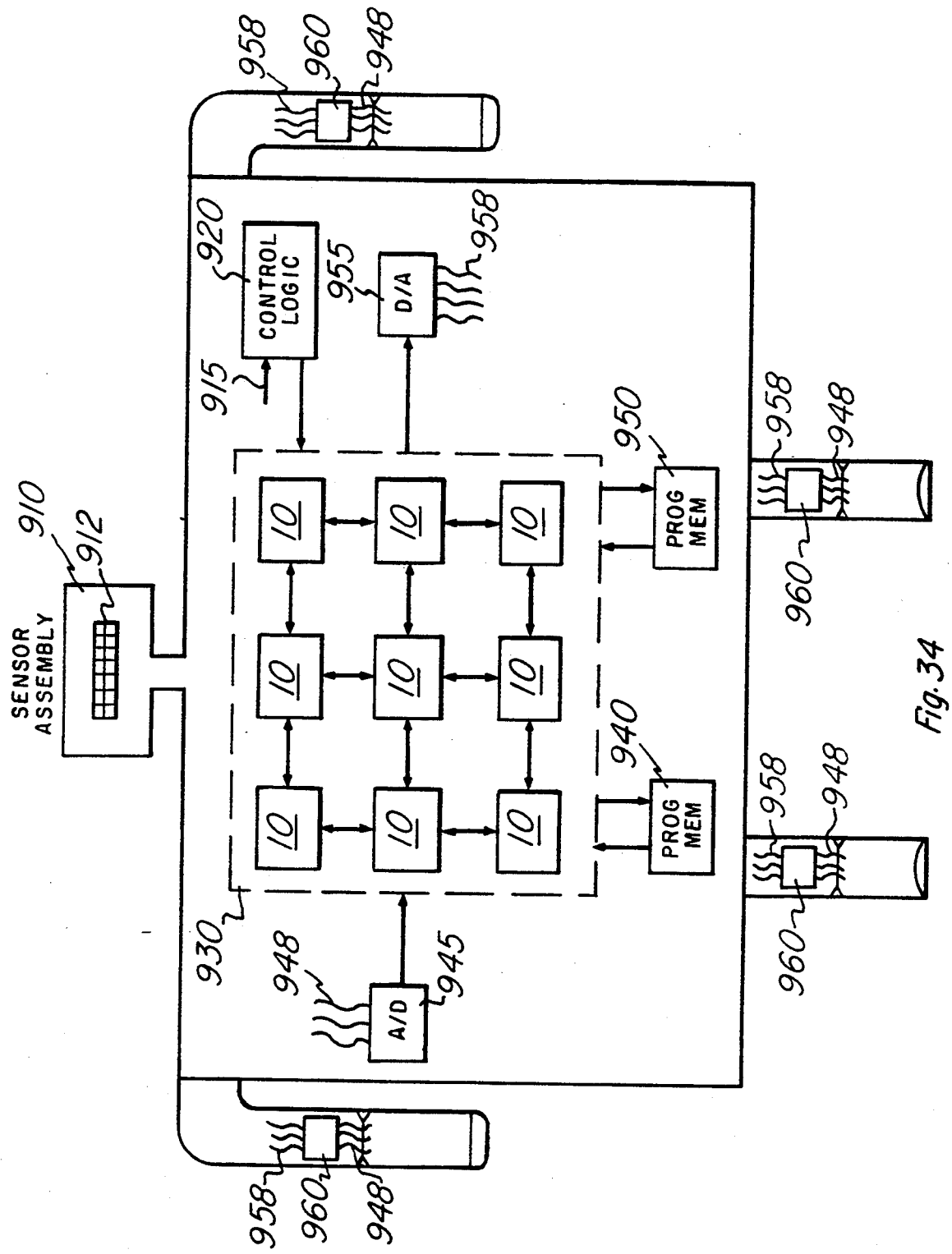
FIG. 34 illustrates a example robotics structure that utilizes the parallel processing system architecture.

The flexibility from the various communication port connections and memory sharing capabilities of microcomputers 10 provide systems that can be optimized for applications using a single microcomputer 10 or multiple microcomputers 10. One possible system is in the field of robotics as shown in FIG. 34. Using microcomputer 10 as the building block, the interactive interfacing required for the varies functions of a robot 900 is accomplished. For example, robot 900 equipped with vision recognition from sensor assembly 910 makes contact with an item out of its reach. Signals 915 are sent to control logic 920 which supply signals to control the operation of computation system 930 consisting of plurality of parallel processing microcomputers 10. System 930 receives program instructions from program memory 940. Data memory 950 provides data storage for system 930. Command signals from system 930 are generated and transformed from digital to analog signals using D/A 955 to control motors 960 for moving the various joints of robot 900. Analog signals 958 provide the motor controls. While motors 960 are receiving control signals, motors 960 are also providing feed back analog signals 948 which are converted to digital signals via A/D converter 945. The computation system 930 utilizing the feed back signals 948 from motors 960 determines new motor control signals to be sent to motors 960 insuring effective movement of robot 900. Additionally, as the robot moves, vision recognition control relays distance and direction information back to control logic 920. Other functions of robot 900 such as speech synthesis via speakers 912 and speech recognition from sensor assembly 910 also has a high degree of interactivness that system 900 is capable to accommodate. As more and more functions and requirements of the system develop, additional microcomputers 10 can be readily connected to system 900.

Applications that utilize complex algorithms are well suited for the herein-described preferred embodiments. Such applications include speech-recognition technology, cellular radio phones, video teleconferencing, and multiplexing four voice conversations on leased 64-Kbit/s lines that formerly could carry only one. A large number of other computationally-intensive problems are well-suited for parallel processing, such as 3D graphics, control, array processors, neural networks, and numerous other applications listed in the coassigned applications incorporated herein by reference.

Systems that have interactions with its components and other systems benefit from the parallel processing system architecture configuration of microcomputer 10. Microcomputers 10 can be built upon to suit the needs of a system as system requirements grow. With the many communication ports, commands and interactive signals can be directed to the proper microcomputer 10 or multiple of microcomputers 10 to respond to those commands and interactive signals.

Figure 35A:
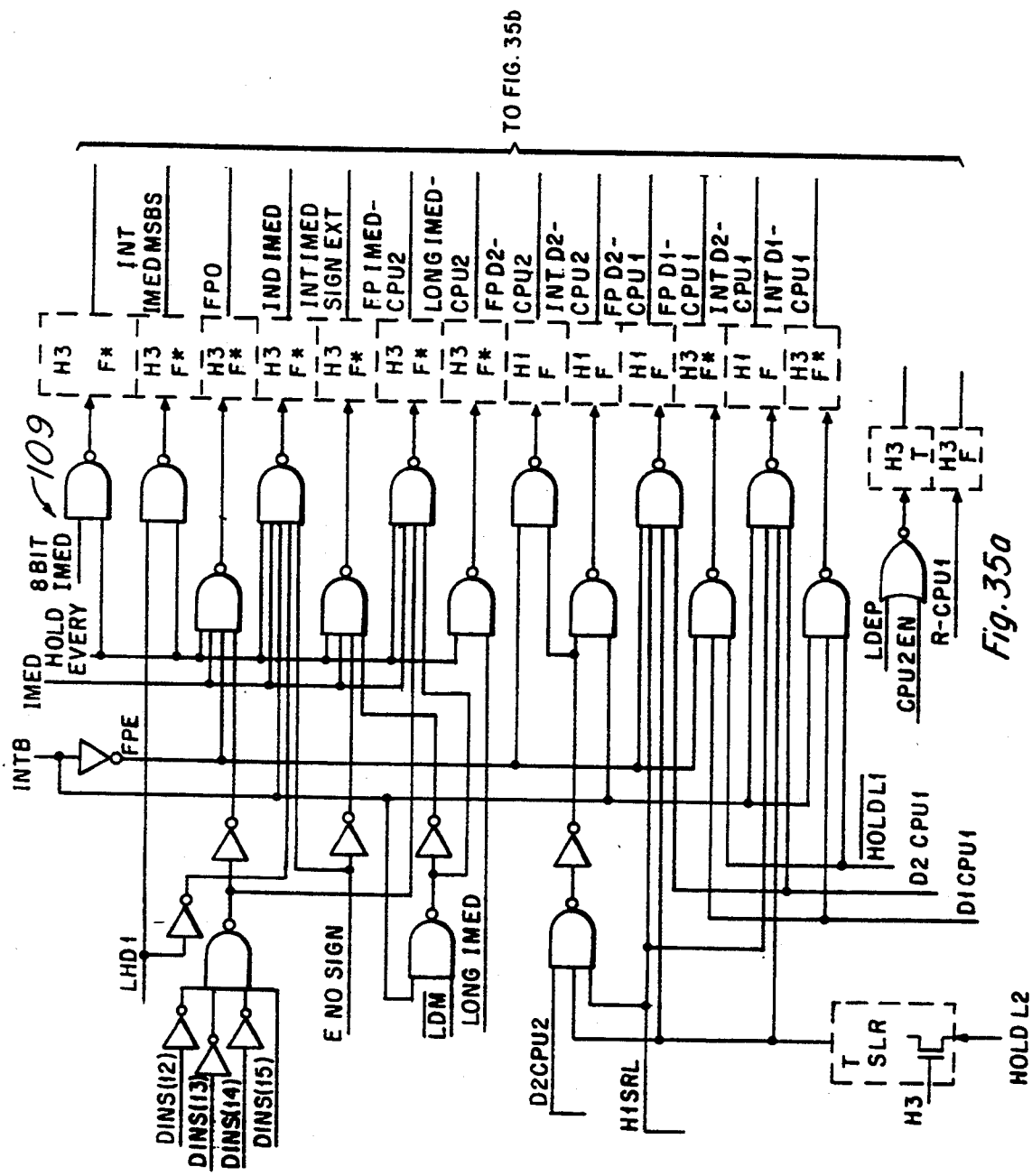
FIG. 35 illustrates a circuit used to multiplex data for the three-operand addressing instructions.
Figure 35B:
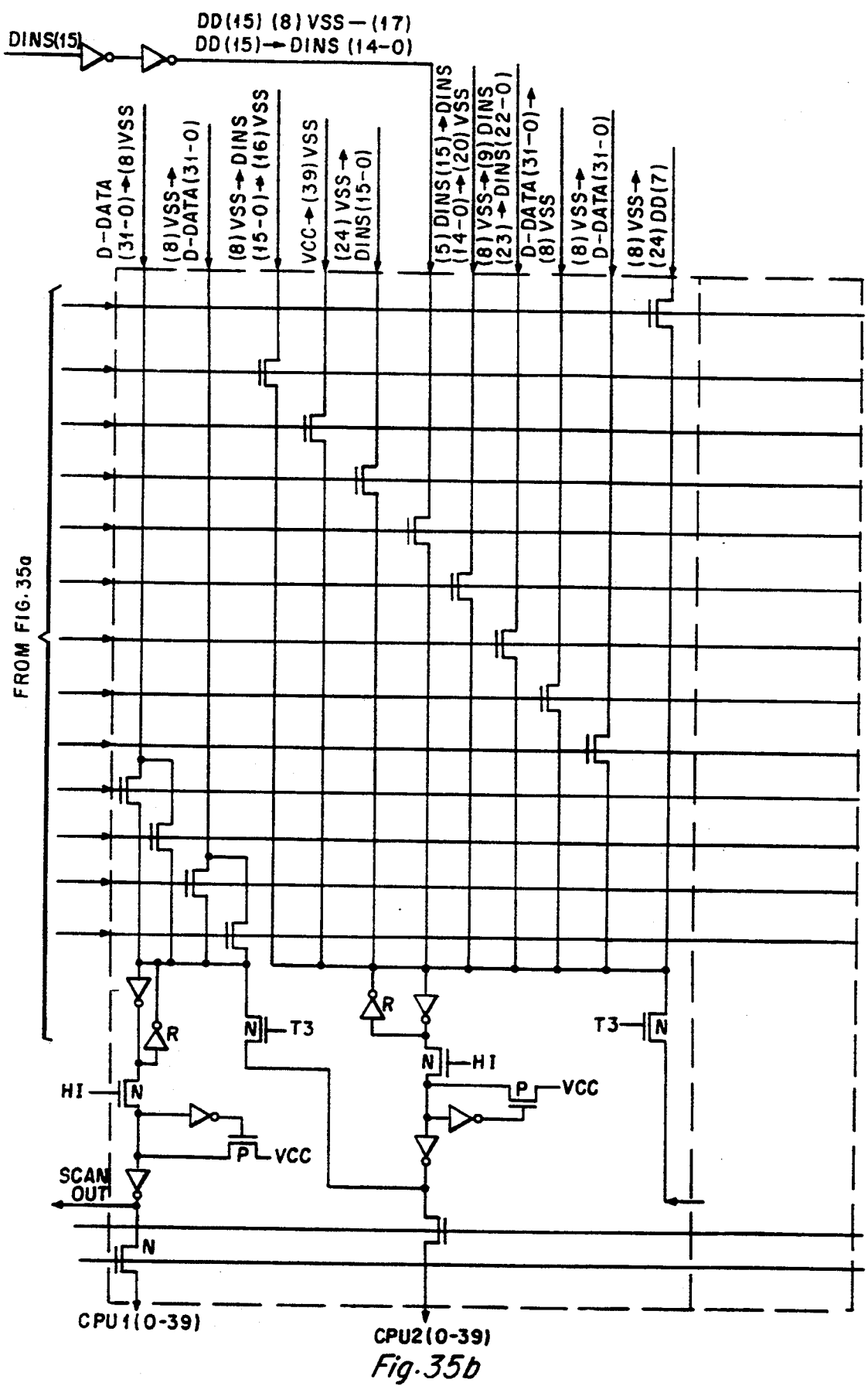

FIG. 35 shows the circuit diagram for the multiplexing data for four new three-operand instructions as well as other instructions. The various modes include (109) 8-bit immediate (short immediate), integer immediate (signed and unsigned), floating point immediate, direct, indirect, and long immediate. Short immediate and indirect (integer and floating point) are used by the four new three-operand instructions. The multiplexer for register mode is contained in the register file.

Figure 36A:
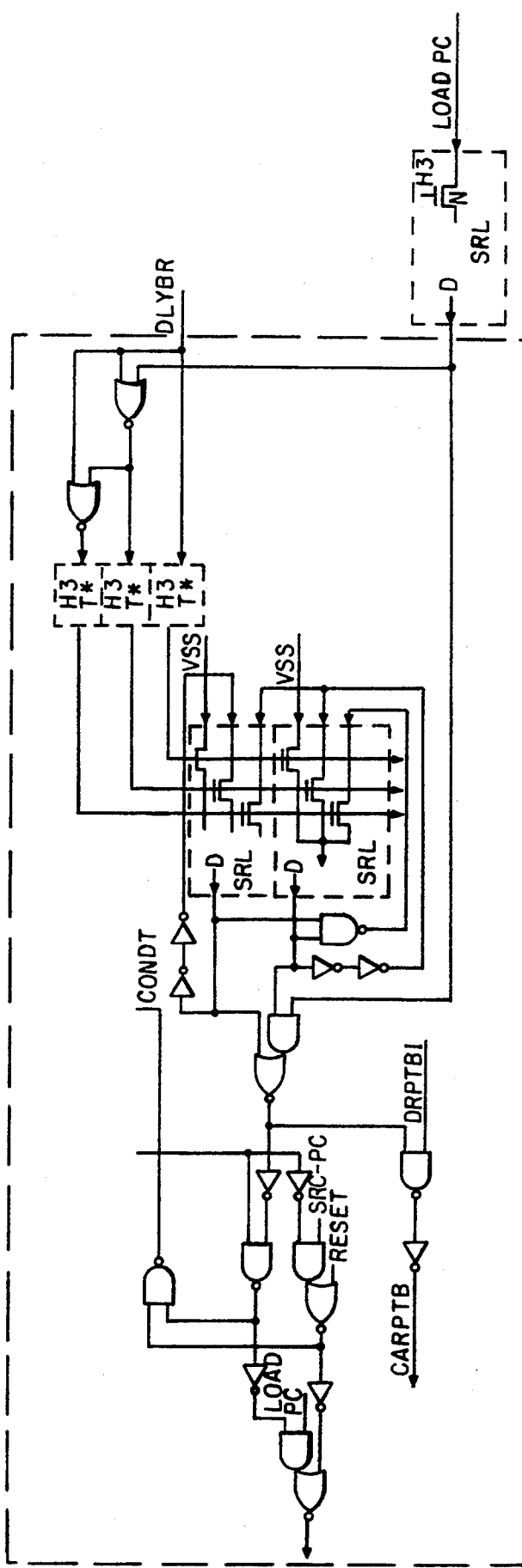
FIG. 36a illustrates a circuit which counts the three instructions fetched after a delayed trap instruction.

FIG. 36a illustrates the circuit diagram used to count the three instructions fetched after a delayed instruction, including delayed trap (LAT) and delayed Repeat Block (APTBO). The counter is reset by (DLYBR) whenever a delayed instruction is decoded. The counter counts every time the Program Counter is updated. By keeping track of the program counter updates, wait states are inserted due to pipeline conflicts. Pipeline conflicts occur when a task takes more than one system clock cycle to complete.

Figure 36B:
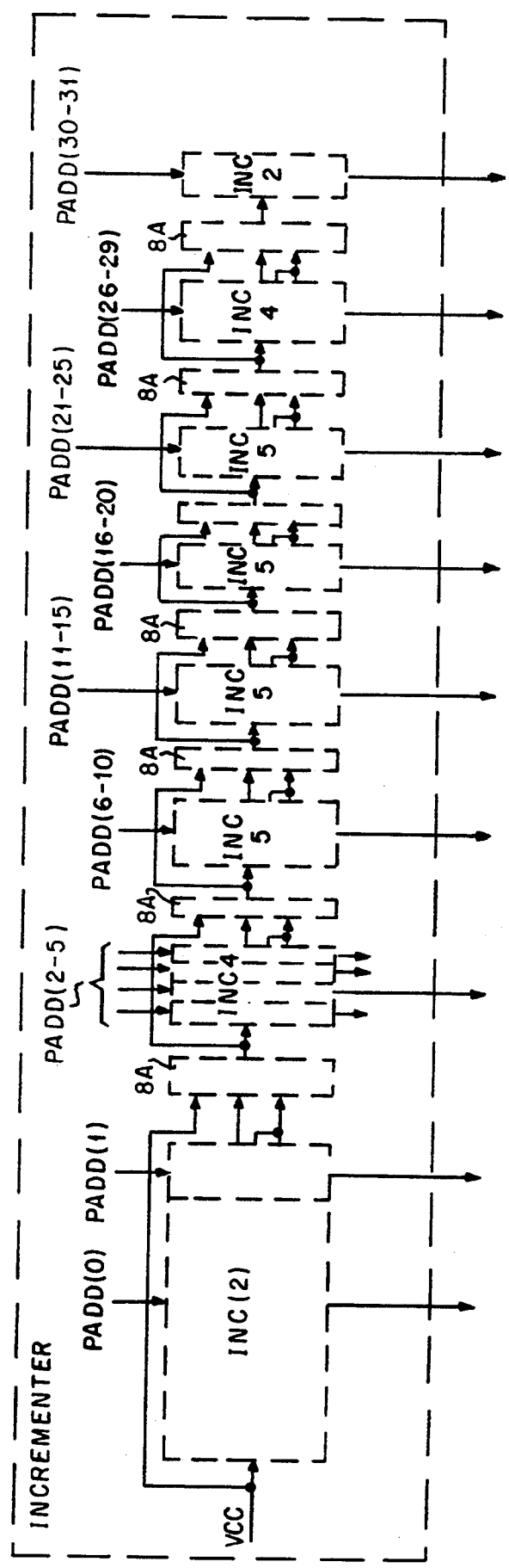
FIG. 36b illustrates a circuit with an incrementer used in the implementation of the delayed trap instructions.

FIG. 36b illustrates a circuit with an incrementer used for the delayed trap instruction. When the fetch of the third instruction after a delayed trap begins, the program counter (PC) is located with the trap vector. PC+4 needs to be stored in PC+4 register 210 since the program needs to return to PC+4. The PC is at PC+3 and the incrementer shown in FIG. 36b increments to PC+4 before being stored in stock memory.

Although the invention has been described in detail herein with reference to its preferred embodiment, it is to be understood that this description is by way of example only, and is not to be construed in a limiting sense. It is to be further understood that numerous changes in the details of the embodiments of the invention, and additional embodiments of the invention, will be apparent to, and may be made by, persons of ordinary skill in the art having reference to this description. It is contemplated that such changes and additional embodiments are within the spirit and true scope of the invention as claimed below.

What is claimed is:

1. A method of operating a communication port which is connected to a data processing circuit to permit the data processing circuit to communicate with another circuit via a data transfer interface of the communication port, comprising:

arbitrating with the other circuit for possession of a token, and exchanging the token with the other circuit according to the arbitration, said communication port being qualified to transmit data to the other circuit when said communication port possesses the token and being disqualified from transmitting data to the other circuit when the other circuit possesses the token; and selectively halting data transfer through said interface to the other circuit, including foregoing arbitration for possession of the token when the other circuit has possession of the token.

2. The method of claim 1, wherein said data transfer interface includes a first-in-first-out buffer.

3. The method of claim 1, comprising:
selectively halting data transfer through said interface to said data processing circuit, including retaining possession of the token at the communication port when said communication port has possession of the token, regardless of arbitration attempts by the other circuit.

4. The method of claim 3, wherein said data transfer interface includes a first-in-first-out buffer.

5. A method of operating a communication port which is connected to a data processing circuit to permit the data processing circuit to communicate with another circuit via a data transfer interface of the communication port, comprising:

arbitrating with the other circuit for possession of a token, and exchanging the token with the other circuit according to the arbitration, said communication port being qualified to transmit data to the other circuit when said communication port possesses the token and being disqualified from transmitting data to the other circuit when the other circuit possesses the token; and selectively halting data transfer through said interface to said data processing circuit, including retaining possession of the token at the communication port when said communication port has possession of the token, regardless of arbitration attempts by the other circuit.

6. The method of claim 5, wherein said data transfer interface includes a first-in-first-out buffer.

7. A data processing device, comprising:
a data processing circuit;
a communication port connected to said data processing circuit for permitting said data processing circuit to communicate with another device, said communication port including a data transfer interface for transferring data between said data processing circuit and the other device, and arbitration circuitry for arbitrating with the other device for possession of a token and for exchanging the token with the other device according to the arbitration, said communication port being qualified to transmit data to the other device when said communication port possesses the token and being disqualified from transmitting data to the other device when said communication port lacks possession of the token; and
wherein said arbitration circuitry is selectively operable, when said communication port possesses the token, to halt data transfer through said interface to said data processing circuit by retaining possession of the token regardless of arbitration attempts by the other device.

8. The data processing device of claim 7, wherein said data transfer interface includes a first-in-first-out buffer.

9. The data processing device of claim 7, wherein said arbitration circuitry is coupled to said data processing circuit and is operable to halt said data transfer through said data transfer interface in response to a signal provided by said data processing circuit.

10. The data processing device of claim 9, wherein said communication port includes a port control register connected to said data processing circuit for receiving said signal as provided by said data processing circuit.

11. The data processing device of claim 10, wherein said port control register is connected to said arbitration circuitry for indicating to said arbitration circuitry that said signal provided by said data processing circuit has been received.

12. A data processing system, comprising:
a data processing device for processing data;
data processing device for data
a peripheral device connected to said communication with said data processing device;
said data processing device including a data processing circuit, a communication port connected to said data processing circuit and to said peripheral device for permitting said data processing circuit to communicate with said peripheral device, said communication port including a data transfer interface for transferring data between said data processing circuit and said peripheral device, and arbitration circuitry for arbitrating with said peripheral device for possession of a token and for exchanging the token with said peripheral device according to the arbitration, said communication port being qualified to transmit data to said peripheral device when said communication port possesses the token and being disqualified from transmitting data to said peripheral device when said peripheral device possesses the token; and
wherein said arbitration circuitry is selectively operable, when said communication port possesses the token, to halt data transfer through said interface to said data processing circuit by retaining possession of the token regardless of arbitration attempts by said peripheral device.

13. The data processing system of claim 12, wherein said peripheral device is a data processing device.

14. The data processing system of claim 12, wherein said data transfer interface includes a first-in-first-out buffer.

15. The data processing system of claim 12, wherein said arbitration circuitry is coupled to said data processing circuit and is operable to halt said data transfer through said data transfer interface in response to a signal provided by said data processing circuit.

16. The data processing system of claim 15, wherein said communication port includes a port control register connected to said data processing circuit for receiving said signal as provided by said data processing circuit.

17. The data processing system of claim 16, wherein said port control register is connected to said arbitration circuitry for indicating to said arbitration circuitry that said signal provided by said data processing circuit has been received.

18. A robot system, comprising:
sensors for sensing conditions relevant to operation of the robot system;
a plurality of interconnected data processing devices;
apparatus responsive to said data processing devices for performing a robotic function;
one of said data processing devices including a data processing circuit and a communication port connected to said data processing circuit for permitting said data processing circuit to communicate with another of said data processing devices; and
said communication port including a data transfer interface for transferring data between said data processing circuit and said another data processing device, and arbitration circuitry for arbitrating with said another data processing device for possession of a token and for exchanging the token with said another data processing device according to the arbitration, said communication port being qualified to transmit data to said another data processing device when said communication port possesses the token and being disqualified from transmitting data to said another data processing device when said another data processing device possesses the token, wherein said arbitration circuitry is selectively operable, when said communication port possesses the token, to halt data transfer through said interface to said data processing circuit by retaining possession of the token regardless of arbitration attempts by said another data processing device, and wherein said arbitration circuitry is selectively operable, when said another data processing device has possession of the token, to halt data transfer through said interface to said another data processing device by foregoing arbitration for possession of the token.

19. A data communications system, comprising:
a plurality of interconnected data processing devices;
one of said data processing devices including a data processing circuit and a communication port connected to said data processing circuit for permitting said data processing circuit to communicate with another of said data processing devices;
said communication port including a data transfer interface for transferring data between said data processing circuit and said another data processing device, and arbitration circuitry for arbitrating with said another data processing device for possession of a token and for exchanging the token with said another data processing device according to the arbitration, said communication port being qualified to transmit data to said another data processing device when said communication port possesses the token and being disqualified from transmitting data to said another data processing device when said another data processing device possesses the token, wherein said arbitration circuitry is selectively operable, when said communication port possesses the token, to halt data transfer through said interface to said data processing circuit by retaining possession of the token regardless of arbitration attempts by said another data processing device, and wherein said arbitration circuitry is selectively operable, when said another data processing device has possession of the token, to halt data transfer through said interface to said another data processing device by foregoing arbitration for possession of the token;
an analog-to-digital converter for converting analog signals input from a telecommunication line into digital signals for use by one of said data processing devices; and
a digital-to-analog converter for converting digital signals output from one of said data processing devices into analog signals for transmission via a telecommunication line.

20. A data processing device, comprising:
a data processing circuit;
a communication port connected to said data processing circuit for permitting said data processing circuit to communicate with another device, said communication port including a data transfer interface for transferring data between said data processing circuit and the other device, and arbitration circuitry for arbitrating with the other device for possession of a token and for exchanging the token with the other device according to the arbitration, said communication port being qualified to transmit data to the other device when said communication port possesses the token and being disqualified from transmitting data to the other device when said communication port lacks possession of the token; and
wherein said arbitration circuitry is selectively operable, when said communication port lacks possession of the token, to halt data transfer through said interface to the other device by foregoing arbitration for possession of the token.

21. The data processing device of claim 20, wherein said data transfer interface includes a first-in-first-out buffer.

22. The data processing device of claim 20, wherein said arbitration circuitry is coupled to said data processing circuit and is operable to halt said data transfer through said data transfer interface in response to a signal provided by said data processing circuit.

23. The data processing device of claim 22, wherein said communication port includes a port control register connected to said data processing circuit for receiving said signal as provided by said data processing circuit.

24. The data processing device of claim 23, wherein said port control register is connected to said arbitration circuitry for indicating to said arbitration circuitry that said signal provided by said data processing circuit has been received.

25. The data processing device of claim 20,
wherein said arbitration circuitry is selectively operable, when said communication port possesses the token, to halt data transfer through said interface to said data processing circuit by retaining possession of the token regardless of arbitration attempts by the other device.

26. The data processing device of claim 25, wherein said data transfer interface includes a first-in-first-out buffer.

27. The data processing device of claim 25, wherein said arbitration circuitry is coupled to said data processing circuit and is operable to halt said data transfer through said data transfer interface in response to a signal provided by said data processing circuit.

28. The data processing device of claim 27, wherein said communication port includes a port control register connected to said data processing circuit for receiving said signal as provided by said data processing circuit.

29. The data processing device of claim 28, wherein said port control register is connected to said arbitration circuitry for indicating to said arbitration circuitry that said signal provided by said data processing circuit has been received.

30. A data processing system, comprising:
a data processing device for processing data;
a peripheral device connected to said data processing device for data communication with said data processing device;
said data processing device including a data processing circuit, a communication port connected to said data processing circuit and to said peripheral device for permitting said data processing circuit to communicate with said peripheral device, said communication port including a data transfer interface for transferring data between said data processing circuit and said peripheral device, and arbitration circuitry for arbitrating with said peripheral device for possession of a token and for exchanging the token with said peripheral device according to the arbitration, said communication port being qualified to transmit data to said peripheral device when said communication port possesses the token and being disqualified from transmitting data to said peripheral device when said peripheral device possesses the token; and
wherein said arbitration circuitry is selectively operable, when said peripheral device has possession of the token, to halt data transfer through said interface to said peripheral device by foregoing arbitration for possession of the token.

31. The data processing system of claim 30, wherein said data transfer interface includes a first-in-first-out buffer.

32. The data processing system of claim 30, wherein said arbitration circuitry is coupled to said data processing circuit and is operable to halt said data transfer through said data transfer interface in response to a signal provided by said data processing circuit.

33. The data processing system of claim 32, wherein said communication port includes a port control register connected to said data processing circuit for receiving said signal as provided by said data processing circuit.

34. The data processing system of claim 33, wherein said port control register is connected to said arbitration circuitry for indicating to said arbitration circuitry that said signal provided by said data processing circuit has been received.

35. The data processing system of claim 30,
wherein said arbitration circuitry is selectively operable, when said communication port possesses the token, to halt data transfer through said interface to said data processing circuit by retaining possession of the token regardless of arbitration attempts by said peripheral device.

36. The data processing system of claim 35, wherein said data transfer interface includes a first-in-first-out buffer.

37. The data processing system of claim 35, wherein said arbitration circuitry is coupled to said data processing circuit and is operable to halt said data transfer through said data transfer interface in response to a signal provided by said data processing circuit.

38. The data processing system of claim 37, wherein said communication port includes a port control register connected to said data processing circuit for receiving said signal as provided by said data processing circuit.

39. The data processing system of claim 38 wherein said port control register is connected to said arbitration circuitry for indicating to said arbitration circuitry that said signal provided by said data processing circuit has been received.

* * * * *